United States Patent
Suzuki et al.

(10) Patent No.: US 9,643,470 B2
(45) Date of Patent: May 9, 2017

(54) AIR CONDITIONING DEVICE FOR VEHICLE

(75) Inventors: Kenichi Suzuki, Isesaki (JP); Ryo Miyakoshi, Isesaki (JP); Hidenori Takei, Isesaki (JP); Kouhei Yamashita, Isesaki (JP)

(73) Assignee: SANDEN HOLDINGS CORPORATION, Isesaki-shi (JP)

( * ) Notice: Subject to any disclaimer, the term of this patent is extended or adjusted under 35 U.S.C. 154(b) by 784 days.

(21) Appl. No.: 13/985,035

(22) PCT Filed: Jan. 18, 2012

(86) PCT No.: PCT/JP2012/050996
§ 371 (c)(1),
(2), (4) Date: Aug. 12, 2013

(87) PCT Pub. No.: WO2012/108240
PCT Pub. Date: Aug. 16, 2012

(65) Prior Publication Data
US 2013/0312442 A1  Nov. 28, 2013

(30) Foreign Application Priority Data

Feb. 10, 2011 (JP) .................. 2011-027304
Feb. 25, 2011 (JP) .................. 2011-040132
Apr. 26, 2011 (JP) .................. 2011-098248

(51) Int. Cl.
  *B60H 1/00* (2006.01)
  *F25B 41/04* (2006.01)
  *F25B 47/00* (2006.01)

(52) U.S. Cl.
  CPC ..... *B60H 1/00485* (2013.01); *B60H 1/00642* (2013.01); *B60H 1/00921* (2013.01);
  (Continued)

(58) Field of Classification Search
  CPC ............ B60H 1/00921; B60H 1/00485; B60H 1/00642; B60H 2001/00957; F25B 41/04; F25B 7/006; F25B 2700/2117
  (Continued)

(56) References Cited

U.S. PATENT DOCUMENTS 6,178,760 B1 * 1/2001 Tanaka ............... B60H 1/00392
                                                        62/154
6,938,431 B2   9/2005 Hanada
(Continued)

FOREIGN PATENT DOCUMENTS

CN    1489529    4/2004
CN   101722815   6/2010
(Continued)

OTHER PUBLICATIONS

Office Action dated Dec. 1, 2016 which issued in the corresponding Chinese Patent Application No. 201510482963.4.

*Primary Examiner* — Mohammad M Ali
(74) *Attorney, Agent, or Firm* — Cozen O'Connor

(57) ABSTRACT

A vehicle air conditioning apparatus is provided to prevent a frost from being formed on a heat exchanger under the condition that the outdoor temperature is low. During a heating and dehumidifying operation, the third solenoid valve 25c is closed when outdoor temperature Tam is predetermined temperature T1 or lower, or when temperature Thex of the refrigerant flowing out of the outdoor heat exchanger 22 is a predetermined temperature T2 or lower and temperature Te detected by the cooled air temperature sensor 44 is temperature Tet-β or lower. By this means, during the heating and dehumidifying operation, when a frost is likely to be formed on the heat exchanger 14, it is
(Continued)

possible to prevent the refrigerant from flowing into the heat exchanger 14, and to prevent a frost from being formed on the heat exchanger 14.

19 Claims, 35 Drawing Sheets

(52) U.S. Cl.
CPC ............ *F25B 41/04* (2013.01); *F25B 47/006* (2013.01); *B60H 2001/00957* (2013.01); *F25B 2700/2117* (2013.01)

(58) Field of Classification Search
USPC .......................................... 62/244, 160, 222
See application file for complete search history.

(56) References Cited

U.S. PATENT DOCUMENTS

| | | | | |
|---|---|---|---|---|
| 7,520,320 | B2 * | 4/2009 | Itoh | B60H 1/00385 |
| | | | | 165/202 |
| 7,793,711 | B2 * | 9/2010 | Ichikawa | B60H 1/00785 |
| | | | | 165/202 |
| 8,245,768 | B2 | 8/2012 | Nomura et al. | |
| 8,572,993 | B2 | 11/2013 | No et al. | |
| 8,572,995 | B2 | 11/2013 | Kasahara | |
| 2001/0035286 | A1 * | 11/2001 | Kobayashi | B60H 1/3207 |
| | | | | 165/202 |
| 2004/0079096 | A1 * | 4/2004 | Itoh | B60H 1/00735 |
| | | | | 62/223 |
| 2004/0134207 | A1 * | 7/2004 | Morita | B60H 1/00792 |
| | | | | 62/158 |
| 2004/0134217 | A1 * | 7/2004 | Itoh | B60H 1/00392 |
| | | | | 62/324.1 |
| 2004/0200610 | A1 * | 10/2004 | Hara | B60H 1/00314 |
| | | | | 165/202 |
| 2005/0011221 | A1 * | 1/2005 | Hirota | F04B 27/1804 |
| | | | | 62/500 |
| 2006/0191280 | A1 * | 8/2006 | Kurosawa | B60H 1/00921 |
| | | | | 62/324.1 |
| 2010/0089564 | A1 | 4/2010 | Nomura et al. | |
| 2010/0206047 | A1 | 8/2010 | No et al. | |
| 2011/0023534 | A1 | 2/2011 | Kasahara | |

FOREIGN PATENT DOCUMENTS

| | | |
|---|---|---|
| CN | 101849173 | 9/2010 |
| JP | 03-086620 | 4/1991 |
| JP | 06-278451 | 10/1994 |
| JP | 8-282262 | 10/1996 |
| JP | 11-51500 | 2/1999 |
| JP | 2000-025446 | 1/2000 |
| JP | 2000-280733 | 10/2000 |
| JP | 2000-329415 | 11/2000 |
| JP | 2006-242402 | 9/2006 |
| JP | 2009-243810 | 10/2009 |
| JP | 2009-264661 | 11/2009 |

* cited by examiner

AIR CONDITIONING DEVICE FOR VEHICLE

RELATED APPLICATIONS

This is a U.S. national stage of International application No. PCT/JP2012/050996 filed on Jan. 18, 2012.

This application claims the priority of Japanese application nos. 2011-027304 filed Feb. 10, 2011, 2011-040132 filed Feb. 25, 2011 and 2011-098248 filed Apr. 26, 2011, the entire contents of all of which are hereby incorporated by reference.

CROSS-REFERENCES TO RELATED APPLICATIONS

This application claims the benefit of Japanese Patent Application No. 2011-027304, filed Feb. 10, 2011, Japanese Patent Application No. 2011-040132, filed Feb. 25, 2011, and Japanese Patent Application No. 2011-098248, filed Apr. 26, 2011, which are incorporated herein by reference.

TECHNICAL FIELD

The present invention relates to a vehicle air conditioning apparatus applicable to, for example, electric cars.

BACKGROUND ART

Conventionally, as a sort of apparatus, there has been known a vehicle air conditioning apparatus that includes: a compressor configured to compress and discharge a refrigerant; a radiator provided in the vehicle interior and configured to release the heat from the refrigerant; a heat exchanger provided in the vehicle interior and configured to absorb the heat into the refrigerant and an outdoor heat exchanger provided outside the vehicle interior and configured to release the heat from or absorb the heat into the refrigerant (see, for example, Patent Literature 1).

It has been known that the vehicle air conditioning apparatus performs a cooling operation by releasing the heat from the refrigerant discharged from the compressor in the outdoor heat exchanger and by absorbing the heat into the refrigerant in the heat exchanger; a cooling and dehumidifying operation by releasing the heat from the refrigerant discharged from the compressor in the radiator and the outdoor heat exchanger and by absorbing the heat into the refrigerant in the heat exchanger; a heating operation by releasing the heat from the refrigerant discharged from the compressor in the radiator and by absorbing the heat into the refrigerant in the outdoor heat exchanger; and a heating and dehumidifying operation by releasing the heat from the refrigerant discharged from the compressor in the radiator and by absorbing the heat into part of the refrigerant in the heat exchanger while absorbing the heat into the remaining refrigerant in the outdoor heat exchanger.

In addition, conventionally, it has been known that this sort of vehicle air conditioning apparatus includes a compressor driven by an engine as a power source of a vehicle; a radiator provided outside the vehicle interior; and a heat exchanger provided inside the vehicle interior. With this vehicle air conditioning apparatus, a cooling operation is performed by: releasing the heat from the refrigerant discharged from the compressor in the radiator; absorbing the heat into the refrigerant in the heat exchanger; and supplying the air after a heat exchange with the refrigerant in the heat exchanger, to the vehicle interior. In addition, such a conventional vehicle air conditioning apparatus includes a heater core and performs a heating operation by: releasing the exhaust heat from the cooling water used to cool the engine in the heater core; and blowing the air after a heat exchange with the cooling water in the heater core, to the vehicle interior. Moreover, such a conventional vehicle air conditioning apparatus performs a heating and dehumidifying operation by: cooling the air to be supplied to the vehicle interior to a required absolute humidity in the heat exchanger for dehumidification; heating the cooled and dehumidified air to a desired temperature in the heater core; and blowing the heated air to the vehicle interior.

The above-mentioned vehicle air conditioning apparatus uses the exhaust heat from the engine as a heat source to heat the air during a heating operation and a heating and dehumidifying operation. Generally, an electric car uses an electric motor as a power source, and it is difficult to acquire the exhaust heat that can heat the air by using the electric motor without an engine. Therefore, the above-mentioned vehicle air conditioning apparatus is not applicable to electric cars.

To address this issue, there has been known a vehicle air conditioning apparatus as applicable to electric cars. The vehicle air conditioning apparatus includes: a compressor configured to compress and discharge a refrigerant; a radiator provided in the vehicle interior and configure to release the heat from a refrigerant; a heat exchanger provided in the vehicle interior and configured to absorb the heat into the refrigerant; and an outdoor heat exchanger provided outside the vehicle interior and configured to release the heat from or absorb the heat into the refrigerant. This vehicle air conditioning apparatus performs: a heating operation by releasing the heat from the refrigerant discharged from the compressor in the radiator and absorbing the heat into the refrigerant in the outdoor heat exchanger; a heating and dehumidifying operation by releasing the heat from the refrigerant discharged from the compressor in the radiator and absorbing the heat into the refrigerant in the heat exchanger and the outdoor heat exchanger, or at least in the heat exchanger; a cooling operation by releasing the heat from the refrigerant discharged from the compressor in the outdoor heat exchanger and absorbing the heat into the refrigerant in the heat exchanger; and a cooling and dehumidifying operation by releasing the heat from the refrigerant discharged from the compressor in the radiator and the outdoor heat exchanger and absorbing the heat into the refrigerant in the heat exchanger (see, for example, Patent Literature 2).

Moreover, conventionally, as a sort of apparatus, there has been known a vehicle air conditioning apparatus that includes a compressor configured to compress and discharge refrigerant; a radiator provided in the vehicle interior and configured to release the heat from the refrigerant; a heat exchanger provided in the vehicle interior and configured to absorb the heat into the refrigerant; and an outdoor heat exchanger provided outside the vehicle interior and configured to release the heat from or absorb the heat into the refrigerant (see, for example, Patent Literature 1).

In addition, there has been known a vehicle air conditioning apparatus that performs a heating operation by releasing the heat from a refrigerant discharged from the compressor in the radiator and absorbing the heat into the refrigerant in the outdoor heat exchanger; and a heating and dehumidifying operation by releasing the heat from the refrigerant discharged from the compressor in the radiator and absorbing the heat into part of the refrigerant in the heat exchanger while absorbing the heat into the remaining refrigerant in the outdoor heat exchanger.

CITATION LIST

Patent Literature

PTL1: Japanese Patent Application Laid-Open No. 2000-25446
PTL2: Japanese Patent Application Laid-Open No. HEI06-278451

SUMMARY OF INVENTION

Technical Problem

With such a vehicle air conditioning apparatus, during the heating and dehumidifying operation, the refrigerant releases the heat in the radiator, and absorbs the heat from the outdoor air in the outdoor heat exchanger. Therefore, when the outdoor air temperature is low, the evaporating temperature of the refrigerant drops in the outdoor heat exchanger. By this, the evaporating temperature of the refrigerant also drops in the heat exchanger, so that a frost is likely to be formed on the heat exchanger. It makes difficult to control the temperature and humidity in the vehicle interior.

It is therefore an object of the present invention to provide a vehicle air conditioning apparatus that can prevent a frost from being formed on the heat exchanger under the condition that the temperature of the outdoor air is low.

The electric car consumes electric power for driving the vehicle during the operation of the vehicle air conditioning apparatus. Therefore, if the heating and dehumidifying operation continues for a long time, which particularly uses a lot of electricity among the operations of the vehicle air conditioning apparatus, the ratio of the power consumption for the operation of the vehicle air conditioning apparatus increases. As a result, the mileage of the vehicle is likely to drop.

It is therefore an object of the present invention to provide a vehicle air conditioning apparatus that prevents the mileage of the vehicle from dropping while continue to perform air conditioning operation in the vehicle interior.

During a heating operation of the vehicle air conditioning apparatus, it is required to control the quantity of the heat released in the radiator. Meanwhile, during a heating and dehumidifying operation, it is required to control the quantity of the heat released in the radiator and the quantity of the heat absorbed in the heat exchanger. In order to control the quantity of the heat released in the radiator during a heating operation, and control the quantity of the heat released in the radiator and the heat absorbed in the heat exchanger, it is required to secure an appropriate quantity of the heat absorbed in the outdoor heat exchanger. However, the vehicle air conditioning apparatus employs a capillary tube that cannot adjust the opening of a refrigerant flow passage as means for decompressing the refrigerant flowing into the outdoor heat exchanger. Therefore, with the vehicle air conditioning apparatus, it is difficult to acquire an appropriate quantity of the heat absorbed in the outdoor heat exchanger. It makes difficult to control the quantity of the heat released in the radiator during a heating operation, and also difficult to control the quantity of the heat released in the radiator and the quantity of the heat absorbed in the heat exchanger during a heating and dehumidifying operation.

It is therefore an object of the present invention to provide a vehicle air conditioning apparatus that can acquire an appropriate quantity of the heat released in the radiator during a heating operation, and also acquire an appropriate quantity of the heat released in the radiator and an appropriate quantity of the heat absorbed in the heat exchanger during a heating and dehumidifying operation.

Solution to Problem

In order to achieve the above described objects, the vehicle air conditioning apparatus according to the present invention includes: a compressor configured to compress and discharge a refrigerant; a radiator provided in a vehicle interior and configured to release heat from the refrigerant; a heat exchanger provided in the vehicle interior and configured to absorb the heat into the refrigerant; and an outdoor heat exchanger provided outside the vehicle interior and configured to release the heat from or absorb the heat into the refrigerant, the vehicle air conditioning apparatus performing: a cooling operation to release the heat from the refrigerant discharged from the compressor in the outdoor heat exchanger, to decompress the refrigerant by an expansion part, and to absorb the heat into the refrigerant in the heat exchanger; a cooling and dehumidifying operation to release the heat from the refrigerant discharged from the compressor in the radiator and the outdoor heat exchanger, to decompress the refrigerant by the expansion part, and to absorb the heat into the refrigerant in the heat exchanger; a heating operation to release the heat from the refrigerant discharged from the compressor in the radiator, to decompress the refrigerant by the expansion part, and to absorb the heat into the refrigerant in the outdoor heat exchanger; and a heating and dehumidifying operation to release the heat from the refrigerant discharged from the compressor in the radiator, to decompress part of the refrigerant by the expansion part, and to absorb the heat into the refrigerant in the heat exchanger while decompressing a remaining refrigerant by the expansion part and then absorbing the heat into the refrigerant in the outdoor heat exchanger, the vehicle air conditioning apparatus further comprising: a flow regulating valve provided in a refrigerant flow passage to flow the refrigerant into the heat exchanger and configured to regulate an amount of the refrigerant flowing through the refrigerant flow passage; an evaporating temperature detection part configured to detect an evaporating temperature of the refrigerant in the heat exchanger; and a flow control part configured to reduce the amount of the refrigerant flowing into the heat exchanger by using the flow regulating valve, when the evaporating temperature detected by the evaporating temperature detection part is a predetermined temperature or lower during the heating and dehumidifying operation.

By this means, it is possible to reduce the amount of the refrigerant flowing into the heat exchanger when the evaporating temperature of the refrigerant is a predetermined temperature or lower in the heat exchanger, and therefore to prevent a frost from being formed on the heat exchanger.

In order to achieve the above described objects, the vehicle air conditioning apparatus according to the present invention includes: a compressor configured to compress and discharge a refrigerant; a radiator provided in a vehicle interior and configured to release heat from the refrigerant; a heat exchanger provided in the vehicle interior and configured to absorb the heat into the refrigerant; and an outdoor heat exchanger provided outside the vehicle interior and configured to release the heat from or absorb the heat into the refrigerant, the vehicle air conditioning apparatus performing: a cooling operation to release the heat from the refrigerant discharged from the compressor in the outdoor heat exchanger, to decompress the refrigerant by an expansion part, and to absorb the heat into the refrigerant in the heat exchanger; a cooling and dehumidifying operation to release the heat from the refrigerant discharged from the compressor in the radiator and the outdoor heat exchanger, to decompress the refrigerant by the expansion part, and to absorb the heat into the refrigerant in the heat exchanger; a heating operation to release the heat from the refrigerant discharged from the compressor in the radiator, to decompress the refrigerant by the expansion part, and to absorb the heat into the refrigerant in the outdoor heat exchanger; and a heating and dehumidifying operation to release the heat from the refrigerant discharged from the compressor in the radiator, to decompress part of the refrigerant by the expansion part, and to absorb the heat into the refrigerant in the heat exchanger while decompressing a remaining refrigerant by the expansion part and then absorbing the heat into the refrigerant in the outdoor heat exchanger, the vehicle air conditioning apparatus further comprising: a bypass flow passage configured to communicate between part of a refrigerant flow passage connected to an input side of the heat exchanger into which the refrigerant flows and part of the refrigerant flow passage connected to an output side of the heat exchanger from which the refrigerant flows; a flow regulating valve configured to be able to adjust an amount of the refrigerant flowing through the bypass flow passage; an evaporating temperature detection part configure to detect an evaporating temperature of the refrigerant in the heat exchanger; and a refrigerant flow control part configured to increase the amount of the refrigerant flowing through the bypass flow passage by using the flow adjusting valve, when the evaporating temperature detected by the evaporating temperature detection part is a predetermined temperature or lower during the heating and dehumidifying operation.

By this means, it is possible to increase the amount of the refrigerant flowing through the bypass flow passage, and therefore reduce the amount of the refrigerant flowing into the heat exchanger. As a result, it is possible to prevent a frost from being formed on the heat exchanger.

In order to achieve the above described objects, the vehicle air conditioning apparatus according to the present invention includes: a compressor configured to compress and discharge a refrigerant; a radiator provided in a vehicle interior and configured to release heat from the refrigerant; a heat exchanger provided in the vehicle interior and configured to absorb the heat into the refrigerant; and an outdoor heat exchanger provided outside the vehicle interior and configured to release the heat from or absorb the heat into the refrigerant, the vehicle air conditioning apparatus performing: a cooling operation to release the heat from the refrigerant discharged from the compressor in the outdoor heat exchanger, to decompress the refrigerant by an expansion part, and to absorb the heat into the refrigerant in the heat exchanger; a cooling and dehumidifying operation to release the heat from the refrigerant discharged from the compressor in the radiator and the outdoor heat exchanger, to decompress the refrigerant by the expansion part, and to absorb the heat into the refrigerant in the heat exchanger; a heating operation to release the heat from the refrigerant discharged from the compressor in the radiator, to decompress the refrigerant by the expansion part, and to absorb the heat into the refrigerant in the outdoor heat exchanger; and a heating and dehumidifying operation to release the heat from the refrigerant discharged from the compressor in the radiator, to decompress part of the refrigerant by the expansion part, and to absorb the heat into the refrigerant in the heat exchanger while decompressing a remaining refrigerant by the expansion part and then absorbing the heat into the refrigerant in the outdoor heat exchanger, the vehicle air conditioning apparatus further comprising: a flow regulating valve provided in a refrigerant flow passage to flow the refrigerant into the outdoor heat exchanger and configured to regulate an amount of the refrigerant flowing through the refrigerant flow passage; an evaporating temperature detection part configured to detect an evaporating temperature of the refrigerant in the heat exchanger; and a refrigerant flow control part configured to increase the amount of the refrigerant flowing into the outdoor heat exchanger by using the flow regulating valve, when the evaporating temperature detected by the evaporating temperature detection part is a predetermined temperature or lower during the heating and dehumidifying operation.

By this means, it is possible to reduce the amount of the refrigerant flowing into the heat exchanger when the evaporating temperature of the heat exchanger is a predetermined temperature or lower in the heat exchanger, and therefore to prevent a frost from being formed on the heat exchanger.

In order to achieve the above described objects, the vehicle air conditioning apparatus according to the present invention includes: a compressor configured to compress and discharge a refrigerant; a radiator provided in a vehicle interior and configured to release heat from the refrigerant; a heat exchanger provided in the vehicle interior and configured to absorb the heat into the refrigerant; and an outdoor heat exchanger provided outside the vehicle interior and configured to release the heat from or absorb the heat into the refrigerant, the vehicle air conditioning apparatus performing: a cooling operation to release the heat from the refrigerant discharged from the compressor in the outdoor heat exchanger, to decompress the refrigerant by an expansion part, and to absorb the heat into the refrigerant in the heat exchanger; a cooling and dehumidifying operation to release the heat from the refrigerant discharged from the compressor in the radiator and the outdoor heat exchanger, to decompress the refrigerant by the expansion part, and to absorb the heat into the refrigerant in the heat exchanger; a heating operation to release the heat from the refrigerant discharged from the compressor in the radiator, to decompress the refrigerant by the expansion part, and to absorb the heat into the refrigerant in the outdoor heat exchanger; and a heating and dehumidifying operation to release the heat from the refrigerant discharged from the compressor in the radiator, to decompress part of the refrigerant by the expansion part, and to absorb the heat into the refrigerant in the heat exchanger while decompressing a remaining refrigerant by the expansion part and then absorbing the heat into the refrigerant in the outdoor heat exchanger, the vehicle air conditioning apparatus further comprising: an on-off valve provided in a refrigerant flow passage to flow the refrigerant into the outdoor heat exchanger and configured to be able to open and close the refrigerant flow passage; an evaporating temperature detection part configured to detect an evaporating temperature of the refrigerant in the heat exchanger; and a refrigerant flow restricting part configured to restrict the refrigerant from flowing into the outdoor heat exchanger by using the on-off valve, when the evaporating temperature detected by the evaporating temperature detection part is a predetermined temperature or lower during the heating and dehumidifying operation.

By this means, when the evaporating temperature of the refrigerant absorbing the heat is a predetermined temperature or lower, it is possible to prevent the refrigerant from absorbing the heat in the outdoor heat exchanger but allow the refrigerant to absorb the heat only in the heat exchanger. Therefore, it is possible to prevent the evaporating temperature of the refrigerant from reducing in the heat exchanger, and consequently to prevent a frost from being formed on the heat exchanger.

In order to achieve the above described objects, the vehicle air conditioning apparatus according to the present invention includes: a compressor configured to compress and discharge a refrigerant; a radiator provided in a vehicle interior and configured to release heat from the refrigerant; a heat exchanger provided in the vehicle interior and configured to absorb the heat into the refrigerant; and an outdoor heat exchanger provided outside the vehicle interior and configured to release the heat from or absorb the heat into the refrigerant, the vehicle air conditioning apparatus performing: a cooling operation to release the heat from the refrigerant discharged from the compressor in the outdoor heat exchanger, to decompress the refrigerant by an expansion part, and to absorb the heat into the refrigerant in the heat exchanger; a cooling and dehumidifying operation to release the heat from the refrigerant discharged from the compressor in the radiator and the outdoor heat exchanger, to decompress the refrigerant by the expansion part, and to absorb the heat into the refrigerant in the heat exchanger; a heating operation to release the heat from the refrigerant discharged from the compressor in the radiator, to decompress the refrigerant by the expansion part, and to absorb the heat into the refrigerant in the outdoor heat exchanger; and a heating and dehumidifying operation to release the heat from the refrigerant discharged from the compressor in the radiator, to decompress the refrigerant by the expansion part, and to absorb the heat into the refrigerant in the heat exchanger and the outdoor heat exchanger, or at least in the heat exchanger, the vehicle air conditioning apparatus further comprising: an environmental condition detection part configured to be able to detect at least one of environmental conditions including an outdoor air temperature, an indoor air temperature, an indoor air humidity and an amount of insolation; a fog determination part configured to be able to determine whether or not conditions are met to fog window glasses of the vehicle interior; and a mode switching part configured to be able to switch a switching mode among a first switching mode, a second switching mode and a third switching mode, wherein: the first switching mode switches an operation among the heating operation, the heating and dehumidifying operation, the cooling operation and the cooling and dehumidifying operation, based on the environment conditions detected by the environmental condition detection part; the second switching mode switches the operation among the heating operation, the heating and dehumidifying operation, the cooling operation, and the cooling and dehumidifying operation, and performs the heating and dehumidifying operation only when the fog detection part determines that the conditions are met to fog the window glasses; and the third switching mode switches the operation among the heating operation, the cooling operation and the cooling and dehumidifying operation, based on the environmental conditions detected by the environmental condition detection part.

By this means, it is possible to switch the switching modes among the first switching mode, the second switching mode and the third switching mode with different power consumption. Therefore, a passenger can make a selection among the first, second and third switching modes.

In order to achieve the above described objects, the vehicle air conditioning apparatus according to the present invention includes: a compressor configured to compress and discharge a refrigerant; a radiator provided in a vehicle interior and configured to release heat from the refrigerant; a heat exchanger provided in the vehicle interior and configured to absorb the heat into the refrigerant; and an outdoor heat exchanger provided outside the vehicle interior and configured to release the heat from or absorb the heat into the refrigerant, the vehicle air conditioning apparatus performing: a heating operation to release the heat from the refrigerant discharged from the compressor in the radiator and to absorb the heat into the refrigerant in the outdoor heat exchanger; and a heating and dehumidifying operation to release the heat from the refrigerant discharged from the compressor in the radiator and to absorb the heat into part of the refrigerant in the heat exchanger while absorbing the heat into a remaining refrigerant in the outdoor heat exchanger, the vehicle air conditioning apparatus further comprising: an expansion valve provided in a refrigerant flow passage to flow the refrigerant into the outdoor heat exchanger, the expansion valve having an adjustable opening; a heat exchanger temperature sensor configured to detect an evaporating temperature of the refrigerant in the heat exchanger; a target superheat setting part configured to set a predetermined value as a target superheat during the heating operation, and to set a value calculated based on the evaporating temperature detected by the heat exchanger temperature sensor and a target temperature of the heat exchanger, as the target superheat during the heating and dehumidifying operation; a superheat calculation part configured to calculate a superheat of the refrigerant flowing out of the outdoor heat exchanger; and a valve opening control part configured to control the opening of the expansion valve based on the target superheat set by the target superheat setting part and the superheat calculated by the superheat calculation part.

By this means, it is possible to maintain the optimum superheat of the refrigerant flowing out of the outdoor heat exchanger, and therefore to possible to optimize the quantity of heat to be absorbed into the refrigerant in the outdoor heat exchanger.

Advantageous Effect of the Invention

According to the present invention, it is possible to prevent a frost from being formed on the heat exchanger, and therefore to maintain the dehumidifying capability during a heating and dehumidifying operation under a cool environment.

According to the present invention, a passenger of the vehicle can select the switching mode among the first switching mode, the second switching mode and the third switching mode. Therefore, by selecting the second switching mode or the third switching mode which has lower power consumption than the first switching mode, it is possible to prevent the mileage of the vehicle from dropping while continuing to perform air conditioning operation in the vehicle interior.

According to the present invention, it is possible to acquire an optimum quantity of the heat absorbed into the refrigerant in the outdoor heat exchanger, and therefore to maintain the temperature and the humidity of the vehicle interior in good conditions.

DESCRIPTION OF EMBODIMENTS

FIG. 1 to FIG. 8 show Embodiment 1 of the present invention.

Figure 1:
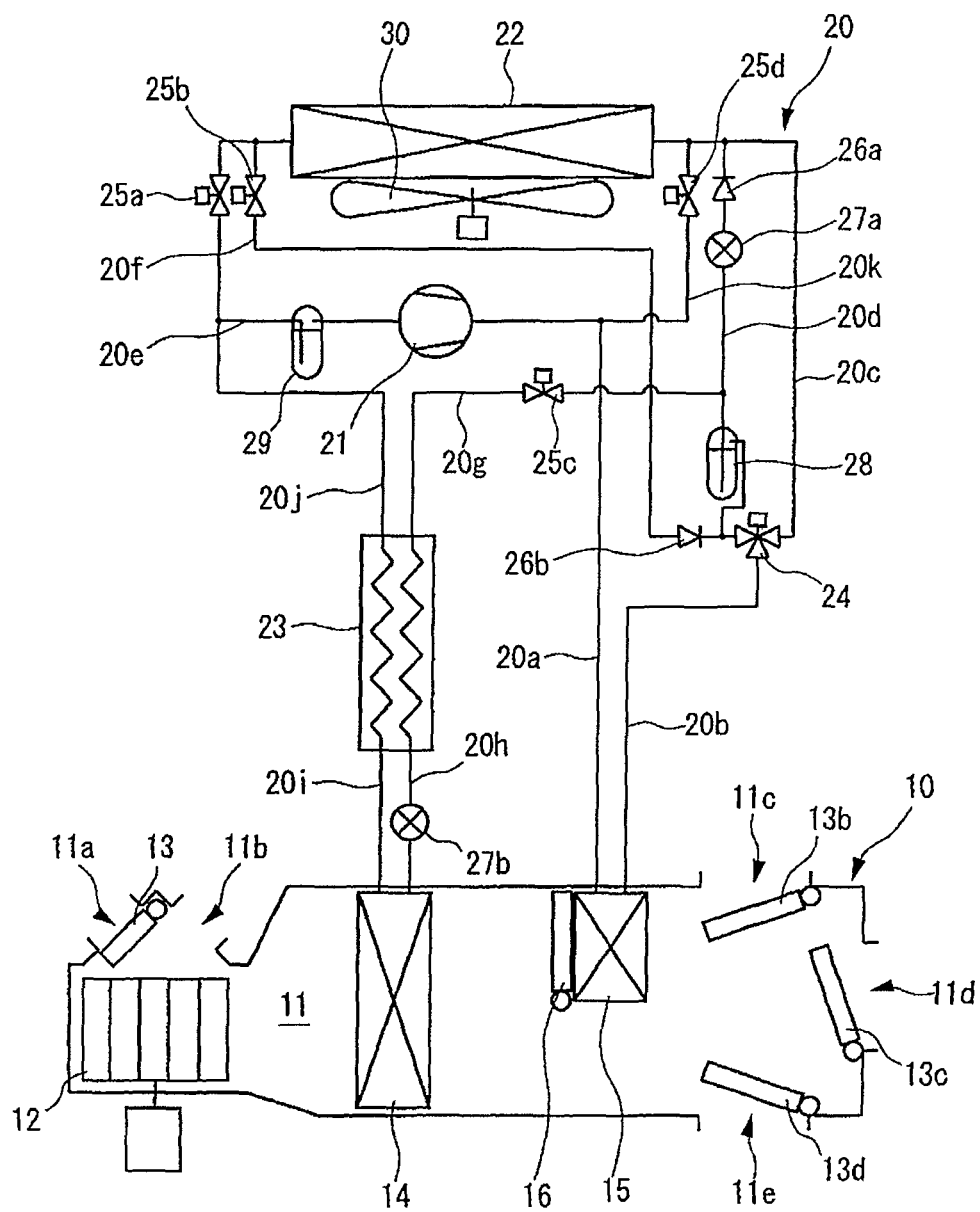
FIG. 1 is a schematic view showing a vehicle air conditioning apparatus according to Embodiment 1 of the present invention.

As shown in FIG. 1, the vehicle air conditioning apparatus according to the present invention includes an air conditioning unit 10 provided in the vehicle interior, and a refrigerant circuit 20 formed across the vehicle interior and the outdoor.

The air conditioning unit 10 includes an air flow passage 11 that allows the air to be supplied to the vehicle interior to pass through. An outdoor air inlet 11a and an indoor air inlet 11b are provided in the first end side of the air flow passage 11. The outdoor air inlet 11a is configured to allow the outdoor air to flow into the air flow passage 11, and the indoor air inlet 11b is configured to allow the indoor air to flow into the air flow passage 11. Meanwhile, a foot outlet 11c, a vent outlet 11d and a defroster outlet 11e are provided in the second end side of the air flow passage 11. The foot outlet 11c is configured to allow the air flowing through the air flow passage 11 to blow to the feet of the passengers in the vehicle. The vent outlet 11d is configured to allow the air flowing through the air flow passage 11 to blow to the upper bodies of the passengers in the vehicle. The defroster outlet 11e is configured to allow the air flowing through the air flow passage 11 to blow to the interior surface of the front window.

An indoor fan 12 such as a sirocco fan configured to allow the air to flow through the air flow passage 11 from end to end is provided in the first end side of the air flow passage 11. This indoor fan 12 is driven by the electric motor 12a.

Also, in the first end side of the air flow passage 11, an inlet switching damper 13 configured to open one of the outdoor air inlet 11a and the indoor air inlet 11b and to close the other. This inlet switching damper 13 is driven by the electric motor 13a. Meanwhile, when the inlet switching damper 13 closes the indoor air inlet 11b and opens the outdoor air inlet 11a, the mode is switched to an indoor air circulation mode in which the air flows from the indoor air inlet 11b into the air flow passage 11. Meanwhile, when the inlet switching damper 13 closes the outdoor air inlet 11a and opens the indoor air inlet 11b, the mode is switched to an indoor air circulation mode in which the air flows from the indoor air inlet 11b into the air flow passage 11. Moreover, when the inlet switching damper 13 is placed between the outdoor air inlet 11a and the indoor air inlet 11b and the outdoor air inlet 11a and the indoor air inlet 11b open, the mode is switched to a two-way mode in which the air flows from both the outdoor air inlet 11a and the indoor air inlet 11b into the air flow passage 11 according to the opening ratio of the outdoor air inlet 11a and the indoor air inlet 11b.

Outlet switching dampers 13b, 13c and 13d configured to open and close the foot outlet 11c, the vent outlet 11d and the defroster outlet 11e are provided in the foot outlet 11c, the vent outlet 11d and the defroster outlet 11e, respectively, in the second side of the air flow passage 11. These outlet switching dampers 13b, 13c and 13d are configured to move together by a linkage (not shown) and are opened and closed by the electric motor 13e. Here, when the outlet switching dampers 13b, 13c and 13d open the foot outlet 11c, close the vent outlet 11d and slightly open the defroster outlet 11e, most of the air flowing through the air flow passage 11 blows out of the foot outlet 11c and the remaining air blows out of the defroster outlet 11e. This mode is referred to as "foot mode." Meanwhile, when the outlet switching dampers 13b, 13c and 13d close the foot outlet 11c and the defroster outlet 11e, and open the vent outlet 11d, all the air flowing through the air flow passage 11 blows out of the vent outlet 11d. This mode is referred to as "vent mode." In addition, when the outlet switching dampers 13b, 13c and 13d open the foot outlet 11c and the vent outlet 11d, and close the defroster outlet 11e, the air flowing through the air flow passage 11 blows out of the foot outlet 11c and the vent outlet 11d. This mode is referred to as "bi-level mode." Moreover, when the outlet switching dampers 13b, 13c and 13d close the foot outlet 11c and the vent outlet 11d, and open the defroster outlet 11e, the air flowing through the air flow passage 11 blows out of the defroster outlet 11e. This mode is referred to as "defroster mode." Furthermore, when the outlet switching dampers 13b, 13c and 13d close the vent outlet 11d and open the foot outlet 11c and the defroster outlet 11e, the air flowing through the air flow passage 11 blows out of the foot outlet 11c and the defroster outlet 11e. This mode is referred to as "defroster-foot mode." Here, in the bi-level mode, the air flow passage 11, the foot outlet 11c, the vent outlet 11d, and a heat exchanger and a radiator which will be described later, are arranged and configured such that the temperature of the air blowing out of the foot outlet 11c is higher than the temperature of the air blowing out of the vent outlet 11d.

A heat exchanger 14 is provided in the air flow passage 11 in the downstream of the air flow from the indoor fan 12. The heat exchanger 14 is configured to cool and dehumidify the air flowing through the air flow passage 11. In addition, a radiator 15 is provided in the air flow passage 11 in the downstream of the air flow from the heat exchanger 14. The radiator 15 is configured to heat the air flowing through the air flow passage 11. The heat exchanger 14 and the radiator 15 are heat exchangers, each of which is constituted by fins and tubes and that is configured to perform a heat exchange between the refrigerant flowing through the refrigerant circuit 20 and the air flowing through the air flow passage 11.

An air mix damper 16 is provided between the heat exchanger 14 and the radiator 15 in the air flow passage 11 and is configured to control the percentage of the air to be heated, which is flowing through the air flow passage 11. The air mix damper 16 is driven by the electric motor 16a. When the air mix damper 16 is disposed in the air flow passage 11 in the upstream of the radiator 15, the percentage of the air subjected to a heat exchange in the radiator 15 is reduced. Meanwhile, when the air mix damper 16 is moved to a position other than the radiator 15 in the air flow passage 11, the percentage of the air subjected to a heat exchange is increased. In the air flow passage 11, when the air mix damper 16 closes the upstream side of the radiator 15 and opens the portion other than the radiator 15, the opening is 0%, and, on the other hand, when the air mix damper 16 opens the upstream side of the radiator 15 and closes the portion other than the radiator 15, the opening is 100%.

The refrigerant circuit 20 includes: the heat exchanger 14; the radiator 15; a compressor 21 configured to compress refrigerant; an outdoor heat exchanger 22 configured to perform a heat exchange between the refrigerant and the outdoor air; an indoor heat exchanger 23 configured to perform a heat exchange between the refrigerant flowing out of the radiator 15 or having flowed through the outdoor heat exchanger 22 and the refrigerant flowing out of the heat exchanger 14; a three-way valve 24 configured to switch the passage of the refrigerant; first to fourth solenoid valves 25a to 25d; first and second check valves 26a and 26b; first and second expansion valves 27a and 27b configured to decompress the flowing refrigerant; a receiver tank 28 configured to accumulate an extra refrigerant; and an accumulator 29 configured to separate between refrigerant vapor and refrigerant liquid to prevent the refrigerant liquid from being sucked into the compressor 21. These components are connected to each other by a copper pipe or an aluminum pipe. The compressor 21 and the outdoor heat exchanger 22 are disposed outside the vehicle interior. The compressor 21 is driven by the electric motor 21a. The outdoor heat exchanger 22 is provided with an outdoor fan 30 configured to perform heat exchange between the outdoor air and the refrigerant when the vehicle stops. The outdoor fan 30 is driven by the electric motor 30a.

To be more specific, input side of the radiator 15 into which the refrigerant flows is connected to the delivery side of the compressor 21 from which the refrigerant is discharged to form the refrigerant flow passage 20a. In addition, the input side of the radiator 15 into which the refrigerant flows is connected to the output side of the heat exchanger 15 from which the refrigerant is discharged, thereby to form the refrigerant flow passage 20b. The three-way valve 24 is provided in the refrigerant flow passage 20b. The one side of the three-way valve 24 from which the refrigerant is discharged and another side from which the refrigerant is discharged are parallel to one another and are connected to the input side of the outdoor heat exchanger 22 into which the refrigerant flows, and thereby to form the refrigerant flow passages 20c and 20d. The receiver tank 28, the first expansion valve 27a and the first check valve 26a are provided in the refrigerant flow passage 20d in the order from the upstream of the flow of the refrigerant. The suction side of the compressor 21 into which the refrigerant is sucked and the part of the refrigerant flow passage 20d between the three-way valve 24 and the receiver tank 28 are connected in parallel to the output side of the outdoor heat exchanger 22 from which the refrigerant is discharged, thereby to form the refrigerant flow passage 20e and 20f. The first solenoid valve 25a and the accumulator 29 are provided in the refrigerant flow passage 20e in the order from the upstream of the flow of the refrigerant. The second solenoid valve 25b and the second check valve 26b are provided in the refrigerant flow passage 20f in the order from the upstream of the flow of the refrigerant. The input side of the indoor heat exchanger 23 into which a high-pressure refrigerant flows is connected to the part of the refrigerant flow passage 20d between the receiver tank 28 and the first expansion valve 27a, thereby to form the refrigerant flow passage 20g. The third solenoid valve 25c is provided in the refrigerant flow passage 20g. The input side of the heat exchanger 14 into which the refrigerant flow is connected to the output side of the indoor heat exchanger 23 from which the high-pressure refrigerant is discharged, thereby to provide the refrigerant flow passage 20h. The second expansion valve 27b is provided in the refrigerant flow passage 20h. The input side of the indoor heat exchanger 23 into which a low-pressure refrigerant flows is connected to the output side of the heat exchanger 14 from which the refrigerant is discharged, thereby to form the refrigerant flow passage 20i. The part of the refrigerant flow passage 20e between the first solenoid valve 25a and the accumulator 29 is connected to the output side of the indoor heat exchanger 23 from which the low-pressure refrigerant is discharged, thereby to provide the refrigerant flow passage 20j. The input side of the outdoor heat exchanger 22 into which the refrigerant flows is connected to the refrigerant flow passage 20a, thereby to provide the refrigerant flow passage 20k. The fourth solenoid valve 25d is provided in the refrigerant flow passage 20k.

Moreover, the vehicle air conditioning apparatus also includes a controller 40 that controls the temperature and the humidity of the vehicle interior to be the preset temperature and humidity.

The controller 40 includes a CPU, a ROM and a RAM. In the controller, upon receiving an input signal from a device connected to the input side, the CPU reads the program stored in the ROM according to the input signal, stores the state detected by the input signal on the RAM and transmits an output signal to a device connected to the output side.

Figure 2:
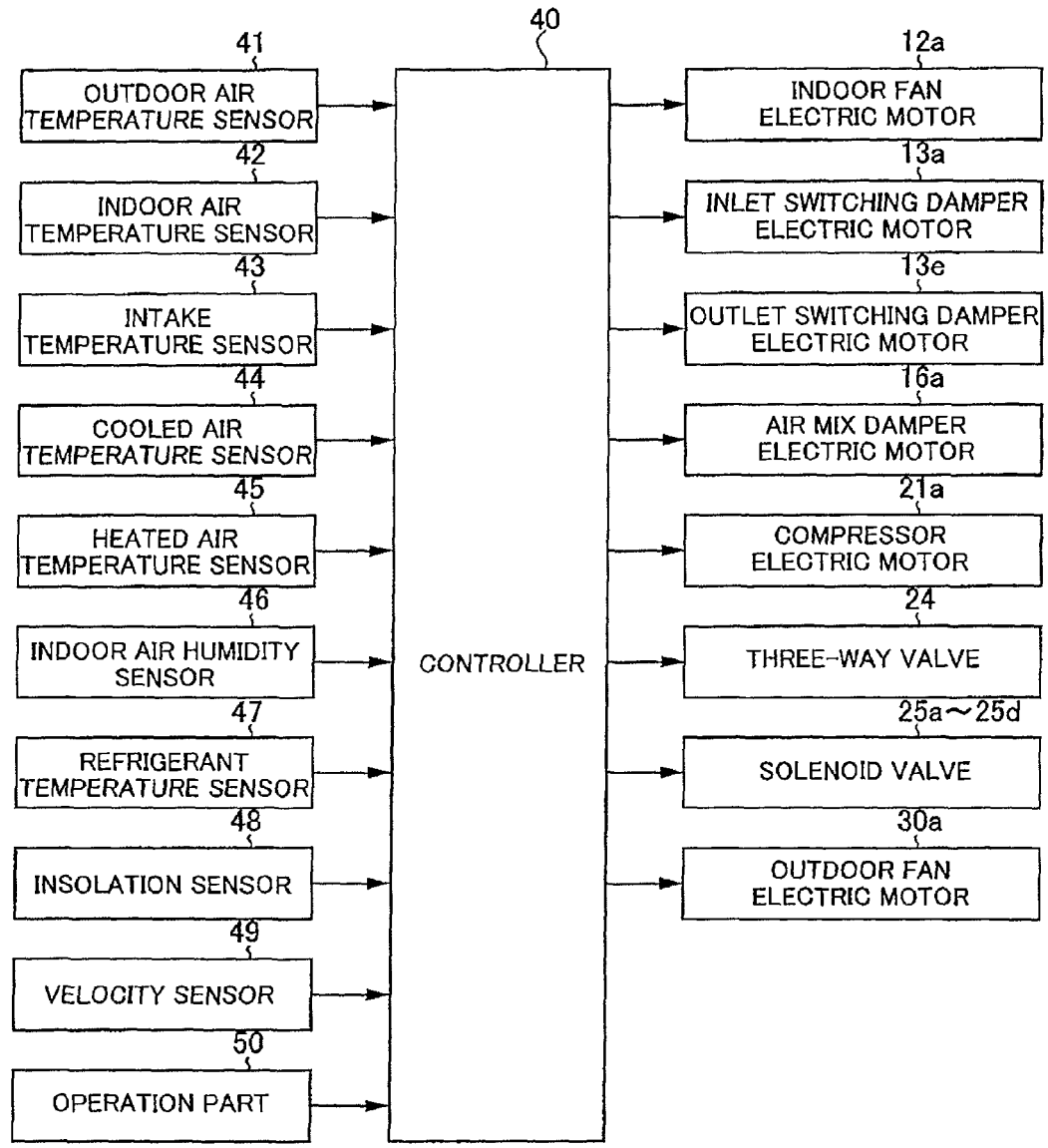
FIG. 2 is a block diagram showing a control system.

As shown in FIG. 2, an electric motor 12a for driving the indoor fan 12; an electric motor 13a for driving the inlet switching damper 13; an electric motor 13e for driving the outlet switching dampers 13b, 13c and 13d; an electric motor 16a for driving the air mix damper 16; an electric motor 21a for driving the compressor 21; the three-way valve 24; the first to fourth solenoid valves 25a to 25d; and an electric motor 30a for driving the outdoor fan 30 are connected to the output side of the controller 40.

As shown in FIG. 2, an outdoor air temperature sensor 41 configured to detect temperature Tam outside the vehicle interior; an indoor air temperature sensor 42 configured to detect indoor air temperature Tr; an intake temperature sensor 43 configured to detect temperature Ti of the air flowing into the air flow passage 11; a cooled air temperature sensor 44 configured to detect temperature Te of the air having been cooled in the heat exchanger 14; a heated air temperature sensor 45 configured to detect temperature Tc of the air having been heated in the radiator 15; an indoor air humidity sensor 46 configured to detect indoor air humidity Rh; a refrigerant temperature sensor 47 configured to detect temperature Thex of the refrigerant after the heat exchange in the outdoor heat exchanger 22; an insolation sensor 48 such as a photo sensor configured to detect amount of insolation Ts; a velocity sensor 49 configured to detect velocity V of the vehicle; and an operation part 50 configured to set modes regarding to target setting temperature Tset and the switching of the operation are connected to the input side of the controller 40.

The vehicle air conditioning apparatus having the above-described configuration performs cooling operation, cooling and dehumidifying operation, heating operation, heating and dehumidifying operation, and defrost operation. Now, each operation will be explained.

Figure 3:
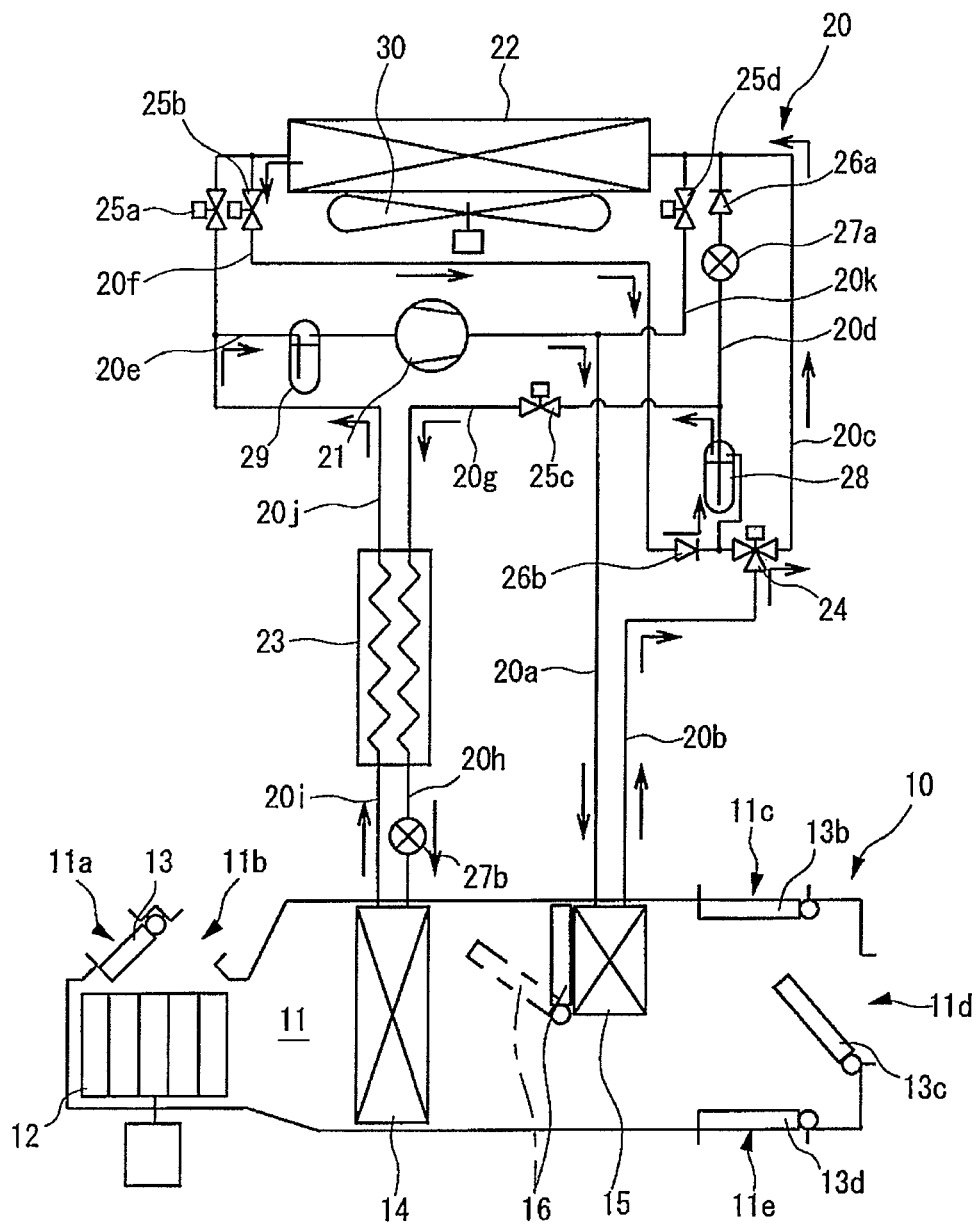
FIG. 3 is a schematic view showing the vehicle air conditioning apparatus performing a cooling operation and a cooling and dehumidifying operation.

First, the cooling operation will be explained. In the refrigerant circuit 20, the flow passage of three-way valve 24 is set to the refrigerant flow passage 20c side; the second and third solenoid valves 25b and 25c open and the first and fourth solenoid valves 25a and 25d are closed; and the compressor 21 is operated. By this means, as shown in FIG. 3, the refrigerant discharged from the compressor 21 flows through in this order: the refrigerant flow passage 20a; the radiator 15; the refrigerant flow passages 20d and 20c; the outdoor heat exchanger 22, the refrigerant flow passages 20f, 20d and 20g; the high-pressure side of the indoor heat exchanger 23; the refrigerant flow passage 20h; the heat exchanger 14; the refrigerant flow passage 20i; the low-pressure side of the indoor heat exchanger 23; and the refrigerant flow passages 20j and 20e, and is sucked into the compressor 21. The refrigerant flowing through the refrigerant circuit 20 releases the heat in the outdoor heat exchanger 22 and absorbs the heat in the heat exchanger 14. When the air mix damper 16 is open during a cooling and dehumidifying operation, the refrigerant releases the heat also in the radiator 15.

In this case, in the air conditioning unit 10 during the cooling operation, the indoor fan 12 is operated to flow the air through the air flow passage 11, and the air is subjected to a heat exchange with the refrigerant in the heat exchanger 14 and cooled. The temperature of the cooled air becomes the target air-blowing temperature TAO of the air to blow out of the outlets 11c, 11d and 11e in order to set the temperature of the vehicle interior to a preset temperature. Then, the air at the temperature TAO blows to the vehicle interior.

Meanwhile, in the air conditioning unit 10 during the cooling and dehumidifying operation, the indoor fan 12 is operated to flow the air through the air flow passage 11, and the air is subjected to a heat exchange with the refrigerant which absorbs the heat in the heat exchanger 14, and therefore is cooled and dehumidified. The air having been dehumidified in the heat exchanger 14 is subjected to a heat exchange with the refrigerant which releases the heat in the radiator 15, and therefore heated. As a result, the air at the target air-blowing temperature TAO blows to the vehicle interior.

Figure 4:
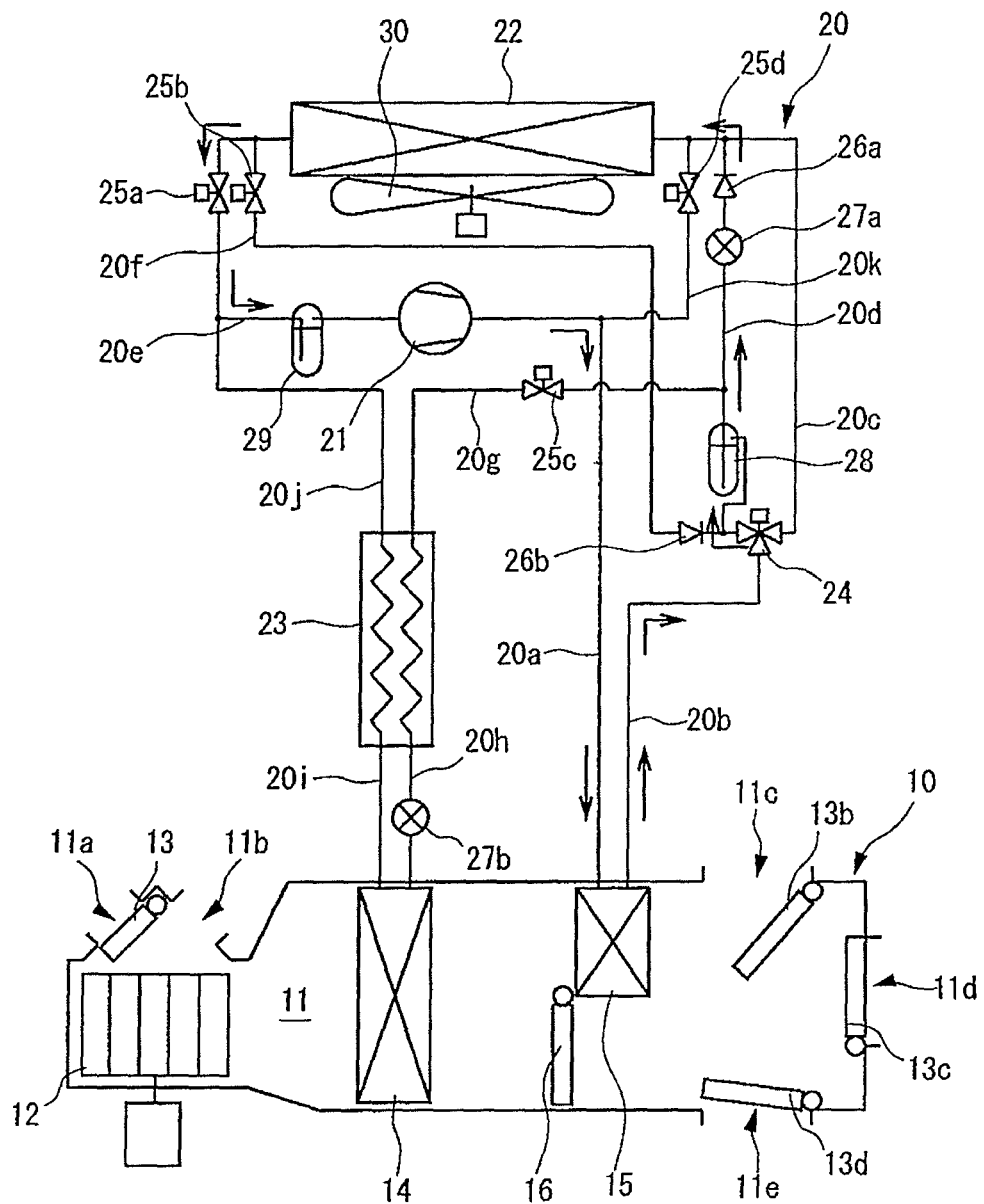
FIG. 4 is a schematic view showing the vehicle air conditioning apparatus performing a heating operation.

During a heating operation, in the refrigerant circuit 20, the flow passage of the three-way valve 24 is set to the refrigerant flow passage 20d side; the first solenoid valve 25a is opened and the second to fourth solenoid valves 25b to 25d are closed; and the compressor 21 is operated. By this means, as shown in FIG. 4, the refrigerant discharged from the compressor 21 flows through in this order: the refrigerant flow passage 20a; the radiator 15; the refrigerant flow passages 20b and 20d; the outdoor heat exchanger 22; and the refrigerant flow passage 20e, and is sucked into the compressor 21. The refrigerant flowing through the refrigerant circuit 20 releases the heat in the radiator 15 and absorbs the heat in the outdoor heat exchanger 22.

In this case, in the air conditioning unit 10, the indoor fan 12 is operated to flow the air through the air flow passage 11, and the flowing air is not subjected to a heat exchange with the refrigerant in the heat exchanger 14, but is subjected to a heat exchange with the refrigerant in the radiator 15 and therefore is heated. As a result, the air at the target air-blowing temperature TAO blows to the vehicle interior.

Figure 5:
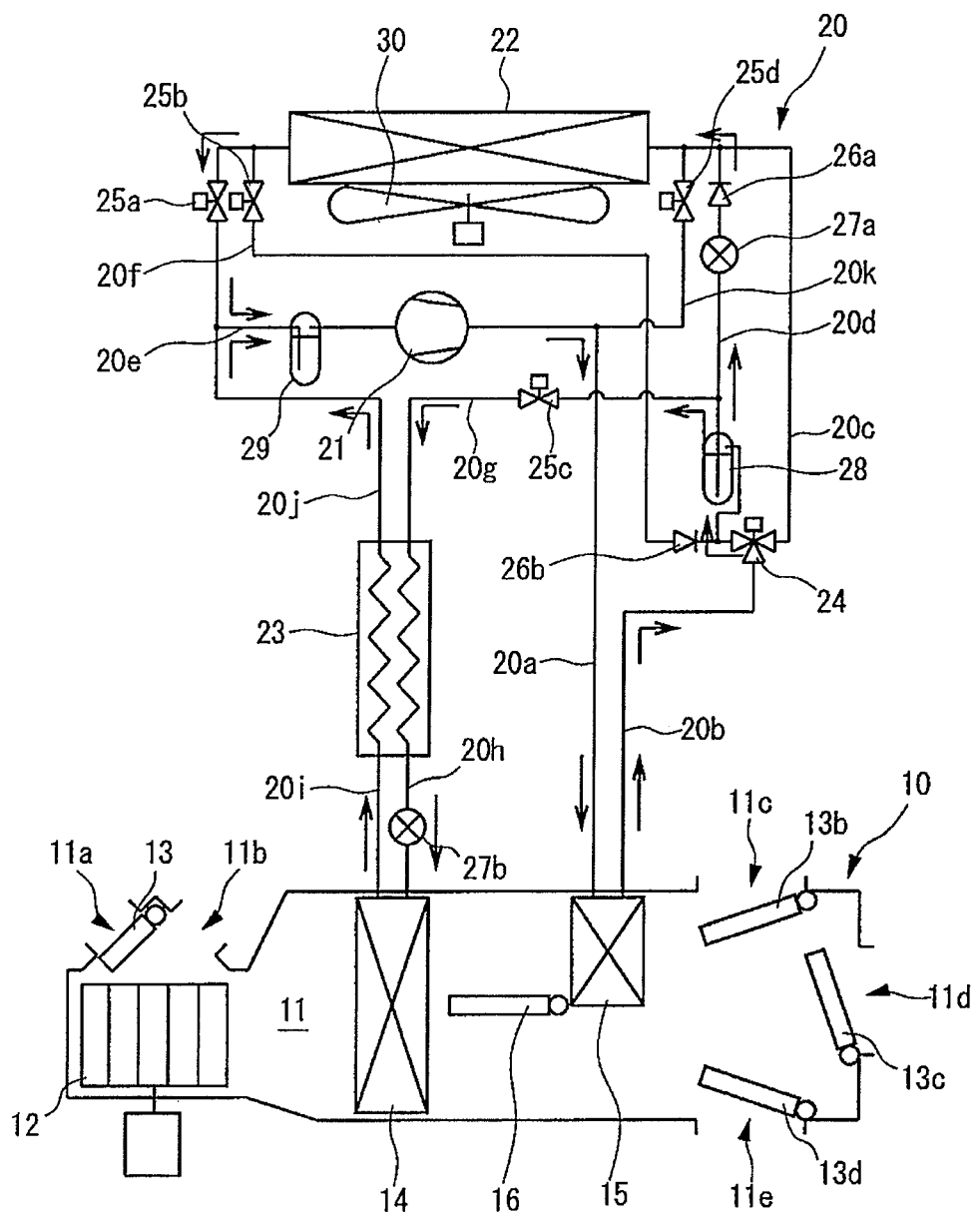
FIG. 5 is a schematic view showing the vehicle air conditioning apparatus performing a heating and dehumidifying operation.

Next, the heating and dehumidifying operation will be explained. In the refrigerant circuit 20, the flow passage of the three-way valve 24 is set to the refrigerant flow passage 20d side; the first and third solenoid valves 25a and 25c open and the second and fourth solenoid valves 25b and 25d are closed; and the compressor 21 is operated. By this means, as shown in FIG. 5, the refrigerant discharged from the compressor 21 flows through in this order: the refrigerant flow passage 20a; the radiator 15; and the refrigerant flow passages 20b and 20d. Part of the refrigerant flowing through the refrigerant flow passage 20d flows through in this order: the outdoor heat exchanger 22; and the refrigerant flow passage 20e, and is sucked into the compressor 21. Meanwhile, the remaining refrigerant flowing through the refrigerant flow passage 20d flows through in this order: the refrigerant flow passage 20g; the high-pressure side of the indoor heat exchanger 23; the refrigerant flow passage 20h; the heat exchanger 14; the refrigerant flow passage 20i; the low-pressure side of the indoor heat exchanger 23; and the refrigerant flow passages 20*j* and 20*e*, and is sucked into the compressor 21. The refrigerant flowing through the refrigerant circuit 20 releases the heat in the radiator 15 and absorbs the heat in the heat exchanger 14 and the outdoor heat exchanger 22.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified. All or part of the air having been dehumidified in the heat exchanger 14 is subjected to a heat exchange with the refrigerant in the radiator 15 and heated. As a result, the air at the target air-blowing temperature TAO blows to the vehicle interior.

Figure 6:
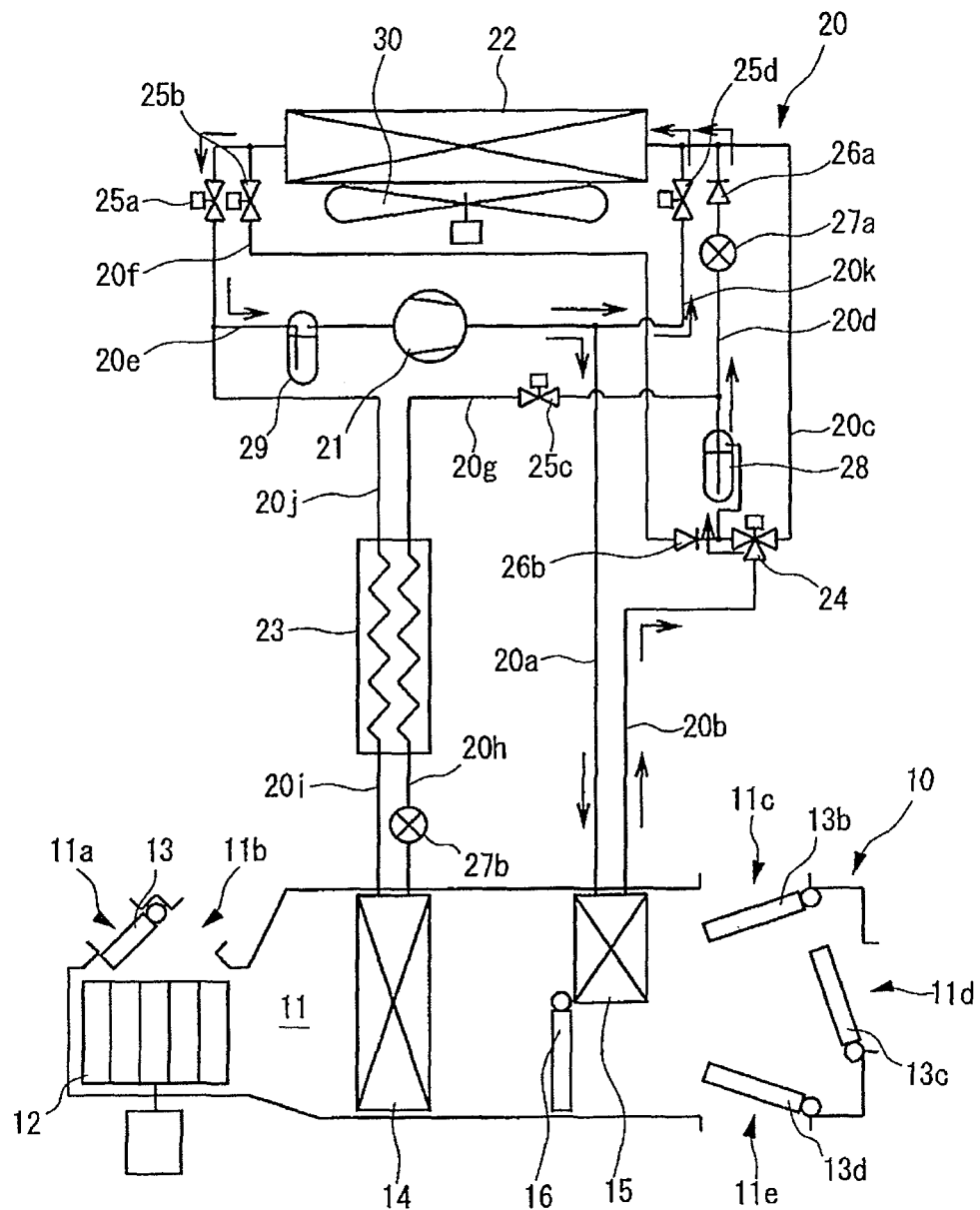
FIG. 6 is a schematic view showing the vehicle air conditioning apparatus performing a defrost operation.
Figure 7:
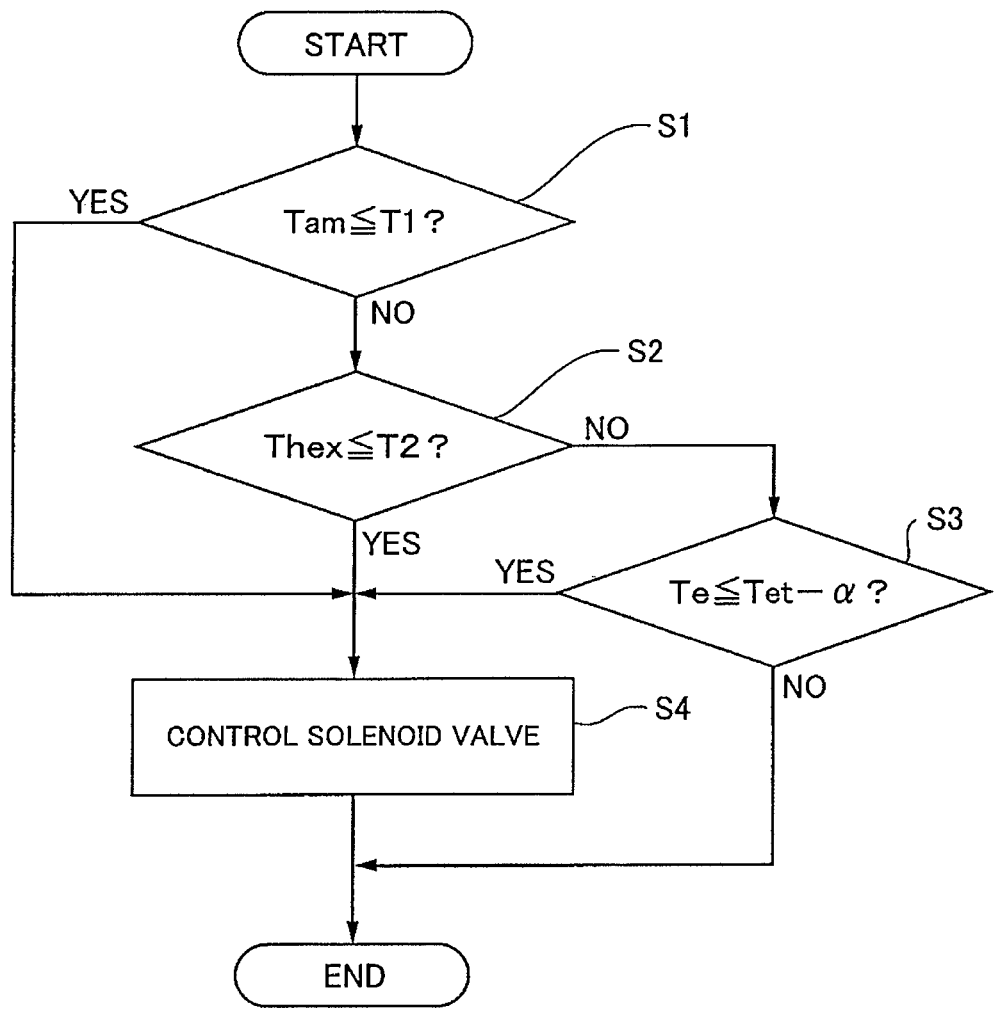
FIG. 7 is a flowchart showing a process to control the temperature of a heat exchanger.

Next, the defrost operation will be explained. In the refrigerant circuit 20, the flow passage of the three-way valve 24 is set to the refrigerant flow passage 20*d* side; the first and fourth solenoid valves 25*a* and 25*d* open and the second and third solenoid valves 25*b* and 25*c* are closed; and the compressor 21 is operated. By this means, as shown in FIG. 6, part of the refrigerant discharged from the compressor 21 flows through in this order: the refrigerant flow passage 20*a*; the radiator 15; the refrigerant flow passages 20*b* and 20*d*, and flows into the outdoor heat exchanger 22. Meanwhile, the remaining refrigerant discharged from the compressor 21 flows through the refrigerant flow passages 20*a* and 20*k* and flows into the outdoor heat exchanger 22. The refrigerant flowing out of the outdoor heat exchanger 22 flows through the refrigerant flow passage 20*e*, and is sucked into the compressor 21. The refrigerant flowing through the refrigerant circuit 20 releases the heat in the radiator 15, and at this time, absorbs the heat in the outdoor heat exchanger 22.

In this case, in the air conditioning unit 10, the indoor fan 12 is operated to flow the air through the air flow passage 11. The flowing air is not subjected to a heat exchange with the refrigerant in the heat exchanger 14, but is subjected to a heat exchange with the refrigerant which releases the heat in the radiator 15, and therefore is heated and then blows to the vehicle interior.

While the automatic switch of the operation part 50 is turned on, the controller 40 performs an operation switching control process to switch the operation among the cooling operation, the cooling and dehumidifying operation, the heating operation, the heating and dehumidifying operation, and the defrost operation, based on indoor and outdoor environmental conditions, such as temperature.

In each operation switched by the operation switching control process, the controller 40 switches the switching modes among the foot mode, the vent mode and the bi-level mode according to the target air-blowing temperature TAO. To be more specific, when the target air-blowing temperature TAO is high, for example, 40 degrees centigrade, the controller 40 sets the foot mode. Meanwhile, when the target air-blowing temperature TAO is low, for example, lower than 25 degrees centigrade, the controller 40 sets the vent mode. Moreover, when the target air-blowing temperature TAO is the temperature between the temperature for the foot mode and the temperature for the vent mode, the controller 40 sets the bi-level mode.

The controller 40 switches the mode of the outlets 11*c*, 11*d* and 11*e* by using the outlet switching dampers 13*b*, 13*c* and 13*d*, and controls the opening of the air mix damper 16 in order to set the temperature of the air blowing out of the outlets 11*c*, 11*d*, and 11*e* to the target air-blowing temperature TAO.

Here, when the outdoor air temperature Tam is low (e.g. 10 degrees centigrade or lower), the evaporating temperature of the refrigerant is low (e.g. 5 to 10 degrees centigrade) in the outdoor heat exchanger 22. In this case, the evaporating temperature of the refrigerant is also low (e.g. 0 to 5 degrees centigrade) in the heat exchanger 14, and therefore a frost is likely to be formed on the heat exchanger 14.

In order to prevent a frost from being formed on the heat exchanger 14 during the heating and dehumidifying operation, the controller 40 performs a process to control the temperature of the heat exchanger. Now, the operation of the controller 40 for this process will be explained with reference to the flowchart shown in FIG. 7.

(Step S1)

In step S1, the CPU determines whether or not the outdoor air temperature Tam is predetermined temperature T1 (e.g. 10 degrees centigrade) or lower. When determining that the temperature Tam is the predetermined temperature T1 or lower, the CPU moves the step to step S4. On the other hand, when determining that the temperature Tam is higher than the predetermined temperature T1, the CPU moves the step to step S2.

(Step S2)

In the step S2, the CPU determines whether or not temperature $T_{hex}$ of the refrigerant flowing out of the outdoor heat exchanger 22 is predetermined temperature T2 (e.g. 5 to 10 degrees centigrade) or lower. When determining that the temperature $T_{hex}$ is the predetermined temperature T2 or lower, the CPU moves the step to step S4. On the other hand, when determining that the temperature $T_{hex}$ is higher than the predetermined temperature T2, the CPU moves the step to step S3.

(Step S3)

In the step S3, the CPU determines whether or not temperature Te of the heat exchanger 14 is equal to or lower than temperature (Tet-α) obtained by reducing predetermined temperature α from target temperature Tet of the heat exchanger 14. When determining that the temperature Te is Tet-α or lower, the CPU moves the step to the step S4. On the other hand, when determining that the temperature Te is higher than Tet-α, the CPU ends the process to control the temperature of the heat exchanger. Here, the target temperature Tet is the dew point temperature of the air at the absolute humidity to prevent window glasses of the vehicle interior from being fogged up, and is calculated based on the outdoor air temperature Tam and the indoor air temperature Tr.

(Step S4)

Figure 8:
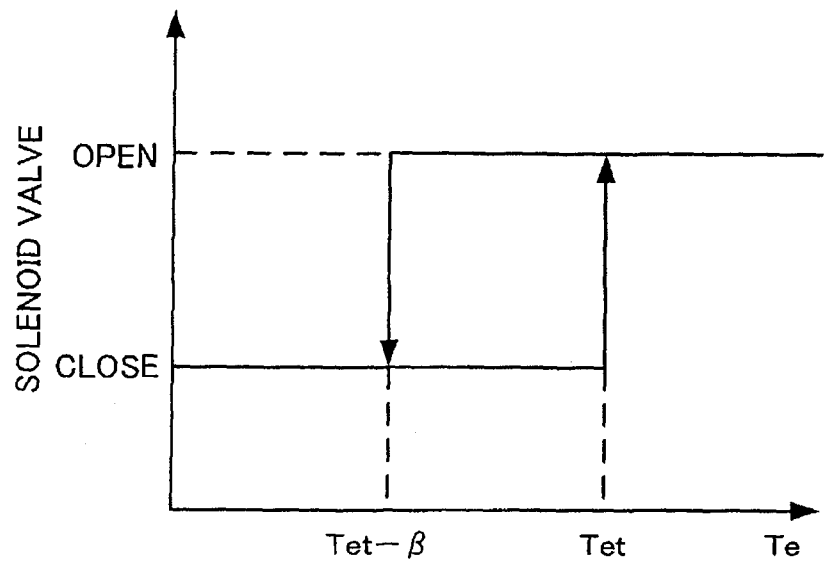
FIG. 8 is a drawing showing the relationship between the opening and closing of a solenoid valve and the temperature of the heat exchanger.

In the case in which the temperature Tam is the predetermined temperature T1 or lower in the step S1, in the case in which the temperature Thex is the predetermined temperature T2 or lower in the step S2, or in the case in which the temperature Te is Tet-α or lower in the step S3, the CPU controls to switch the opening and closing of the third solenoid valve 25*c*. To be more specific, the third solenoid valve 25*c* is closed when the temperature Te of the heat exchanger 14 is reduced from a temperature higher than the target temperature Tet of the heat exchanger 14 to temperature (Tet-β) obtained by reducing predetermined temperature β from the target temperature Tet as shown in FIG. 8. On the other hand, the third solenoid valve 25*c* is opened when the temperature Te of the heat exchanger 14 is increased from a temperature lower than Tet-β to the target temperature Tet.

In this way, with the vehicle air conditioning apparatus according to the present embodiment, during the heating and dehumidifying operation, the third solenoid valve 25*c* is closed in the case in which the outdoor air temperature Tam is the predetermined temperature T1 or lower, or in the case in which the temperature Thex of the refrigerant flowing out of the outdoor heat exchanger 22 is the predetermined temperature T2 or lower while the temperature Te detected by the cooled air temperature sensor 44 is Tet-β or lower. By this means, in a case in which a frost is likely to be formed on the heat exchanger 14 during the heating and dehumidifying operation, the flow of the refrigerant into the heat exchanger 14 is stopped. Therefore, it is possible to prevent a frost from being formed on the heat exchanger 14.

Here, with Embodiment 1, as means for stopping the flow of the refrigerant into the heat exchanger 14, a configuration has been described where the third solenoid valve 25c provided in the refrigerant flow passage 20g is closed. However, it is by no means limiting. Another configuration is possible where the flow of the refrigerant into the heat exchanger 14 is restricted by using, for example, an electronic expansion valve with the adjustable opening as the second expansion valve 27b provided in the refrigerant flow passage 20h connected to the input side of the heat exchanger 14 into which the refrigerant flows.

In addition, with Embodiment 1, a configuration has been described as an example where the flow of the refrigerant into the heat exchanger 14 is blocked by closing the third solenoid valve 25c. However, another configuration is possible where an amount of the refrigerant flowing into the heat exchanger 14 is reduced to prevent a frost from being formed on the heat exchanger 14.

FIGS. 9 to 12 show Embodiment 2 of the present invention. Here, the same components are assigned the same reference numerals as in Embodiment 1.

Figure 9:
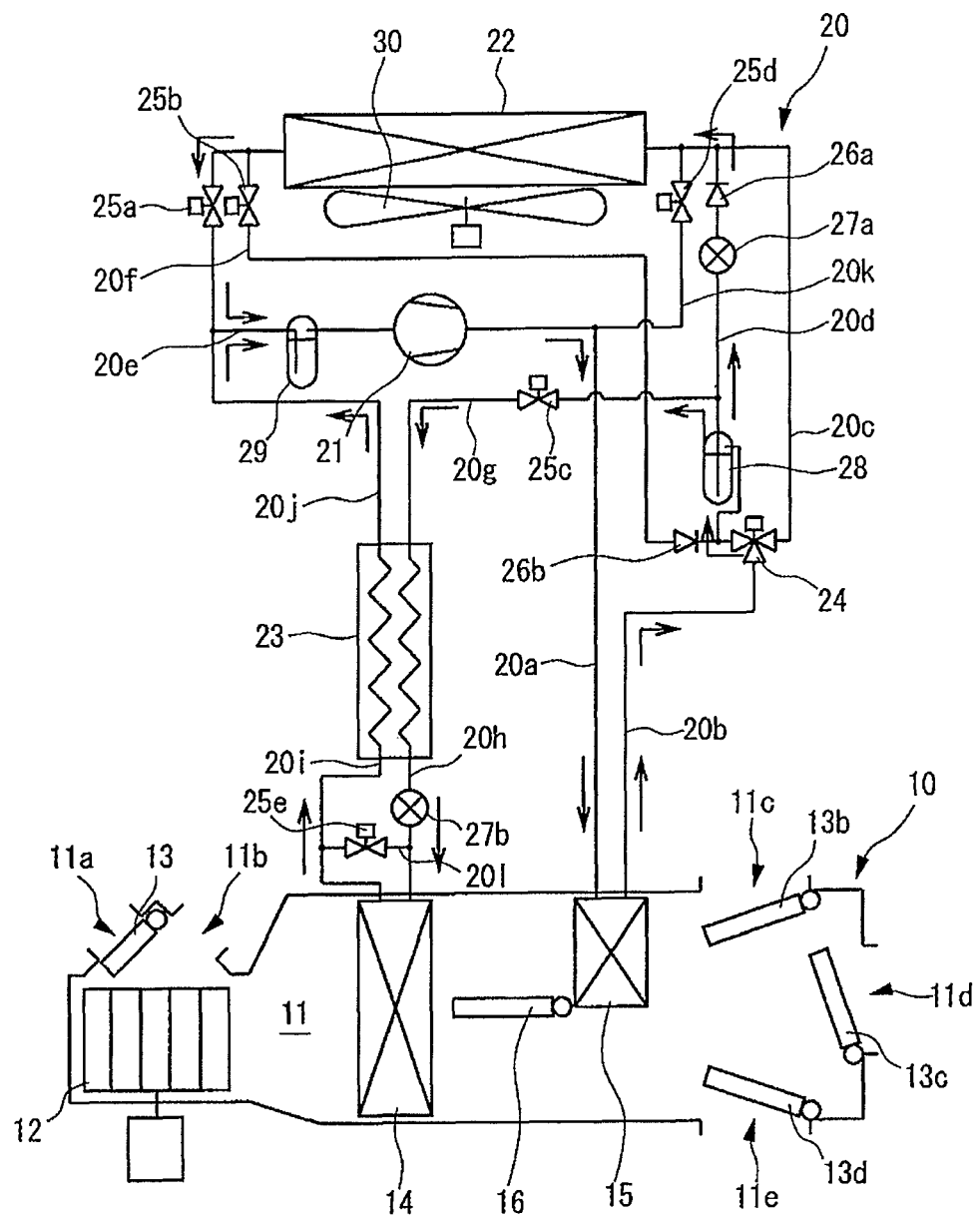
FIG. 9 is a schematic view showing the vehicle air conditioning apparatus according to Embodiment 2 of the present invention.
Figure 10:
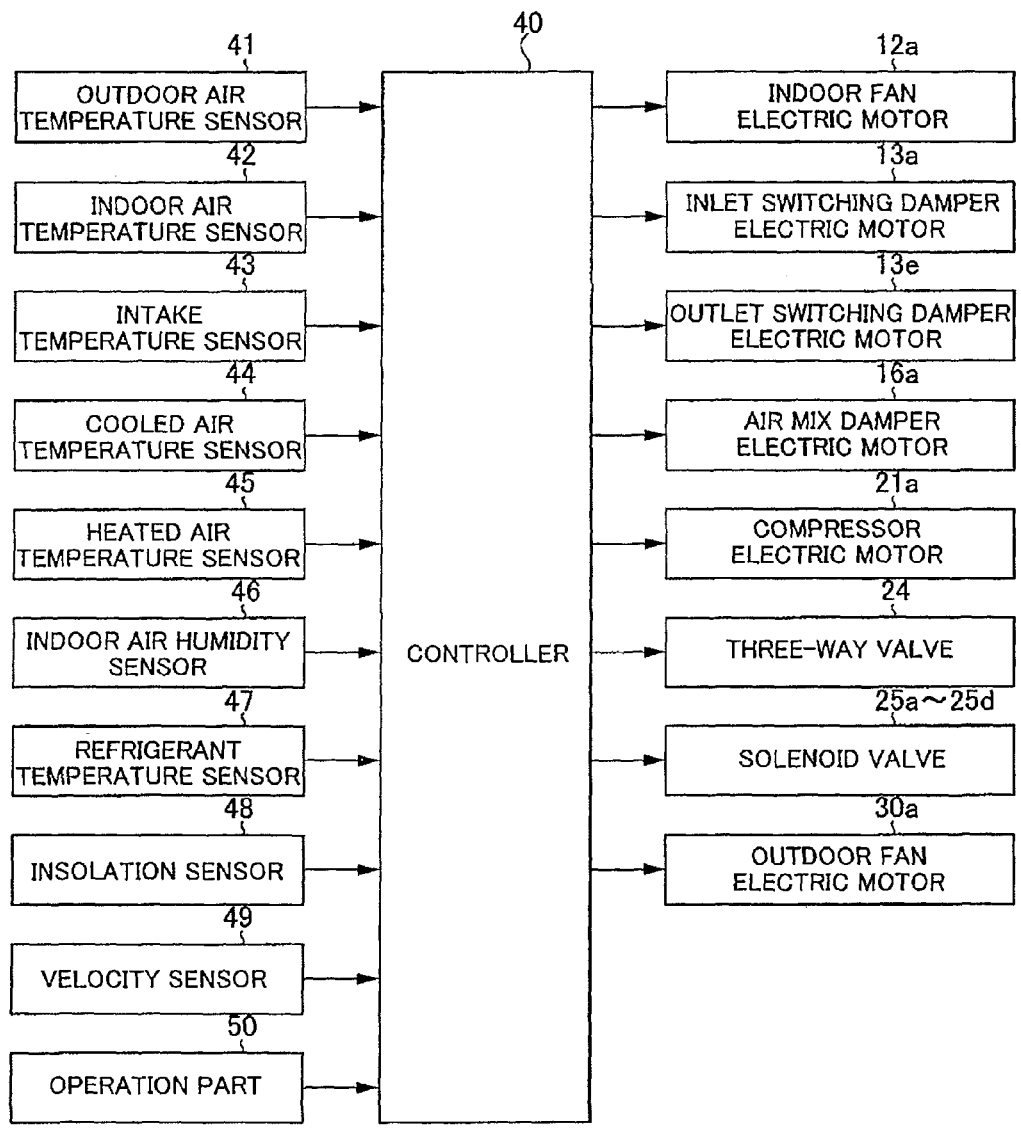
FIG. 10 is a block diagram showing a control system.
Figure 11:
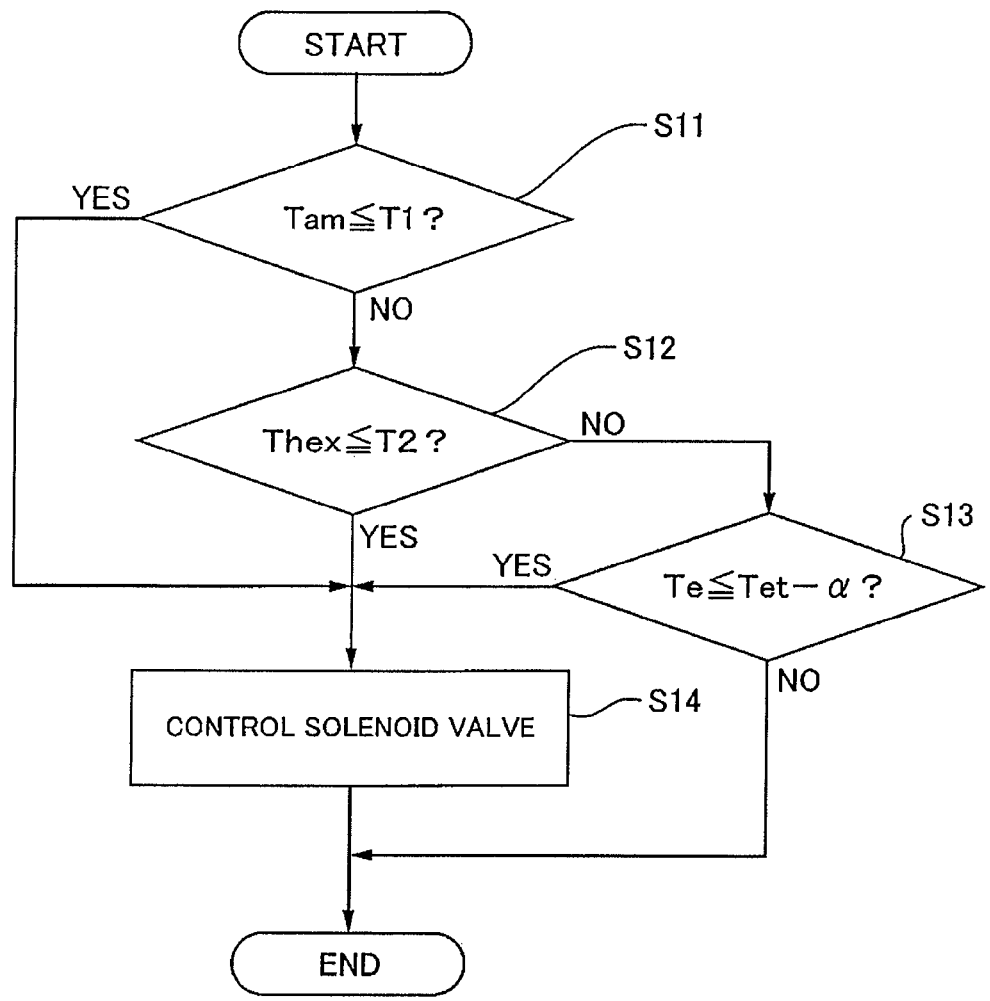
FIG. 11 is a flowchart showing a process to control the temperature of the heat exchanger.

As shown in FIG. 9, the vehicle air conditioning apparatus according to the present embodiment has a bypass flow passage 20l provided to communicate between the refrigerant flow passage 20i and part of the refrigerant flow passage 20h in the downstream side of the second expansion valve 27b in the refrigerant flow direction. This bypass flow passage 20l is configured to allow the refrigerant flowing through the refrigerant passage 20h to flow into the refrigerant flow passage 20i, bypassing the heat exchanger 14. In addition, a bypass solenoid vale 25e configured to be able to open and close the refrigerant flow passage is provided in the bypass flow passage 20l. As shown in FIG. 10, the bypass solenoid valve 25e is connected to the output side of the controller 40.

In the vehicle air conditioning apparatus having the above-described configuration, during the heating and dehumidifying operation, the controller 40 performs a process to control the temperature of the heat exchanger 14 to prevent a frost from being formed on the heat exchanger 14 when the outdoor air temperature Tam is low. Now, the operation of the controller 40 in this process will be explained with reference to the flowchart shown in FIG. 11.

(Step S11)

In step S11, the CPU determines whether or not the outdoor air temperature Tam is the predetermined temperature T1 (e.g. 10 degrees centigrade) or lower. When determining that the temperature Tam is the predetermined temperature T1 or lower, the CPU moves the step to step S14. On the other hand, when determining that the temperature Tam is higher than the predetermined temperature T1, the CPU moves the step to step S12.

(Step S12)

In the step S12, the CPU determines whether or not temperature Thex of the refrigerant flowing out of the outdoor heat exchanger 22 is the predetermined temperature T2 (e.g. 5 to 10 degrees centigrade) or lower. When determining that the temperature Thex is the predetermined temperature T2 or lower, the CPU moves the step to the step S14. On the other hand, when determining that the temperature Thex is higher than the predetermined temperature T2, the CPU moves the step to step S13.

(Step S3)

In the step S13, the CPU determines whether or not the temperature Te of the heat exchanger 14 is equal to or lower than the temperature (Tet-α) obtained by reducing the predetermined temperature α from the target temperature Tet of the heat exchanger 14. When determining that the temperature Te is Tet-α or lower, the CPU moves the step to the step S14. On the other hand, when determining that the temperature Te is higher than Tet-α, the CPU ends the process to control the temperature of the heat exchanger.

(Step S14)

Figure 12:
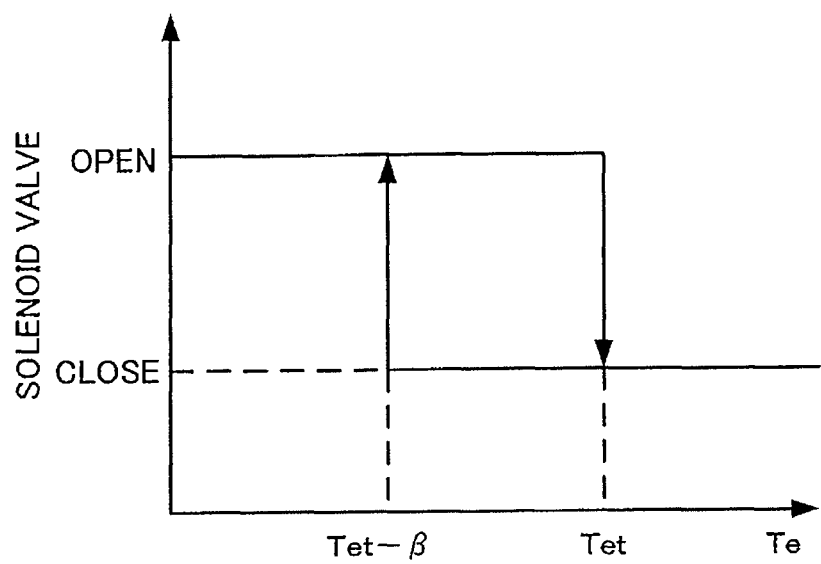
FIG. 12 is a drawing showing the relationship between the opening and closing of the solenoid valve and the temperature of the heat exchanger.

In the case in which the temperature Tam is the predetermined temperature T1 or lower in the step S11, in the case in which the temperature Thex is the predetermined temperature T2 or lower in the step S12, or in the case in which the temperature Te is Tet-α or lower in the step S13, the CPU controls to switch the opening and closing of the bypass solenoid valve 25e. To be more specific, the bypass solenoid valve 25e is opened when the temperature Te of the heat exchanger 14 is reduced from a temperature higher than the target temperature Tet of the heat exchanger 14 to the temperature (Tet-β) obtained by reducing the predetermined temperature β from the target temperature Tet as shown in FIG. 12. On the other hand, the bypass solenoid valve 25e is closed when the temperature Te of the heat exchanger 14 is increased from a temperature lower than Tet-β to the target temperature Tet.

In this way, with the vehicle air conditioning apparatus according to the present embodiment, during the heating and dehumidifying operation, the bypass solenoid valve 25e is opened in the case in which the outdoor air temperature Tam is the predetermined temperature T1 or lower, or in the case in which the temperature $T_{hex}$ of the refrigerant flowing out of the outdoor heat exchanger 22 is the predetermined temperature T2 or lower while the temperature Te detected by the cooled air temperature sensor 44 is Tet-β or lower. By this means, in a case in which a frost is likely to be formed on the heat exchanger 14 during the heating and dehumidifying operation, the refrigerant is made to flow into the bypass flow passage 20l to reduce an amount of the refrigerant flowing into the heat exchanger 14. Therefore, it is possible to prevent a frost from being formed on the heat exchanger 14.

In addition, the bypass flow passage 20l is provided to communicate between the refrigerant flow passage 20i and the part of the refrigerant flow passage 20h in the downstream side of the second expansion valve 27h in the refrigerant flow direction. By this means, it is possible to flow the refrigerant having been decompressed in the second expansion valve 27b through the bypass flow passage 20l. Therefore it is possible to reduce the impact at the time the bypass solenoid valve 25e is opened and closed.

Here, with Embodiments 1 and 2, the configuration has been described where when a frost is likely to be formed on the heat exchanger 14, the control to allow or stop the flow of the refrigerant through the refrigerant flow passages 20g and 20h is made by switching between the opening and the closing of the third solenoid valve 25c or the bypass solenoid valve 25e. However, it is by no means limiting. Another configuration is possible where, for example, a valve with the adjustable opening is employed, instead of the third solenoid valve 25c and the bypass solenoid valve 25e, in order to control an amount of the refrigerant flowing through the refrigerant flow passages 20g and 20k. By this means, it is possible to prevent a frost from being formed on the heat exchanger 14 in the same way as in Embodiments 1 and 2. Further another configuration is possible where a solenoid valve as a valve with the adjustable opening is employed to change the ratio of the time in which the valve is open to a predetermined time, in order to change the flow rate of the refrigerant.

Figure 13:
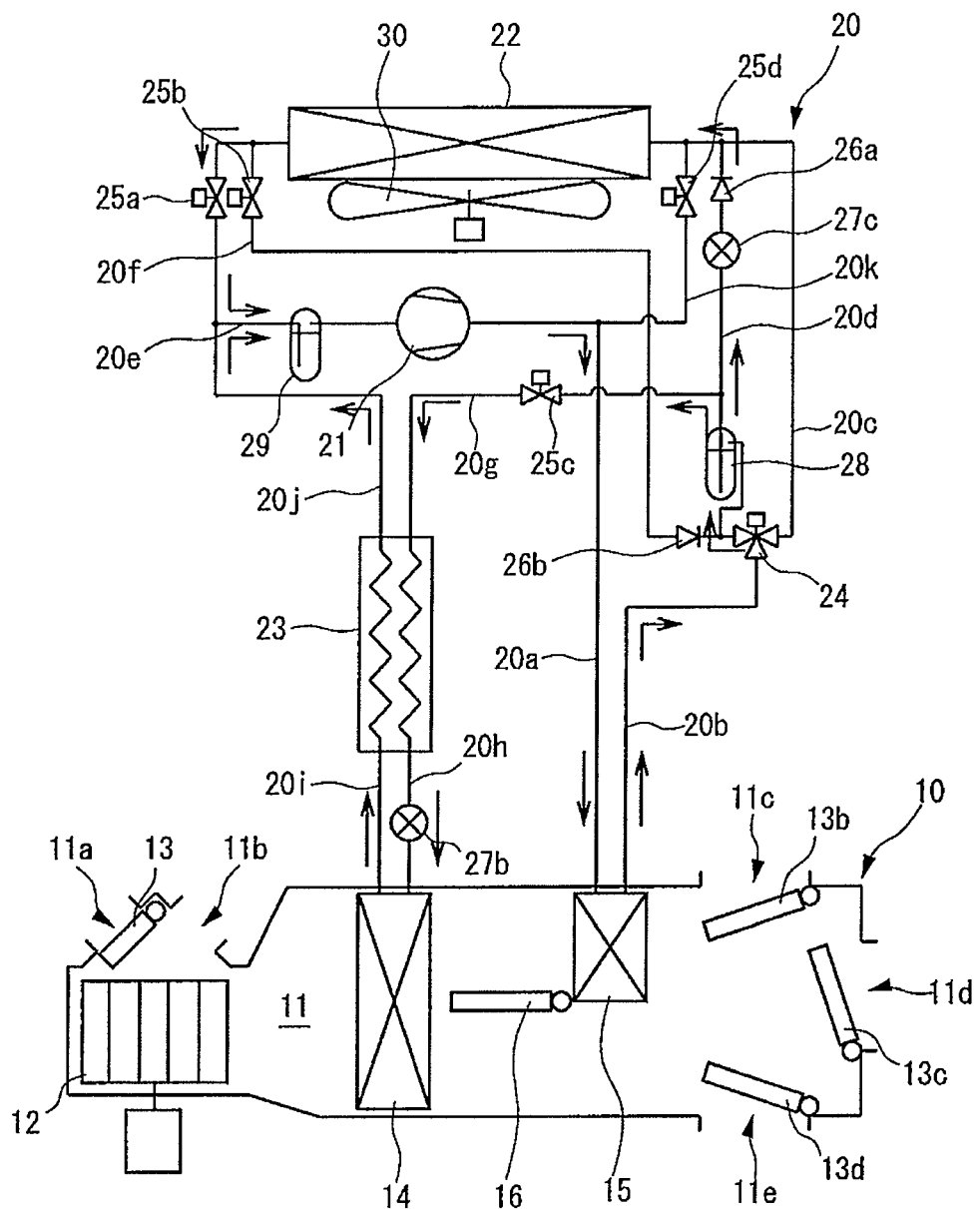
FIG. 13 is a schematic view showing the vehicle air conditioning apparatus according to Embodiment 3 of the present invention.
Figure 14:
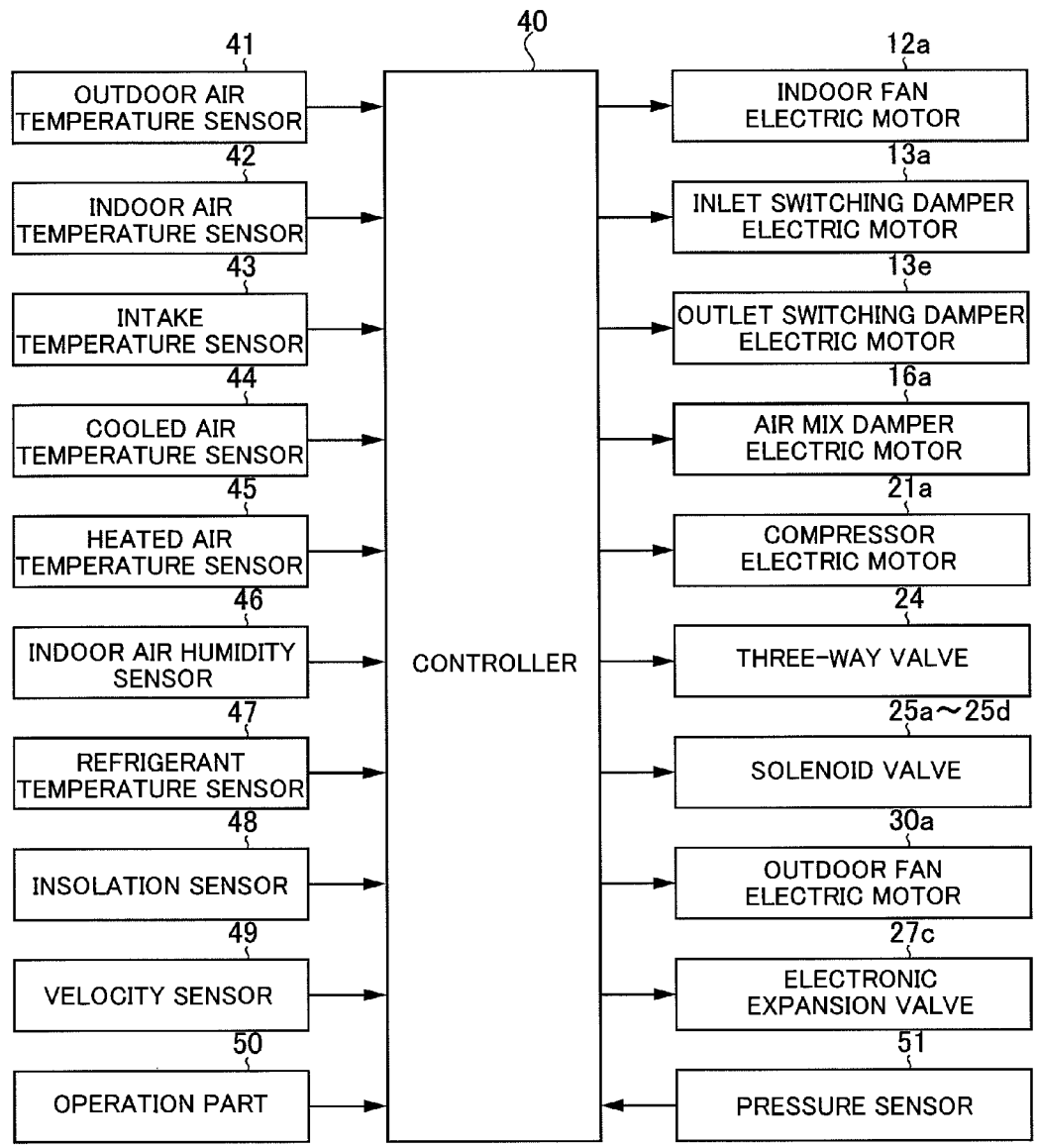
FIG. 14 is a block diagram showing a control system.
Figure 15:
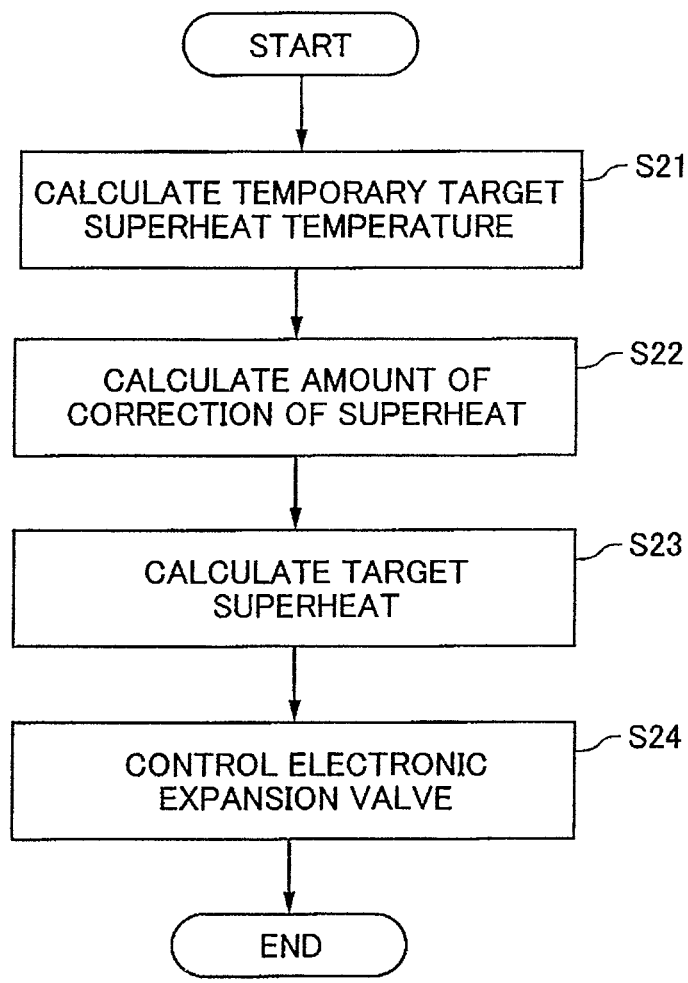
FIG. 15 is a flowchart showing a process to control the temperature of the heat exchanger.

FIGS. 13 to 15 show Embodiment 3 of the present invention. Here, the same components are assigned the same reference numerals as in the above-described embodiments.

In the vehicle air conditioning apparatus according to the present embodiment, an electronic expansion valve 27c with the adjustable opening is employed instead of the first expansion valve in the refrigerant circuit 20 of Embodiment 1. In addition, the outdoor heat exchanger 22 is provided with a pressure sensor 51 to detect pressure P of the refrigerant in the outdoor heat exchanger 22. As shown in FIG. 14, the electronic expansion valve 27c and the pressure sensor 51 are connected to the output side and the input side of the controller 40, respectively.

In the vehicle air conditioning apparatus having the above-described configuration, during the heating and dehumidifying operation, the controller 40 performs a process to control the temperature of the heat exchanger to prevent a frost from being formed on the heat exchanger 14 when the outdoor air temperature Tam is low. Now, the operation of the controller 40 in this process will be explained with reference to the flowchart shown in FIG. 15.

(Step 21)

In step S21, the CPU calculates a temporary target superheat SHtp based on the outdoor air temperature Tam and the target temperature Tet of the heat exchanger 14, and moves the step to step S22.

(Step S22)

In the step S22, the CPU calculate amount of correction H of the superheat based on the temperature Te and the target temperature Tet of the heat exchanger 14. To be more specific, the CPU determines whether or not the temperature Te of the heat exchanger 14 is equal to or lower than temperature (Tet-$\gamma$) obtained by reducing predetermined temperature $\gamma$ from the target temperature Tet. When the temperature Te is Tet-$\gamma$ or lower, the CPU determines amount of correction H (H<0) to reduce the target superheat SHt. On the other hand, the temperature Te is higher than Tet-$\gamma$, the CPU determines amount of correction H (H>0) to increase the target superheat SHt.

(Step S23)

In step S23, the CPU calculates target superheat SHt by adding the amount of correction H to the temporary target superheat SHtp.

(Step S24)

In step S24, the CPU calculates the opening of the electronic expansion valve 27c based on the target superheat SHt and the actual superheat SH, and controls the electronic expansion valve 27c to open at the calculated value. Here, the actual superheat SH is calculated based on the pressure P of the refrigerant in the outdoor heat exchanger 22 and the temperature T$_{hex}$ of the refrigerant flowing out of the outdoor heat exchanger 22.

In this way, with the vehicle air conditioning apparatus according to the present embodiment, during the heating and dehumidifying operation, the target superheat SHt is reduced when the temperature Te detected by the cooled air temperature sensor 44 is Tet-$\gamma$ or lower. By this means, during the heating and dehumidifying operation, when a frost is likely to be formed, the electronic expansion valve 27c controlled to reduce the superheat SH, so that the flow rate of the refrigerant flowing through the outdoor heat exchanger 22 is increased to reduce the amount of the refrigerant flowing into the heat exchanger 14. As a result, it is possible to prevent a frost from being formed on the heat exchanger 14.

Figure 16:
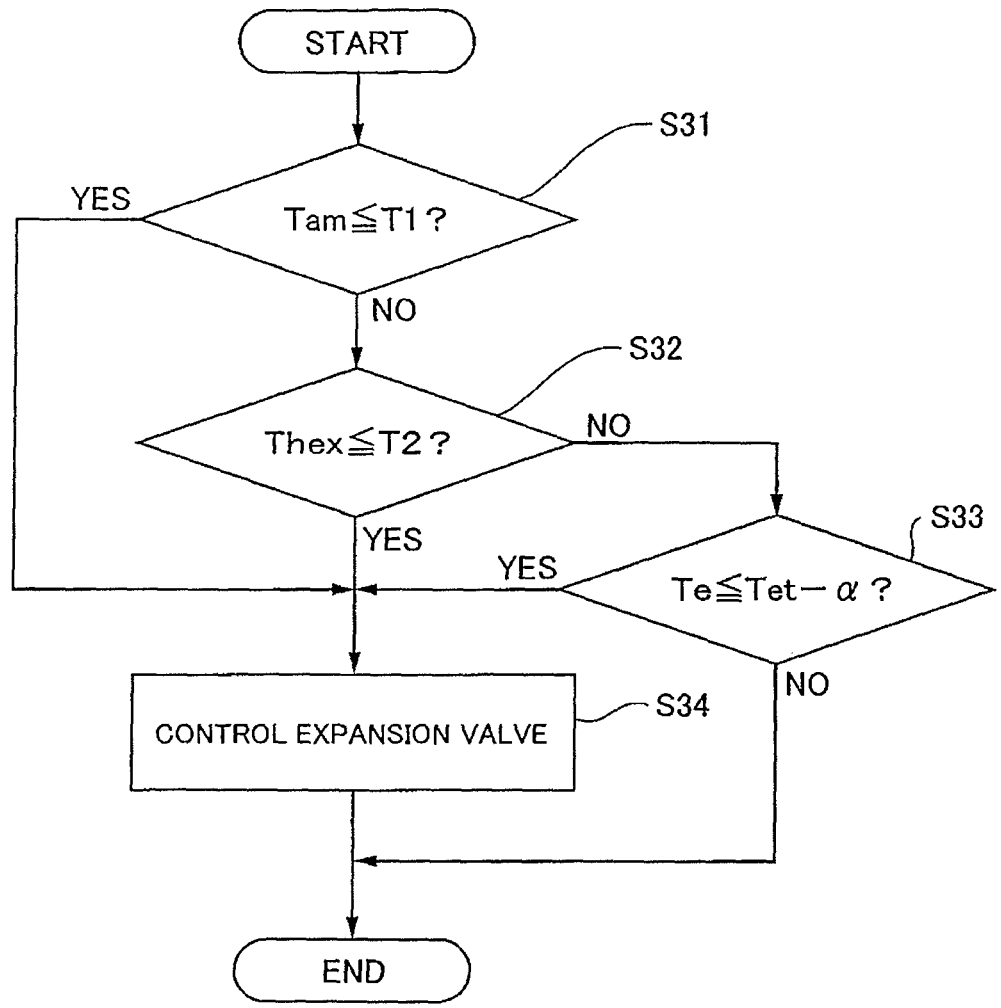
FIG. 16 is a flowchart showing a process to control the temperature of the heat exchanger according to Embodiment 4 of the present invention.
Figure 17:
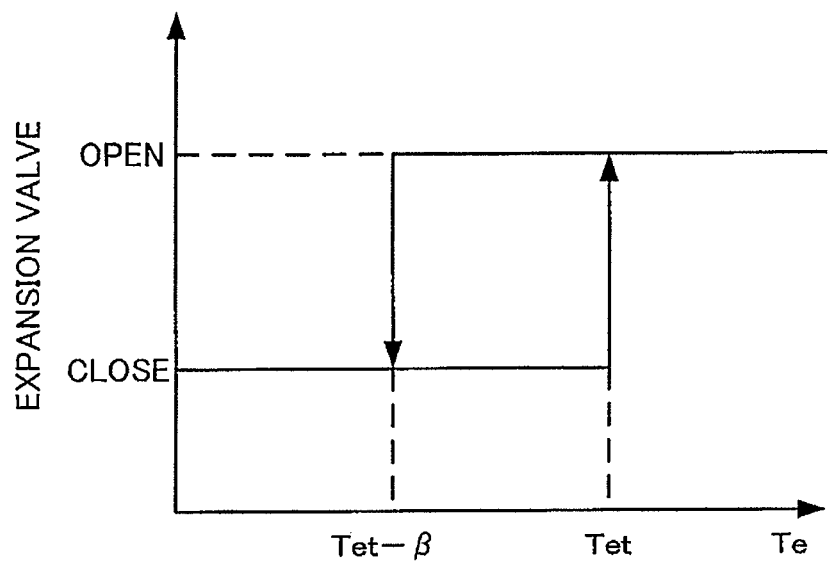
FIG. 17 is a drawing showing the relationship between the opening and closing of the solenoid valve and the temperature of the heat exchanger.

FIGS. 16 and 17 show Embodiment 4 of the present invention. Here, the same components are assigned the same reference numerals as in the above-described embodiments.

The vehicle air conditioning apparatus according to the present invention has the same configuration as in Embodiment 3, and the electronic expansion valve 27c is opened and closed as a process to control the temperature of the heat exchanger. Now, the operation of the controller 40 in this process will be explained with reference to the flowchart shown in FIG. 16.

(Step S31)

In step S31, the CPU determines whether or not the outdoor air temperature Tam is the predetermined temperature T1 (e.g. 10 degrees centigrade) or lower. When determining that the temperature Tam is the predetermined temperature T1 or lower, the CPU moves the step to step S34. On the other hand, when determining that the temperature Tam is higher than the predetermined temperature T1, the CPU moves the step to step S32.

(Step S32)

In the step S32, the CPU determines whether or not the temperature T$_{hex}$ of the refrigerant flowing out of the outdoor heat exchanger 22 is the predetermined temperature T2 (e.g. 5 to 10 degrees centigrade) or lower. When determining that the temperature T$_{hex}$ is the predetermined temperature T2 or lower, the CPU moves the step to step S34. On the other hand, when determining that the temperature T$_{hex}$ is higher than the predetermined temperature T2, the CPU moves the step to step S33.

(Step S33)

In the step S33, the CPU determines whether or not the temperature Te of the heat exchanger 14 is equal to or lower than the temperature (Tet-$\alpha$) obtained by reducing predetermined temperature $\alpha$ from the target temperature Tet of the heat exchanger 14. When determining that the temperature Te is Tet-$\alpha$ or lower, the CPU moves the step to the step S34. On the other hand, when determining that the temperature Te is higher than Tet-$\alpha$, the CPU ends the process to control the temperature of the heat exchanger.

(Step S34)

In the case in which the temperature Tam is the predetermined temperature T1 or lower in the step S31, in the case in which the temperature Thex is the predetermined temperature T2 or lower in the step S32, or in the case in which the temperature Te is Tet-$\alpha$ or lower in the step S33, the CPU controls to switch the opening and closing of the electronic expansion solenoid valve 27c. To be more specific, the electronic expansion solenoid valve 27c is closed when the temperature Te of the heat exchanger 14 is reduced from a temperature higher than the target temperature Tet of the heat exchanger 14 to the temperature (Tet-$\beta$) obtained by reducing the predetermined temperature $\beta$ from the target temperature Tet as shown in FIG. 17. On the other hand, the electronic expansion solenoid valve 27c is opened when the temperature Te of the heat exchanger 14 is increased from a temperature lower than Tet-$\beta$ to the target temperature Tet.

In this way, with the vehicle air conditioning apparatus according to the present embodiment, during the heating and dehumidifying operation, the electronic expansion solenoid valve 27c is closed in the case in which the outdoor air temperature Tam is the predetermined temperature T1 or lower, or in the case in which the temperature Thex of the refrigerant flowing out of the outdoor heat exchanger 22 is the predetermined temperature T2 or lower while the temperature Te detected by the cooled air temperature sensor 44 is Tet-β or lower. By this means, during the heating and dehumidifying operation, when a frost is likely to be formed on the heat exchanger 14, the flow of the refrigerant into the outdoor heat exchanger 22 is stopped to prevent the refrigerant from absorbing the heat in the outdoor heat exchanger 22 but allow the refrigerant to absorb the heat only in the heat exchanger 14. Therefore, it is possible to prevent the evaporating temperature of the refrigerant from reducing in the heat exchanger 14, and consequently to prevent a frost from being formed on the heat exchanger 14.

Here, with the present embodiment, a configuration has been described where the quantity of heat obtained by a heat exchange between the air flowing through the air flow passage 11 and the refrigerant releasing the heat in the radiator 15 is used as the heat source for the heating and dehumidifying operation and the cooling and dehumidifying operation. In this case, when the quantity of heat is insufficient, an auxiliary heat source may be provided. For example, in addition to the radiator 15, an electric heater may be provided in the air flow passage 11 as a heat source, which can directly heat the air flow passage 11. In addition, a water heating circuit is formed across the inside and outside of the air flow passage 11 to heat the water flowing through the water heating circuit outside the air flow passage 11 and to release the heat from the heated water in the air flow passage 11.

Moreover, a configuration has been described where the three-way valve 24 is used to switch between the refrigerant flow passages 20c and 20d. However, it is by no means limiting. Instead of the three-way valve 24, two solenoid valves may be used to switch between the refrigerant flow passages 20c and 20d.

FIGS. 18 to 27 show Embodiment 5 according to the present invention.

Figure 18:
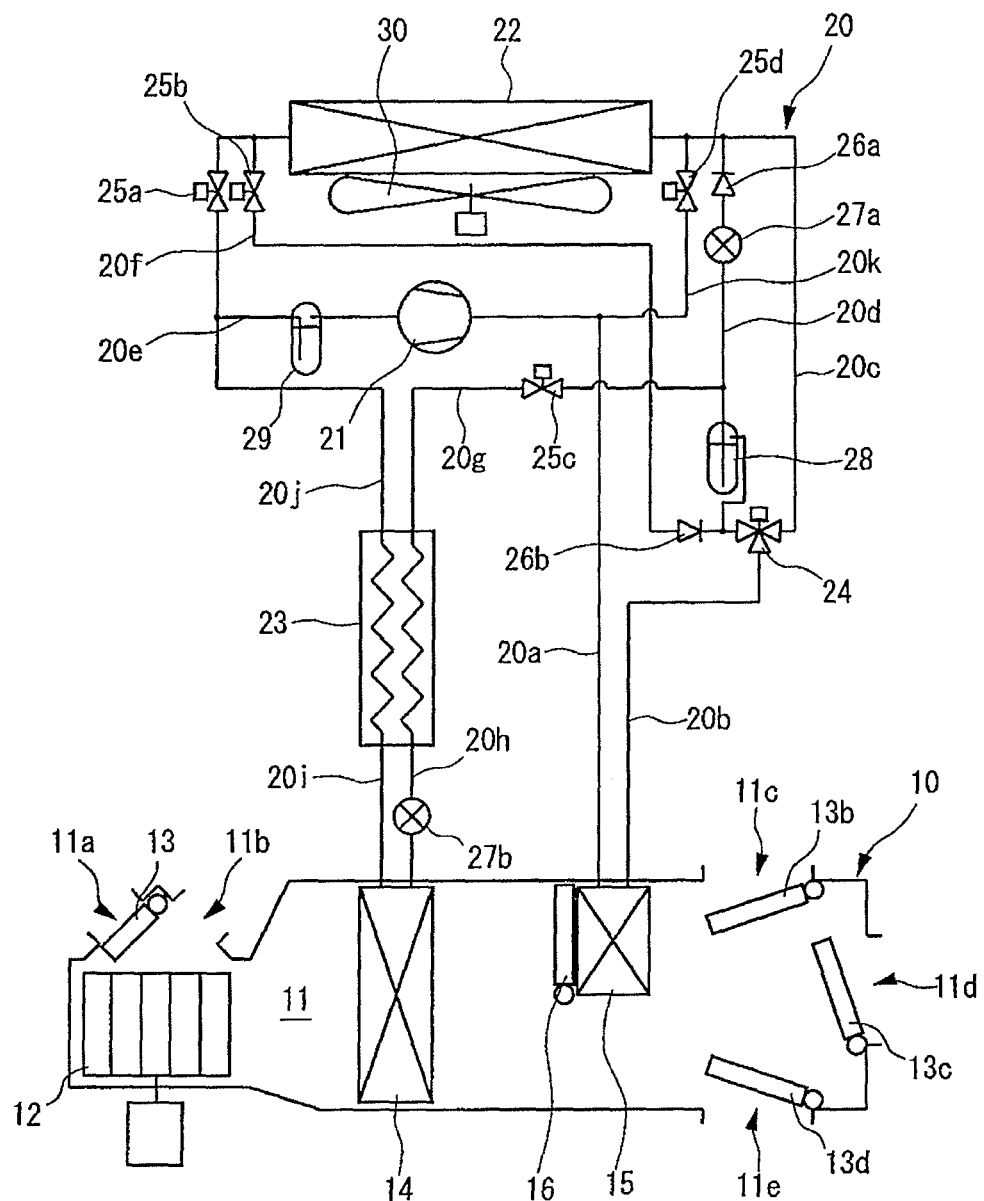
FIG. 18 is a schematic view showing the vehicle air conditioning apparatus according to Embodiment 5 of the present invention.

As shown in FIG. 18, the vehicle air conditioning apparatus according to the present invention includes the air conditioning unit 10 provided in the vehicle interior, and the refrigerant circuit 20 formed across the vehicle interior and the outdoor.

The air conditioning unit 10 includes the air flow passage 11 that allows the air to be supplied to the vehicle interior to pass through. The outdoor air inlet 11a and the indoor air inlet 11b are provided in the first end side of the air flow passage 11. The outdoor air inlet 11a is configured to allow the outdoor air to flow into the air flow passage 11, and the indoor air inlet 11b is configured to allow the indoor air to flow into the air flow passage 11. Meanwhile, the foot outlet 11c, the vent outlet 11d and the defroster outlet 11e are provided in the second end side of the air flow passage 11. The foot outlet 11c is configured to allow the air flowing through the air flow passage 11 to blow to the feet of the passengers in the vehicle. The vent outlet 11d is configured to allow the air flowing through the air flow passage 11 to blow to the upper bodies of the passengers in the vehicle. The defroster outlet 11e is configured to allow the air flowing through the air flow passage 11 to blow to the interior surface of the front window.

The indoor fan 12 such as a sirocco fan configured to allow the air to flow through the air flow passage 11 from end to end is provided in the first end side of the air flow passage 11. This indoor fan 12 is driven by the electric motor 12a.

Also, in the first end side of the air flow passage 11, the inlet switching damper 13 configured to open one of the outdoor air inlet 11a and the indoor air inlet 11b and to close the other. This inlet switching damper 13 is driven by the electric motor 13a. When the inlet switching damper 13 closes the indoor air inlet 11b and opens the outdoor air inlet 11a, the mode is switched to an outdoor air supply mode in which the air flows from the outdoor air inlet 11a into the air flow passage 11. Meanwhile, when the inlet switching damper 13 closes the outdoor air inlet 11a and opens the indoor air inlet 11b, the mode is switched to an indoor air circulation mode in which the air flows from the indoor air inlet 11b into the air flow passage 11. Moreover, when the inlet switching damper 13 is placed between the outdoor air inlet 11a and the indoor air inlet 11b and the outdoor air inlet 11a and the indoor air inlet 11b open, the mode is switched to a two-way mode in which the air flows from both the outdoor air inlet 11a and the indoor air inlet 11b into the air flow passage 11 according to the opening ratio of the outdoor air inlet 11a and the indoor air inlet 11b.

The outlet switching dampers 13b, 13c and 13d configured to open and close the foot outlet 11c, the vent outlet 11d and the defroster outlet 11e are provided in the foot outlet 11c, the vent outlet 11d and the defroster outlet 11e, respectively, in the second side of the air flow passage 11. These outlet switching dampers 13b, 13c and 13d are configured to move together by a linkage (not shown) and are opened and closed by the electric motor 13e. Here, when the outlet switching dampers 13b, 13c and 13d open the foot outlet 1c, close the bent outlet 11d and slightly open the defroster outlet 11e, most of the air flowing through the air flow passage 11 blows out of the foot outlet 11c and the remaining air blows out of the defroster outlet 11e. This mode is referred to as "foot mode." Meanwhile, when the outlet switching dampers 13b, 13c and 13d close the foot outlet 11c and the defroster outlet 11e, and open the vent outlet 11d, all the air flowing through the air flow passage 11 blows out of the vent outlet 11d. This mode is referred to as "vent mode." In addition, when the outlet switching dampers 13b, 13c and 13d open the foot outlet 11c and the vent outlet 11d, and close the defroster outlet 11e, the air flowing through the air flow passage 11 blows out of the foot outlet 11c and the vent outlet 11d. This mode is referred to as "bi-level mode." Moreover, when the outlet switching dampers 13b, 13c and 13d close the foot outlet 11c and the vent outlet 11d, and open the defroster outlet 11e, the air flowing through the air flow passage 11 blows out of the defroster outlet 11e. This mode is referred to as "defroster mode." Furthermore, when the outlet switching dampers 13b, 13c and 13d close the vent outlet 11d and open the foot outlet 11c and the defroster outlet 11e, the air flowing through the air flow passage 11 blows out of the foot outlet 11c and the defroster outlet 11e. This mode is referred to as "defroster-foot mode." Here, in the bi-level mode, the air flow passage 11, the foot outlet 11c, the vent outlet 11d, and the heat exchanger and the radiator which will be described later, are arranged and configured such that the temperature of the air blowing out of the foot outlet 11c is higher than the temperature of the air blowing out of the vent outlet 11d.

The heat exchanger 14 is provided in the air flow passage 11 in the downstream of the air flow from the indoor fan 12. The heat exchanger 14 is configured to cool and dehumidify the air flowing through the air flow passage 11. In addition, the radiator 15 is provided in the air flow passage 11 in the downstream of the air flow from the heat exchanger 14. The radiator 15 is configured to heat the air flowing through the air flow passage 11. The heat exchanger 14 and the radiator 15 are heat exchangers, each of which is constituted by fins and tubes and that is configured to perform a heat exchange between the refrigerant flowing through the refrigerant circuit 20 and the air flowing through the air flow passage 11.

The air mix damper 16 is provided between the heat exchanger 14 and the radiator 15 in the air flow passage 11 and is configured to control the percentage of the air to be heated, which is flowing through the air flow passage 11. The air mix damper 16 is driven by the electric motor 16a. When the air mix damper 16 is disposed in the air flow passage 11 in the upstream of the radiator 15, the percentage of the air subjected to a heat exchange in the radiator 15 is reduced. Meanwhile, when the air mix damper 16 is moved to a position other than the radiator 15 in the air flow passage 11, the percentage of the air subjected to a heat exchange is increased. In the air flow passage 11, when the air mix damper 16 closes the upstream side of the radiator 15 and opens the portion other than the radiator 15, the opening is 0%, and, on the other hand, when the air mix damper 16 opens the upstream side of the radiator 15 and closes the portion other than the radiator 15, the opening is 100%.

The refrigerant circuit 20 includes: the heat exchanger 14; the radiator 15; the compressor 21 configured to compress a refrigerant; the outdoor heat exchanger 22 configured to perform a heat exchange between the refrigerant and the outdoor air; the indoor heat exchanger 23 configured to perform a heat exchange between the refrigerant flowing out of the radiator 15 or having flowed through the outdoor heat exchanger 22 and the refrigerant flowing out of the heat exchanger 14; the three-way valve 24 configured to switch the passage of the refrigerant; the first to fourth solenoid valves 25a to 25d; the first and second check valves 26a and 26b; the first and second expansion valves 27a and 27b configured to decompress the flowing refrigerant; the receiver tank 28 configured to accumulate an extra refrigerant; and the accumulator 29 configured to separate between refrigerant vapor and refrigerant liquid to prevent the refrigerant liquid from being sucked into the compressor 21. These components are connected to each other by a copper pipe or an aluminum pipe. The compressor 21 and the outdoor heat exchanger 22 are disposed outside the vehicle interior. The compressor 21 is driven by the electric motor 21a. The outdoor heat exchanger 22 is provided with the outdoor fan 30 configured to perform a heat exchange between the outdoor air and the refrigerant when the vehicle stops. The outdoor fan 30 is driven by the electric motor 30a. The first expansion valve 27a is an electronic expansion valve with the adjustable opening.

To be more specific, the input side of the radiator 15 into which the refrigerant flows is connected to the delivery side of the compressor 21 from which the refrigerant is discharged to form the refrigerant flow passage 20a. In addition, the input side of the heat exchanger 22 into which the refrigerant flows is connected to the output side of the radiator 15 from which the refrigerant is discharged, thereby to form the refrigerant flow passage 20b. The three-way valve 24 is provided in the refrigerant flow passage 20b. The one side of the three-way valve 24 from which the refrigerant is discharged and another side from which the refrigerant is discharged are parallel to one another and are connected to the input side of the outdoor heat exchanger 22 into which the refrigerant flows and thereby to form the refrigerant flow passages 20c and 20d. In the refrigerant flow passage 20d, the receiver tank 28, the first expansion valve 27a and the first check valve 26a are provided in the order from the upstream of the flow of the refrigerant. The suction side of the compressor 21 into which the refrigerant is sucked and the part of the refrigerant flow passage 20d between the three-way valve 24 and the receiver tank 28 are connected in parallel to the output side of the outdoor heat exchanger 22 from which the refrigerant is discharged, thereby to form the refrigerant flow passage 20e and 20f. The first solenoid valve 25a and the accumulator 29 are provided in the refrigerant flow passage 20e in the order from the upstream of the flow of the refrigerant. The second solenoid valve 25b and the second check valve 26b are provided in the refrigerant flow passage 20f in the order from the upstream of the flow of the refrigerant. The input side of the indoor heat exchanger 23 into which a high-pressure refrigerant flows is connected to the part of the refrigerant flow passage 20d between the receiver tank 28 and the first expansion valve 27a, thereby to form the refrigerant flow passage 20g. The third solenoid valve 25c is provided in the refrigerant flow passage 20g. The input side of the heat exchanger 14 into which the refrigerant flows is connected to the output side of the indoor heat exchanger 23 from which the high-pressure refrigerant is discharged, thereby to form the refrigerant flow passage 20h. The second expansion valve 27b is provided in the refrigerant flow passage 20h. The input side of the indoor heat exchanger 23 into which a low-pressure refrigerant flows is connected to the output side of the heat exchanger 14 from which the refrigerant is discharged, thereby to form the refrigerant flow passage 20i. The part of the refrigerant flow passage 20e between the first solenoid valve 25a and the accumulator 29 is connected to the output side of the indoor heat exchanger 23 from which the low-pressure refrigerant is discharged, thereby to provide the refrigerant flow passage 20j. The input side of the outdoor heat exchanger 22 into which the refrigerant flows is connected to the refrigerant flow passage 20a, thereby to provide the refrigerant flow passage 20k. The fourth solenoid valve 25d is provided in refrigerant flow passage 20k.

Moreover, the vehicle air conditioning apparatus also includes a controller 40 that controls the temperature and the humidity of the vehicle interior to be the preset temperature and humidity.

The controller 40 includes a CPU, a ROM and a RAM. In the controller, upon receiving an input signal from a device connected to the input side, the CPU reads the program stored in the ROM according to the input signal, stores the state detected by the input signal on the RAM and transmits an output signal to a device connected to the output side.

Figure 19:
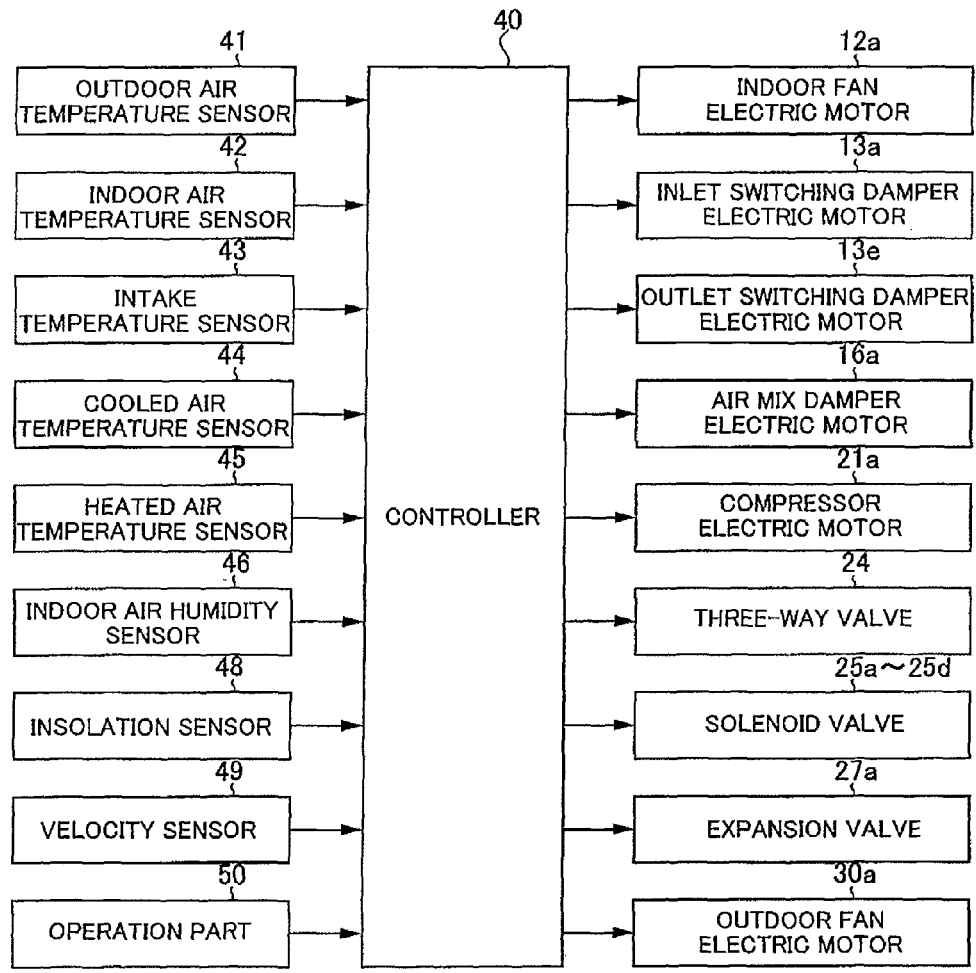
FIG. 19 is a block diagram showing a control system.

As shown in FIG. 19, the electric motor 12a for driving the indoor fan 12; the electric motor 13a for driving the inlet switching damper 13; the electric motor 13e for driving the outlet switching dampers 13b, 13c and 13d; the electric motor 16a for driving the air mix damper 16; the electric motor 21a for driving the compressor 21; the three-way valve 24; the first to fourth solenoid valves 25a to 25d; the first expansion valve 27a; and the electric motor 30a for driving the outdoor fan 30 are connected to the output side of the controller 40.

As shown in FIG. 19, the outdoor air temperature sensor 41 configured to detect temperature Tam outside the vehicle interior; the indoor air temperature sensor 42 configured to detect indoor air temperature Tr; the intake temperature sensor 43 configured to detect temperature T1 of the air flowing into the air flow passage 11; the cooled air temperature sensor 44 configured to detect temperature Te of the air having been cooled in the heat exchanger 14; the heated air temperature sensor 45 configured to detect temperature Tc of the air having been heated in the radiator 15; the indoor air humidity sensor 46 configured to detect indoor air humidity Th; the insolation sensor 48 such as a photo sensor configured to detect amount of insolation Ts; the velocity sensor 49 configured to detect velocity V of the vehicle; and the operation part 50 configured to set modes regarding to target setting temperature Tset and the switching of the operation are connected to the input side of the controller 40.

The vehicle air conditioning apparatus having the above-described configuration performs cooling operation, cooling and dehumidifying operation, heating operation, first heating and dehumidifying operation, second heating and dehumidifying operation and defrost operation. Now, each operation will be explained.

Figure 20:
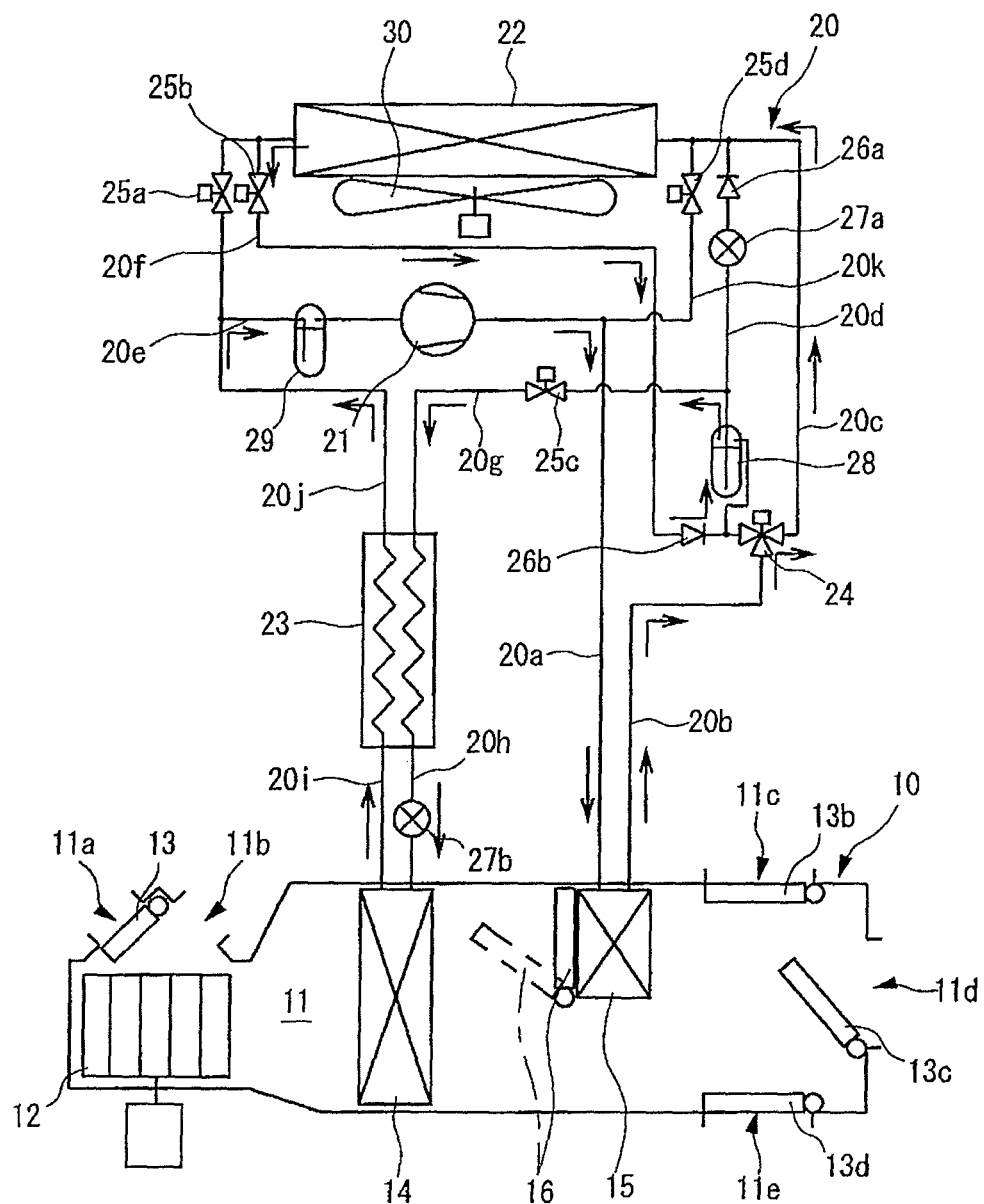
FIG. 20 is a schematic view showing the vehicle air conditioning apparatus performing a cooling operation and a cooling and dehumidifying operation.

During the cooling operation and the cooling and dehumidifying operation, in the refrigerant circuit 20, the flow passage of three-way valve 24 is set to the refrigerant flow passage 20*c* side; the second and third solenoid valves 25*b* and 25*c* are opened and the first and fourth solenoid valves 25*a* and 25*d* are closed; and the compressor 21 is operated. By this means, as shown in FIG. 20, the refrigerant discharged from the compressor 21 flows through in this order: the refrigerant flow passage 20*a*; the radiator 15; the refrigerant flow passages 20*d* and 20*c*; the outdoor heat exchanger 22, the refrigerant flow passages 20*f* and 20*g*, the high-pressure side of the indoor heat exchanger 23; the refrigerant flow passage 20*h*; the heat exchanger 14; the refrigerant flow passage 20*i*; the low-pressure side of the indoor heat exchanger 23; and the refrigerant flow passages 20*j* and 20*e*, and is sucked into the compressor 21. The refrigerant flowing through the refrigerant circuit 20 releases the heat in the outdoor heat exchanger 22 and absorbs the heat in the heat exchanger 14. When the air mix damper 16 is open during the cooling and dehumidifying operation, the refrigerant releases the heat also in the radiator 15.

In this case, in the air conditioning unit 10 during the cooling operation, the indoor fan 12 is operated to flow the air through the air flow passage 11, and the air is subjected to a heat exchange with the refrigerant in the heat exchanger 14 and cooled. The temperature of the cooled air becomes the target air-blowing temperature TAO of the air to blow out of the outlets 11*c*, 11*d* and 11*e* in order to set the temperature of the vehicle interior to the target setting temperature Tset. Then, the air at the temperature TAO blows to the vehicle interior. The target air-blowing temperature TAO is calculated based on the preset temperature Tset, and environmental conditions such as the outdoor air temperature Tam, the indoor air temperature Tr, and an amount of insolation Ts, which are detected by the outdoor air temperature sensor 41, the indoor air temperature sensor 42, and the insolation sensor 48, respectively.

Meanwhile, in the air conditioning unit 10 during the cooling and dehumidifying operation, the indoor fan 12 is operated to flow the air through the air flow passage 11, and the air is subjected to a heat exchange with the refrigerant which absorbs the heat in the heat exchanger 14, and therefore is cooled and dehumidified. The air having been dehumidified in the heat exchanger 14 is subjected to a heat exchange with the refrigerant which releases the heat in the radiator 15, and therefore heated. As a result, the air at the target air-blowing temperature TAO blows to the vehicle interior.

Figure 21:
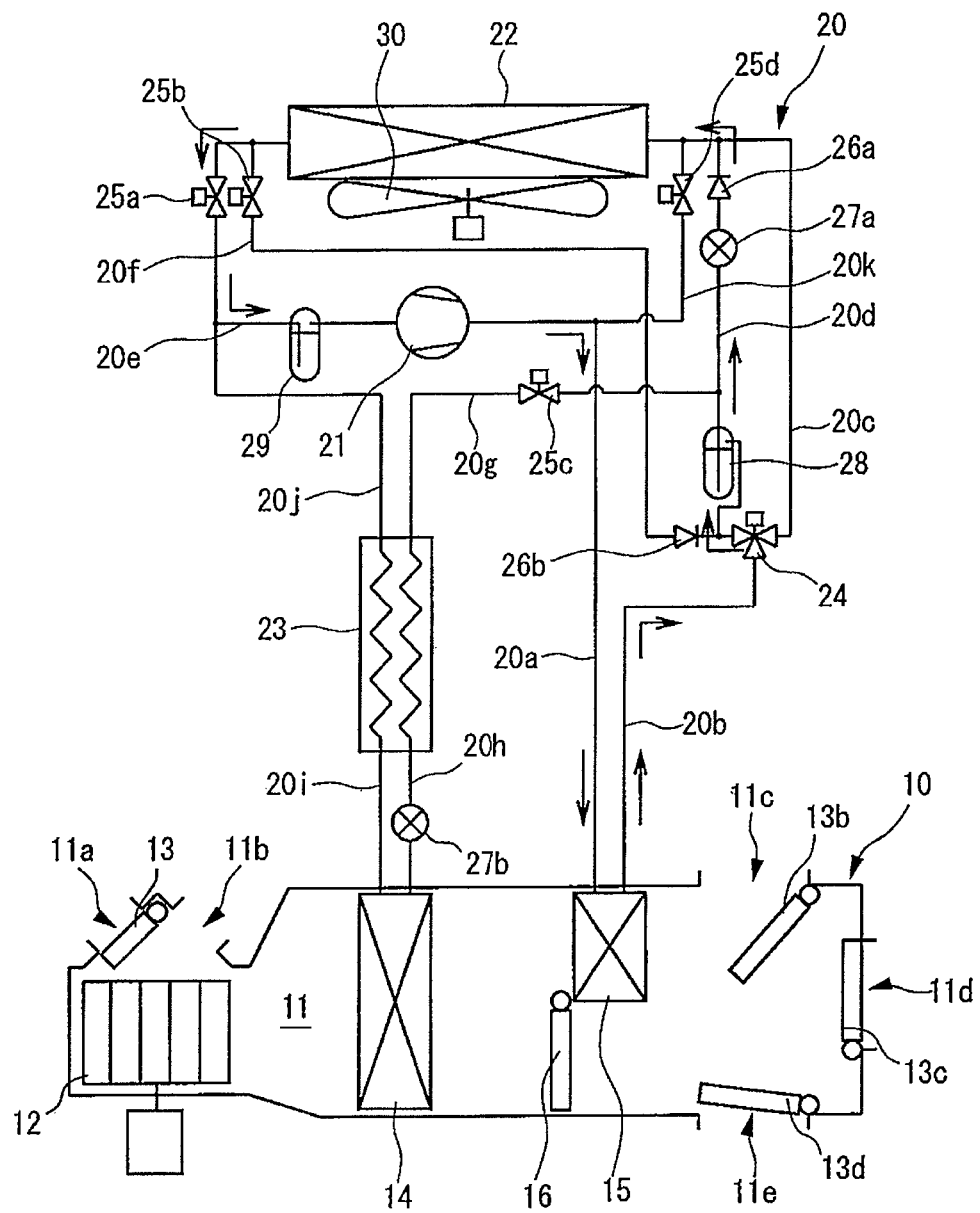
FIG. 21 is a schematic view showing the vehicle air conditioning apparatus performing a heating operation.

During the heating operation, in the refrigerant circuit 20, the flow passage of the three-way valve 24 is set to the refrigerant flow passage 20*d* side; the first solenoid valve 25*a* is opened and the second to fourth solenoid valves 25*b* to 25*d* are closed: and the compressor 21 is operated. By this means, as shown in FIG. 21, the refrigerant discharged from the compressor 21 flows through in this order: the refrigerant flow passage 20*a*; the radiator 15; the refrigerant flow passages 20*b* and 20*d*; the outdoor heat exchanger 22; and the refrigerant flow passage 22*e*, and is sucked into the compressor 21. The refrigerant flowing through the refrigerant circuit 20 releases the heat in the radiator 15 and absorbs the heat in the outdoor heat exchanger 22.

In this case, in the air conditioning unit 10, the indoor fan 12 is operated to flow the air through the air flow passage 11, and the flowing air is not subjected to a heat exchange with the refrigerant in the heat exchanger 14, but is subjected to a heat exchange with the refrigerant in the radiator 15 and therefore is heated. As a result, the air at the target air-blowing temperature TAO blows to the vehicle interior.

Figure 22:
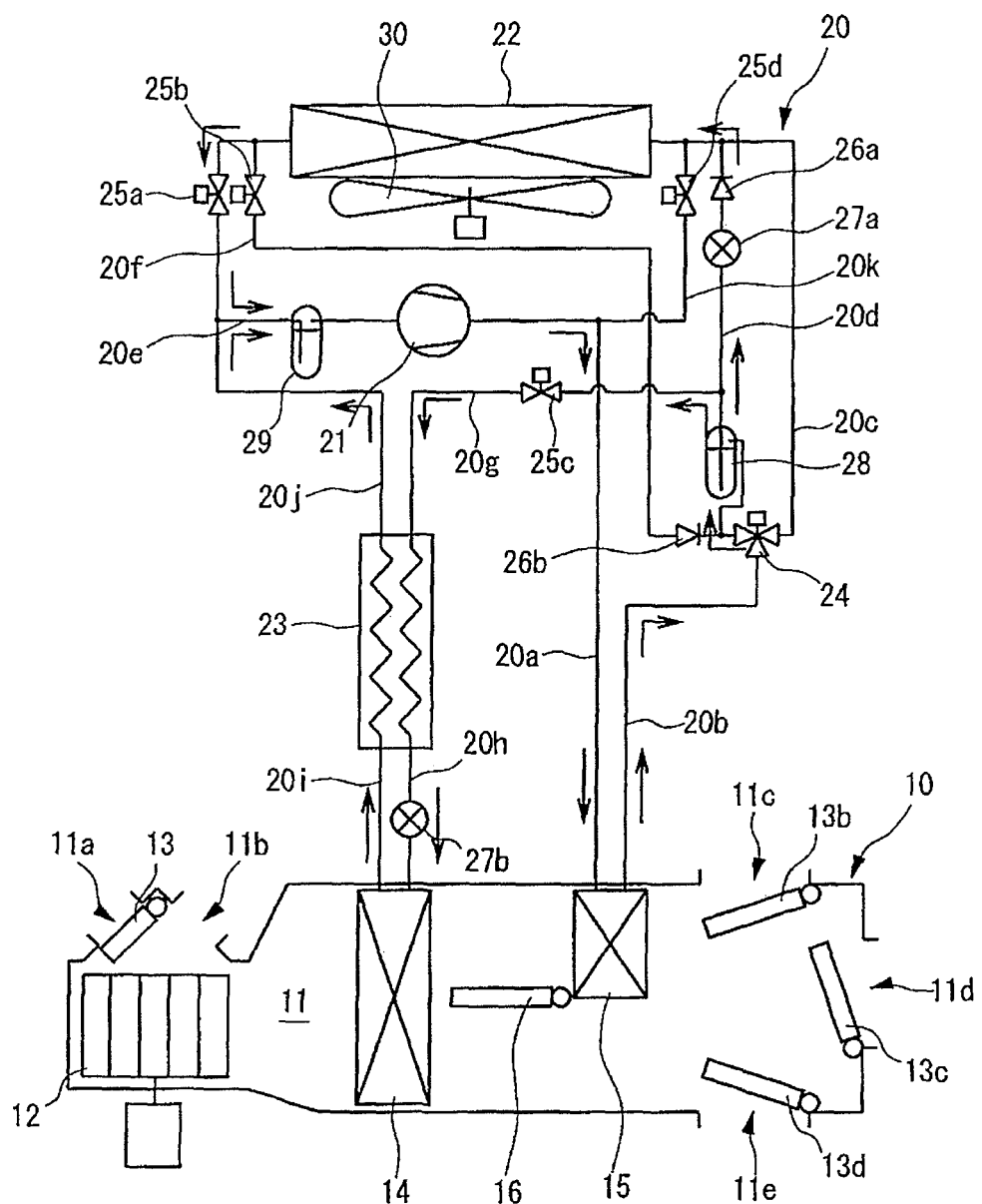
FIG. 22 is a schematic view showing the vehicle air conditioning apparatus performing a first heating and dehumidifying operation.

During the heating and dehumidifying operation, in the refrigerant circuit 20, the flow passage of the three-way valve 24 is set to the refrigerant flow passage 20*d* side; the first and third solenoid valves 25*a* and 25*c* are opened and the second and fourth solenoid valves 25*b* and 25*d* are closed; and the compressor 21 is operated. By this means, as shown in FIG. 22, the refrigerant discharged from the compressor 21 flows through in this order: the refrigerant flow passage 20*a*; the radiator 15; and the refrigerant flow passages 20*b* and 20*d*. Part of the refrigerant flowing through the refrigerant flow passage 20*d* flows through in this order: the outdoor heat exchanger 22; and the refrigerant flow passage 20*e*, and is sucked into the compressor 21. Meanwhile, the remaining refrigerant flowing through the refrigerant flow passage 20*d* flows through in this order: the refrigerant flow passage 20*g*; the high-pressure side of the indoor heat exchanger 23; the refrigerant flow passage 20*h*; the heat exchanger 14; the refrigerant flow passage 20*i*; the low-pressure side of the indoor heat exchanger 23; and the refrigerant flow passages 20*j* and 20*e*, and is sucked into the compressor 21. The refrigerant flowing through the refrigerant circuit 20 releases the heat in the radiator 15 and absorbs the heat in the heat exchanger 14 and the outdoor heat exchanger 22.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified. Part of the air having been dehumidified in the heat exchanger 14 is subjected to a heat exchange with the refrigerant in the radiator 15 and heated. As a result, the air at the target air-blowing temperature TAO blows into the vehicle interior.

Figure 23:
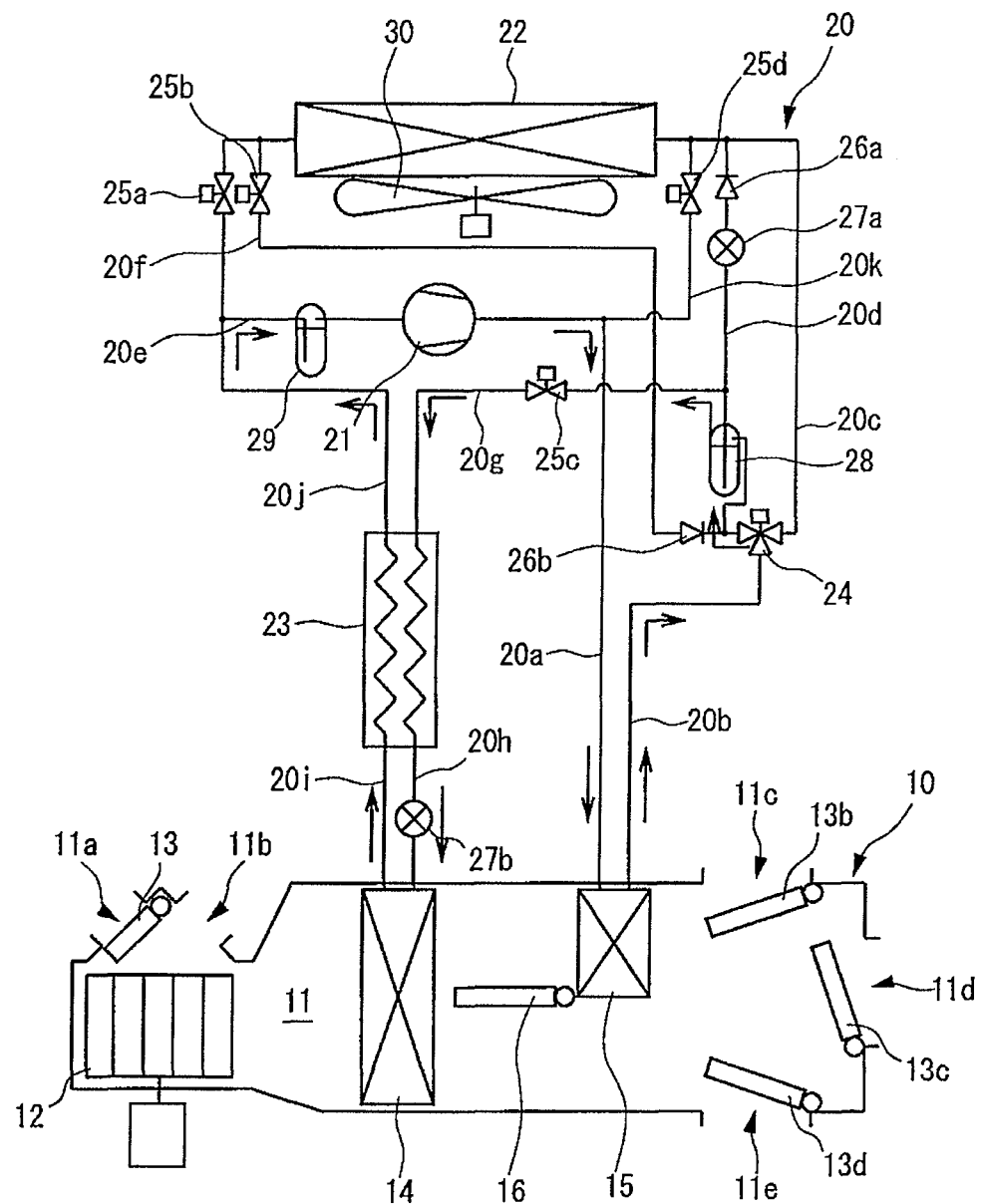
FIG. 23 is a schematic view showing the vehicle air conditioning apparatus performing a second heating and dehumidifying operation.

During the second heating and dehumidifying operation, in the refrigerant circuit 20, the flow passage of the three-way valve 24 is set to the refrigerant flow passage side 20*d*; the third solenoid valve 25*c* is opened and the first, second and fourth solenoid valves 25*a*, 25*b* and 25*d* are closed; and the compressor 21 is operated. By this means, as shown in FIG. 23, the refrigerant discharged from the compressor 21 flows through in this order: the refrigerant flow passage 20*a*; the radiator 15; the refrigerant flow passages 20*b*, 20*d* and 20*g*; the high-pressure side of the indoor heat exchanger 23; the refrigerant flow passage 20*h*; the heat exchanger 14; the refrigerant flow passage 20*i*; the low-pressure side of the indoor heat exchanger 23; and the refrigerant flow passages 20*j* and 20*e*, and is sucked into the compressor 21. The refrigerant flowing through the refrigerant circuit 20 releases the heat in the radiator 15 and absorbs the heat in the heat exchanger 14.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified in the same way as in the first heating and dehumidifying operation. Part of the air dehumidified in the heat exchanger 14 is subjected to a heat exchange with the refrigerant in the radiator 15, and therefore heated. As a result, the air at the target air-blowing temperature TAO blows to the vehicle interior.

Figure 24:
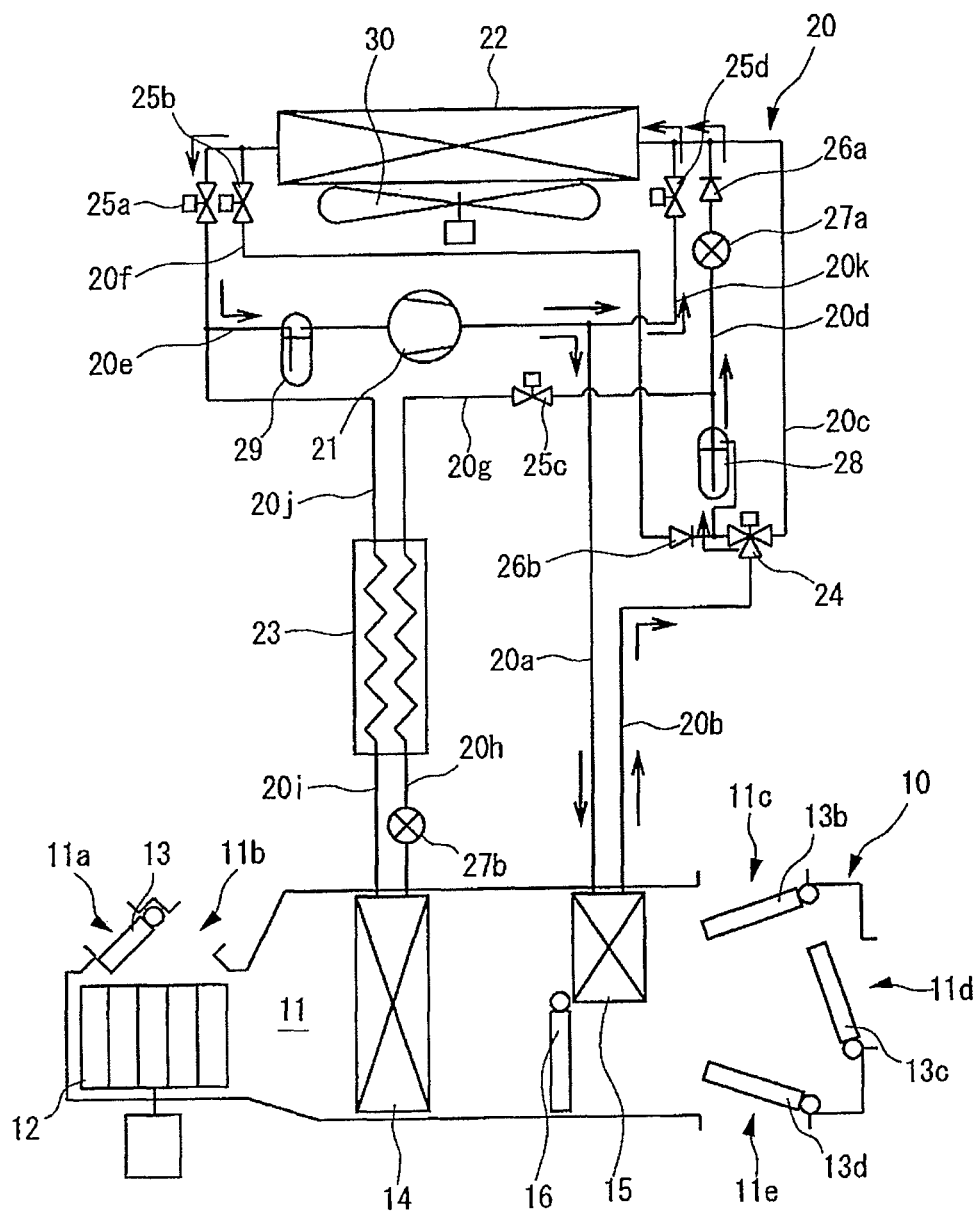
FIG. 24 is a schematic view showing the vehicle air conditioning apparatus performing a defrost operation.

During the defrost operation, in the refrigerant circuit 20, the flow passage of the three-way valve 24 is set to the refrigerant flow passage 20*d* side; the first and fourth solenoid valves 25*a* and 25*d* are opened and the second and third solenoid valves 25*d* and 25*c* are closed; and the compressor 21 is operated. By this means, as shown in FIG. 24, part of the refrigerant discharged from the compressor 21 flows through in this order: the refrigerant flow passage 20*a*; the radiator 15; the refrigerant flow passages 20*b* and 20*d*, and flows into the outdoor heat exchanger 22. Meanwhile, the remaining refrigerant discharged from the compressor 21 flows through the refrigerant flow passages 20*a* and 20*k*, and flows into the outdoor heat exchanger 22. The refrigerant flowing out of the outdoor heat exchanger 22 flows through the refrigerant flow passage 20*e*, and is sucked into the compressor 21. The refrigerant flowing through the refrigerant circuit 20 releases the heat in the radiator 15, and at this time, absorbs the heat in the outdoor heat exchanger 22.

In this case, in the air conditioning unit 10, the indoor fan 12 is operated to flow the air through the air flow passage 11. The flowing air is not subjected to a heat exchange with the refrigerant in the heat exchanger 14, but is subjected to a heat exchange with the refrigerant which releases the heat in the radiator 15, and therefore is heated and then blows to the vehicle interior.

While an automatic switch is turned on, the controller 40 performs an operation switching control process to switch the operation among the cooling operation, the cooling and dehumidifying operation, the heating operation, the first heating and dehumidifying operation, the second heating and dehumidifying operation, and the defrost operation, based on environmental conditions including the outdoor air temperature Tam, the indoor air temperature Tr, the indoor air humidity Th, the amount of insolation Ts.

The operation switching control process can be set in three modes according to the power consumption of the air conditioning apparatus. The three modes include a normal mode, a first energy saving mode and a second energy saving mode, which are selected by the passenger operating the operation part 50. In the first energy saving mode, when it is determined that the conditions are met to fog up the window glasses, the first heating and dehumidifying operation or the second heating and dehumidifying operation is performed. In this first energy saving mode, the power consumption is lower than in the normal mode. In the second energy saving mode, neither the first heating and dehumidifying nor the second heating and dehumidifying operation is performed. In this second energy saving mode, the power consumption is lower than in the normal mode and the first energy saving mode.

Figure 25:
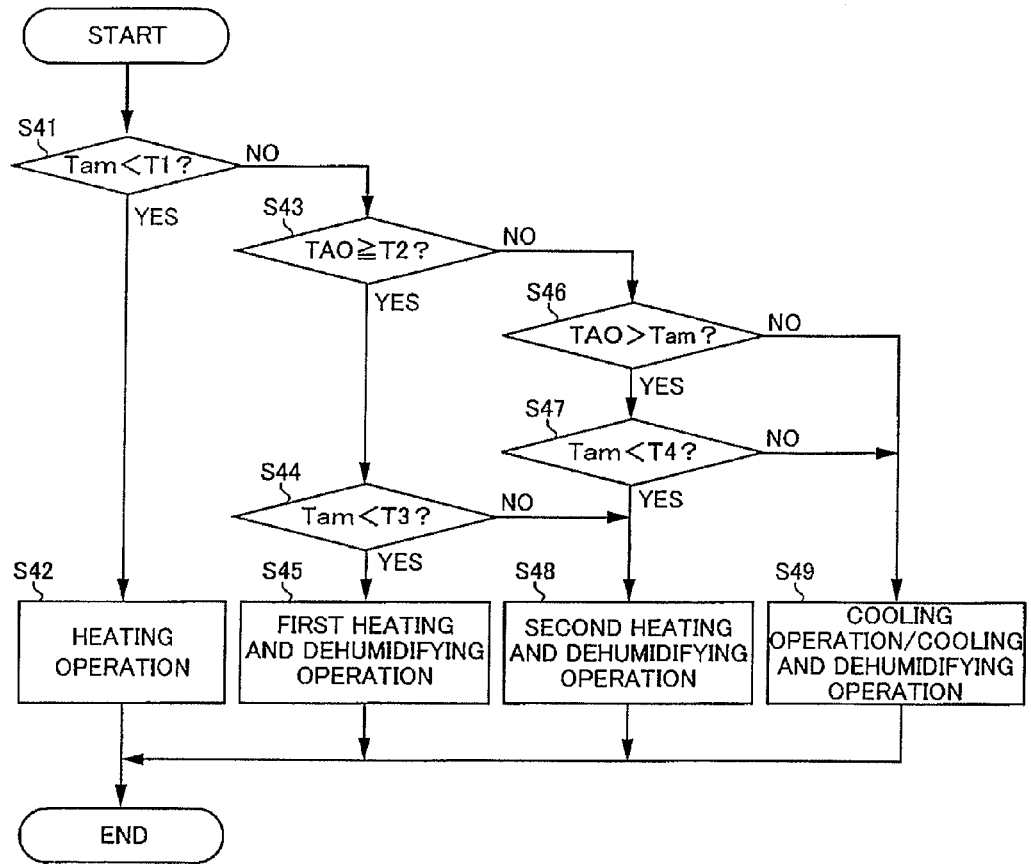
FIG. 25 is a flowchart showing an operation switching control process in a normal mode.

First, the operation switching control process in the normal mode will be described with reference to the flowchart shown in FIG. 25.

(Step S41)

In step S41, the CPU determines whether or not the outdoor air temperature Tam is lower than the predetermined temperature T1 (e.g. 5 degrees centigrade). When determining that the outdoor air temperature Tam is lower than the predetermined temperature T1, the CPU moves the step to step S42. On the other hand, when determining that the outdoor air temperature Tam is the predetermined temperature T1 or higher, the CPU moves the step to step 43.

(Step S42)

When determining that the outdoor air temperature Tam is lower than the predetermined temperature T1 in the step S41, the CPU determines to perform the heating operation in the step S42 and ends the operation switching control process.

(Step S43)

When determining that the outdoor air temperature Tam is the predetermined temperature T1 or higher in the step S41, the CPU determines whether or not the target air-blowing temperature TAO is the predetermined temperature T2 (e.g. 25 degrees centigrade) or higher in the step S43. When determining that the target air-blowing temperature TAO is the predetermined temperature T2 or higher, the CPU moves the step to step S44. On the other hand, when determining that the target air-blowing temperature TAO is lower than the predetermined temperature T2, the CPU moves the step to step S46.

(Step S44)

When determining that the target air-blowing temperature TAO is the predetermined temperature T2 or higher in the step S43, the CPU determines whether or not the outdoor air temperature Tam is lower than the predetermined temperature T3 (e.g. 15 degrees centigrade, T2>T3) in the step S44. When determining that the outdoor air temperature Tam is lower than the predetermined temperature T3, the CPU moves the step to step S45. On the other hand, when determining that the outdoor air temperature Tam is the predetermined temperature T3 or higher, the CPU moves the step to step S48.

(Step S45)

When determining that the outdoor air temperature Tam is lower than the predetermined temperature T3 in the step S44, the CPU determines to perform the first heating and dehumidifying operation in the step S45 and ends the operation switching control process.

(Step S46)

When determining that the target air-blowing temperature TAO is lower than the predetermined temperature T2 in the step S43, the CPU determines whether or not the target air-blowing temperature TAO is higher than the outdoor air temperature Tam in the step S46. When determining that the target air-blowing temperature TAO is higher than the outdoor air temperature Tam, the CPU moves the step to step S47. On the other hand, when determining that the target air-blowing temperature TAO is the outdoor air temperature Tam or lower, the CPU moves the step to step S49.

(Step S47)

When determining that the target air-blowing temperature TAO is higher than the outdoor air temperature Tam in the step S46, the CPU determines whether or not the outdoor air temperature Tam is lower than predetermined temperature T4 (e.g. 20 to 25 degrees centigrade) in the step S47. When determining that the outdoor air temperature Tam is lower than the predetermined temperature T4, the CPU moves the step to the step S48. On the other hand, when determining that the outdoor air temperature Tam is the predetermined temperature T4 or higher, the CPU moves the step to the step S49.

(Step S48)

When determining that the outdoor air temperature Tam is the predetermined temperature T3 or higher in the step S44, or when determining that the outdoor air temperature Tam is lower than the predetermined temperature T4 in the step S47, the CPU determines to perform the second heating and dehumidifying operation in the step S48 and ends the operation switching control process.

(Step S49)

When determining that the target air-blowing temperature TAO is the outdoor air temperature Tam or lower in the step S46, or when determining that the outdoor air temperature Tam is the predetermined temperature T4 or higher in the step S47, the CPU determines to perform the cooling operation, or the cooling and dehumidifying operation in the step S49, and ends the operation switching control process.

Figure 26:
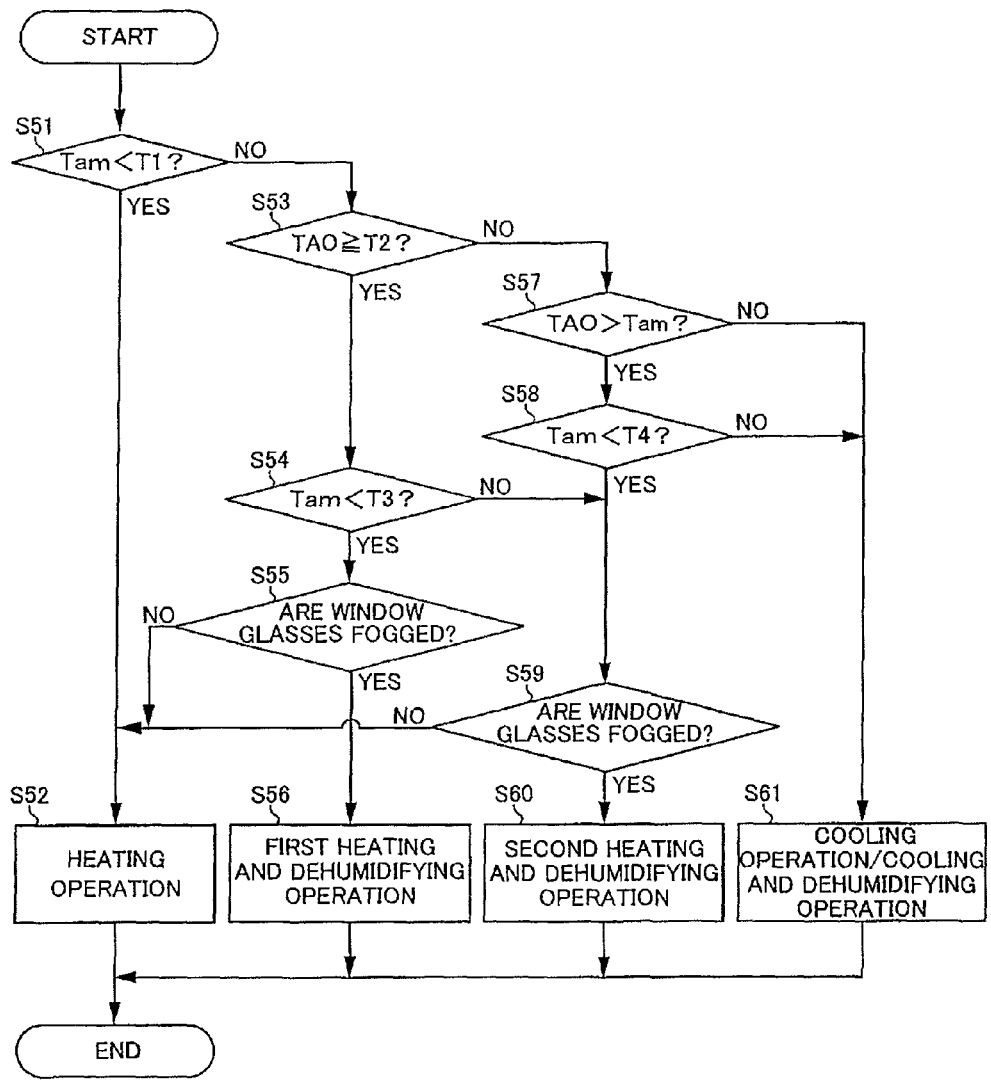
FIG. 26 is a flowchart showing an operation switching control process in the first energy saving mode.

Next, the operation switching control process in the first energy saving mode will be described with reference to the flowchart shown in FIG. 26.

(Step S51)

In step S51, the CPU determines whether or not the outdoor air temperature Tam is lower than the predetermined temperature T1 (e.g. 5 degrees centigrade). When determining that the outdoor air temperature Tam is lower than the predetermined temperature T1, the CPU moves the step to step S52. On the other hand, when determining that the outdoor air temperature Tam is the predetermined temperature T1 or higher, the CPU moves the step to step S3.

(Step S52)

When determining that the outdoor air temperature Tam is lower than the predetermined temperature T1 in the step S1, or determining that the conditions are not met to fog up the window glasses based on the determination in step S55 and step S59 described later, the CPU determines to perform the heating operation in the step S52 and ends the operation switching control process.

(Step S53)

When determining that the outdoor air temperature Tam is the predetermined temperature T1 or higher in the step S51, the CPU determines whether or not the target air-blowing temperature TAO is the predetermined temperature T2 (e.g. 25 degrees centigrade) or higher in the step S53. When determining that the target air-blowing temperature TAO is the predetermined temperature T2 or higher, the CPU moves the step to step S54. On the other hand, when determining that the target air-blowing temperature TAO is lower than the predetermined temperature T2, the CPU moves the step to step S57.

(Step S54)

When determining that the target air-blowing temperature TAO is the predetermined temperature T2 or higher in the step S53, the CPU determines whether or not the outdoor air temperature Tam is lower than the predetermined temperature T3 (e.g. 15 degrees centigrade, T2>T3) in the step S54. When determining that the outdoor air temperature Tam is lower than the predetermined temperature T3, the CPU moves the step to step S55. On the other hand, when determining that the outdoor air temperature Tam is the predetermined temperature T3 or higher, the CPU moves the step to step S59.

(Step S55)

When determining that the outdoor air temperature Tam is lower than the predetermined temperature T3 in the step S54, the CPU determines whether or not the conditions are met to fog up the window glasses in step S55. When determining that the conditions are met to fog up the window glasses, the CPU moves the step to step S56. On the other hand, when determining that that the conditions are not met to fog up the window glasses, the CPU moves the step to the step S52. Here, the determination whether or not the conditions are met to fog up the window glasses is made based on an estimated temperature of the surface of the window glasses calculated based on the outdoor air temperature Tam, the indoor air temperature Tr, the amount of insolation Ts and the velocity V of the vehicle, and also based on a dew point temperature calculated based on the indoor air temperature Tr and the indoor air humidity Th. To be more specific, when the estimated temperature of the surface of the window glasses is the dew point temperature or lower, the CPU determines that the conditions are met to fog up the window glasses. On the other hand, when the estimated temperature of the surface of the window glasses is higher than the dew point temperature of the air in the vehicle interior, the CPU determines that the conditions are not met to fog up the window glasses.

(Step S56)

When determining that the conditions are met to fog up the window glasses in the step S55, the CPU determines to perform the first heating and dehumidifying operation in the step S56, and ends the operation switching control process.

(Step S57)

When determining that the target air-blowing temperature TAO is lower than the predetermined temperature T2 in the step S53, the CPU determines whether or not the target air-blowing temperature TAO is higher than the outdoor air temperature Tam in the step S57. When determining that the target air-blowing temperature TAO is higher than the outdoor air temperature Tam, the CPU moves the step to step S58. On the other hand, when determining that the target air-blowing temperature TAO is the outdoor air temperature Tam or lower, the CPU moves the step to step S61.

(Step S58)

When determining that the target air-blowing temperature TAO is higher than the outdoor air temperature Tam in the step S57, the CPU determines whether or not the outdoor air temperature Tam is lower than the predetermined temperature T4 (e.g. 20 to 25 degrees centigrade) in the step S58. When determining that the outdoor air temperature Tam is lower than the predetermined temperature T4, the CPU moves the step to the step S59. On the other hand, when determining that the outdoor air temperature Tam is the predetermined temperature T4 or higher, the CPU moves the step to the step S61.

(Step S59)

When determining that the outdoor air temperature Tam is the predetermined temperature T3 or higher in the step S54, or when determining that the outdoor air temperature Tam is lower than the predetermined temperature T4 in the step S58, the CPU determines whether or not the conditions are met to fog up the window glasses in the step S59. When determining that the conditions are met to fog up the window glasses, the CPU moves the step to the step S60. On the other hand, when determining that the conditions are not met to fog up the window glasses, the CPU moves the step to the step S52.

(Step S60)

When determining that the conditions are met to fog up the window glasses in the step S59, the CPU determines to perform the second heating and dehumidifying operation in the step S60, and ends the operation switching control process.

(Step S61)

When determining that the target air-blowing temperature TAO is the outdoor air temperature Tam or lower in the step S57, or when determining that the outdoor air temperature Tam is the predetermined temperature T4 or higher in the step S58, the CPU determines to perform the cooling operation, or the cooling and dehumidifying operation in the step S61, and ends the operation switching control process.

Figure 27:
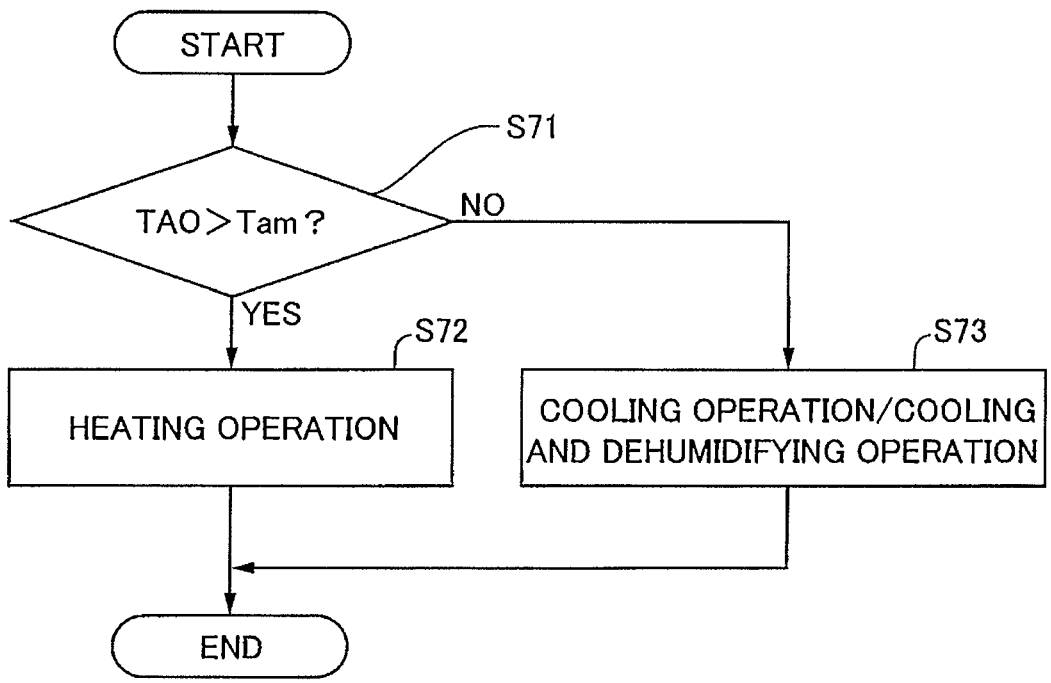
FIG. 27 is a flowchart showing an operation switching control process in the second energy saving mode.

Next, the operation switching control process in the second energy saving mode will be described with reference to the flowchart shown in FIG. 27.

(Step S71)

In step S71, the CPU determines whether or not the target air-blowing temperature TAO is higher than the outdoor air temperature Tam. When determining that the target air-blowing temperature TAO is higher than the outdoor air temperature Tam, the CPU moves the step to step S72. On the other hand, when determining that the target air-blowing temperature TAO is the outdoor air temperature Tam or lower, the CPU moves the step to step S73.

(Step S72)

When determining that the target air-blowing temperature TAO is higher than the outdoor air temperature Tam in the step S71, the CPU determines to perform the heating operation in the step S72, and ends the operation switching control process.

(Step S73)

When determining that the target air-blowing temperature TAO is the outdoor air temperature Tam or lower in the step S71, the CPU determines to perform the cooling operation or the cooling and dehumidifying operation in the step S73, and ends the operation switching control process.

Next, a method of controlling the electric motor 21a and the electric motor 16a will be described. The electric motor 21a drives the compressor 21, and the electric motor 16a drives the air mix damper 16 in order to allow the air of the target air-blowing temperature TAO to blow out of the outlets 11c, 11d and 11e.

First, the target air-blowing temperature TAO is calculated based on the preset temperature Tset, and environmental conditions such as the outdoor air temperature Tam, the indoor air temperature Tr, and an amount of insolation Ts, which are detected by the outdoor air temperature sensor 41, the indoor air temperature sensor 42, and the insolation sensor 48, respectively.

In the normal mode and the second energy saving mode during the cooling operation and the cooling and humidifying operation, the number of rotations of the electric motor 21a is controlled such that the temperature Te of the air having been cooled in the heat exchanger 14 is the predetermined target temperature Tet, based on the temperature detected by the cooled air temperature sensor 44.

Meanwhile, in the first energy saving mode during the cooling operation and the cooling and dehumidifying operation, the number of rotations of the electric motor 21a is controlled such that the temperature Te of the air having been cooled in the heat exchanger 14 is the target temperature Tet that is the dew point temperature of the air at the absolute humidity to prevent the window glasses of the vehicle interior from being fogged up. Here, the target temperature Tet is calculated based on the outdoor air temperature Tam and the indoor air temperature Tr that are detected by the outdoor air temperature sensor 41 and the indoor air temperature sensor 42, respectively.

During the cooling operation and the cooling and dehumidifying operation, the temperature of the refrigerant flowing through the radiator 15 changes according to the outdoor air temperature Tam. Therefore, the estimated temperature Tct of the air having been heated in the radiator 15 is estimated based on the outdoor air temperature Tam.

During the cooling operation and the cooling and dehumidifying operation, the outlet switching dampers 13b, 13c and 13d are set in the vent mode. The air mix damper 16 is controlled to open at opening SW that is calculated with the target air-blowing temperature TAO, the estimated temperature Tct and the target temperature Tet (SW=(TAO−Tet/(Tct−Tet).

During the heating operation, since the refrigerant does not flow into the heat exchanger 14, the target temperature Tet is not set for the air having been cooled in the heat exchanger 14. During the heating operation, when the outlet switching dampers 13b, 13c and 13d are set in the foot mode, the number of rotations of the electric motor 21a is controlled such that the temperature Tc of the air having been heated in the radiator 15 is the target heating temperature Tct obtained by adding the predetermined temperature α to the target air-blowing temperature TAO, based on the temperature detected by the heated air temperature sensor 45. Here, the predetermined temperature α is equivalent to the quantity of heat as the refrigerant flows through the air flow passage 11. In this case, the opening of the air mix damper 16 is set to 100%.

In addition, during the heating operation, when the outlet switching dampers 13b, 13c and 13d are set in the bi-level mode, the number of rotations of the electric motor 21a is controlled such that the temperature Tc of the air having been heated in the radiator 15 is the target heated temperature Tct obtained by adding the predetermined value β (α<β) to the target air-blowing temperature TAO, based on the temperature detected by the heated air temperature sensor 45. Here in the bi-level mode, there is a predetermined difference in temperature between the air blowing out of the foot outlet 11c and the air blowing out of the vent outlet 11d, so that part of the air flowing through the air flow passage 11 is not subjected to a heat exchange. Therefore, the predetermined value β is the temperature corresponding to the quantity of heat required to set the average temperature of all of the air flowing through the air flow passage 11 to the target air-blowing temperature TAO.

As described above, the opening SW of the air mix damper 16 is calculated based on the target air-blowing temperature TAO, the temperature Te of the air having been cooled in the heat exchanger 14, and the temperature Tc of the air having been heated in the radiator 15 (SW=(TAO−Te)/(Tc−Te)). During the heating operation, since the refrigerant does not flow into the heat exchanger 14, the temperature Te is one of the outdoor air temperature Tam and the indoor air temperature Tr, or the temperature of the mixed air of the outdoor air and the indoor air. When the opening SW is a fixed value (0.5 to 0.7), the temperature Tc is calculated based on the opening SW of the air mix damper 16, the target air-blowing temperature TAO and the temperature Tc (Tc=(TAO−Te)/SW+Te). Therefore, when the outlet switching dampers 13b, 13c and 13d are set in the bi-level mode, the target heated temperature Tct for the radiator 15 is calculated as the following equation.

$$Tct=TAO+\beta=(TAO-Te)/SW+Te$$

In this case, the opening SW of the air mix damper 16 is controlled within the range of, for example, 50% to 70%.

In the normal mode during the first heating and dehumidifying operation, the opening of the first expansion valve 27a is controlled such that the temperature Te of the air having been cooled in the heat exchanger 14 is the predetermined target temperature Tet, based on the temperature detected by the cooled air temperature sensor 44. Meanwhile, in the first energy saving mode, the opening of the first expansion valve 27a is controlled such that the temperature Te of the air having been cooled in the heat exchanger 14 is the target temperature Tet that is the dew point temperature of the air at the absolute humidity to prevent the window glasses of the vehicle interior from being fogged up.

In addition, during the first heating and dehumidifying operation, when the outlet switching dampers 13b, 13c and 13d are set in the foot mode, the vent mode, the defroster mode or the defroster-foot mode, the number of rotations of the electric motor 21a is controlled such that the temperature Tc of the air having been heated in the radiator 15 is the target heated temperature Tct obtained by adding the predetermined value α to the target air-blowing temperature TAO, based on the temperature detected by the heated air temperature sensor 45, in the same way as in the foot mode during the heating operation. In this case, the opening SW of the air mix damper is set to 100%.

Moreover, during the first heating and dehumidifying operation, the number of rotations of the electric motor 21a is controlled such that the temperature Tc of the air having been heated in the radiator 15 is the target heated temperature Tct obtained by adding the predetermined value β (α<β) to the target air-blowing temperature TAO, based on the temperature detected by the heated air temperature sensor 45, in the same way in the bi-level mode during the heating operation.

In this case, the opening SW of the air mix damper 16 is controlled within the range of, for example, 50% to 70% in the same way in the bi-level mode during the heating operation.

During the second heating and dehumidifying operation, the number of rotations of the electric motor 21a is controlled such that the temperature Te of the air having been cooled in the heat exchanger 14 is the predetermined target temperature Tet.

In addition, during the second heating and dehumidifying operation, the opening SW of the air mix damper 16 is controlled such that the temperature of the air blowing out of each of the outlets 11c, 11d and 11e is the target air-blowing temperature TAO.

The controller 40 switches the mode among the foot mode, the vent mode and the bi-level mode depending on the target air-blowing temperature TAO during each operation switched by the operation switching control process. To be more specific, when the target air-blowing temperature TAO is high, for example, 40 degrees centigrade, the controller 40 sets the foot mode. Meanwhile, when the target air-blowing temperature TAO is low, for example, lower than 25 degrees centigrade, the controller sets the vent mode. Moreover, when the target air-blowing temperature TAO is the temperature between the temperature for the foot mode and the temperature for the vent mode, the controller 40 sets the bi-level mode.

As described above, the vehicle air conditioning apparatus according to the present embodiment has the normal mode to switch the operation to the heating operation, the heating and dehumidifying operation, the cooling operation and the cooling and dehumidifying operation based on the environmental conditions; the first energy saving mode to switch the operation to the heating operation, the heating and dehumidifying operation, the cooling operation and the cooling and dehumidifying operation based on the environmental conditions, and, only when the fog determination part determines that the conditions are met to fog up the window glasses, to perform the heating and dehumidifying operation; and the second energy saving mode to switch the operation to the heating operation, the cooling operation and the cooling and dehumidifying operation based on the environmental conditions. These normal mode, first energy saving mode and second energy saving mode can be switched by the operation part 50. This allows a passenger of the vehicle to select the mode among the normal mode, the first energy saving mode and the second energy saving mode. When the passenger selects the first energy saving mode or the second energy saving mode whose power consumption is lower than the normal mode, it is possible to prevent the mileage of the vehicle from dropping while continuously performing air conditioning operation in the vehicle interior.

In the normal mode, the heating operation is performed when the outdoor air temperature Tam is lower than the predetermined temperature T1; The first heating and dehumidifying operation is performed when the outdoor air temperature Tam is the predetermined temperature T1 or higher and the target air-blowing temperature TAO is the predetermined temperature T2 or higher; the second heating and dehumidifying operation is performed when the outdoor air temperature is the predetermined temperature T1 or higher, the target air-blowing temperature TAO is the predetermined temperature T2 or higher, and the outdoor air temperature is the predetermined temperature T3 or higher; the second heating and dehumidifying operation is performed when the outdoor air temperature is the predetermined temperature T1 or higher, the target air-blowing temperature TAO is lower than the predetermined temperature T2 and higher than the outdoor air temperature Tam, and the outdoor air temperature Tam is lower than the predetermined temperature T4; the cooling operation or the cooling and dehumidifying operation is performed when the outdoor air temperature Tam is the predetermined temperature T1 or higher, the target air-blowing temperature TAO is lower than the predetermined temperature T2 and higher than the outdoor air temperature Tam, and the outdoor air temperature is the predetermined temperature T4 or higher; and the cooling operation or the cooling and dehumidifying operation is performed when the outdoor temperature Tam is the predetermined temperature T1 or higher, the target air-blowing temperature TAO is lower than the predetermined temperature T2 and the outdoor air temperature Tam or lower. By this means, it is possible to reliably switch the operation among the heating operation, the first heating and dehumidifying operation, the second heating and dehumidifying operation, the cooling operation and the cooling and dehumidifying operation. Consequently, it is possible to maintain the optimized temperature and humidity of the vehicle interior for the passengers.

In the first energy saving mode, the heating operation is performed when the outdoor air temperature Tam is lower than the predetermined temperature T1;
the heating operation is performed when the outdoor air temperature Tam is the predetermined temperature T1 or higher, the target air-blowing temperature TAO is the predetermined temperature T2 or higher, the outdoor air temperature is lower than the predetermined temperature T3, and it is determined that the conditions are not met to fog up the window glasses; the first heating and dehumidifying operation is performed when the outdoor air temperature Tam is the predetermined temperature T1 or higher, the target air-blowing temperature TAO is the predetermined temperature T2 or higher, the outdoor air temperature is lower than the predetermined temperature T3, and it is determined that the conditions are met to fog up the window glasses; the heating operation is performed when the outdoor air temperature Tam is the predetermined temperature T1 or higher, the target air-blowing temperature TAO is the predetermined temperature T2 or higher, the outdoor air temperature is the predetermined temperature T3 or higher, and it is determined that the conditions are not met to fog up the window glasses; the second heating and dehumidifying operation is performed when the outdoor air temperature Tam is the predetermined temperature T1 or higher, the target air-blowing temperature TAO is the predetermined temperature T2 or higher, the outdoor air temperature is the predetermined temperature T3 or higher, and it is determined that the conditions are met to fog up the window glasses; the heating operation is performed when the outdoor air temperature Tam is the predetermined temperature T1 or higher, the target air-blowing temperature TAO is lower than the predetermined temperature T2 and higher than the outdoor air temperature Tam, the outdoor air temperature is lower than the predetermined temperature T4, and it is determined that the conditions are not met to fog up the window glasses; the second heating and dehumidifying operation is performed when the outdoor air temperature Tam is the predetermined temperature T1 or higher, the target air-blowing temperature TAO is lower than the predetermined temperature T2 and higher than the outdoor air temperature Tam, the outdoor air temperature is lower than the predetermined temperature T4, and it is determined that the conditions are met to fog up the window glasses; the cooling operation or the cooling and dehumidifying operation is performed when the outdoor air temperature Tam is the predetermined temperature T1 or higher, the target air-blowing temperature TAO is lower than the predetermined temperature T2 and higher than the outdoor air temperature Tam, the outdoor air temperature Tam is higher than the predetermined temperature T4; the cooling operation or the cooling and dehumidifying operation is performed when the outdoor air temperature Tam is the predetermined temperature T1 or higher, and the target air-blowing temperature TAO is lower than the predetermined temperature T2 and higher than the outdoor air temperature Tam; By this means, in the normal mode, if the conditions are met to switch the operation to the first heating and dehumidifying operation or the second heating and dehumidifying operation, when it is determined that the conditions are not met to fog the window glasses, the first heating and dehumidifying operation and the second heating and dehumidifying operation are not performed but the heating operation is performed. By this means, it is possible to reduce the power consumption compared to the normal mode.

In the second power saving mode, the heating operation is performed when the target air-blowing temperature TAO is higher than the outdoor air temperature Tam, meanwhile the cooling operation or the cooling and dehumidifying operation is performed when the target air-blowing temperature TAO is the outdoor air temperature Tam or lower. By this means, in the normal mode or the first energy saving mode, if the conditions are met to switch the operation to the first heating and dehumidifying operation or the second heating and dehumidifying operation the first heating and dehumidifying operation or the second heating and dehumidifying operation is not performed. Therefore, it is possible to reduce the power consumption compared to the normal mode and the first energy saving mode.

In the foot mode during the heating operation, the number of rotations of the electric motor 21a is controlled such that the temperature Tc of the air after the heat exchange in the radiator 15 is the target heating temperature Tct, and the opening of the air mix damper 16 is controlled such that the percentage of the air subjected to a heat exchange with the refrigerant in the radiator 15 is maximized. In the bi-level mode during the heating operation, the number of rotations of the electric motor 21a is controlled such that the temperature Tc of the air after the heat exchange in the radiator 15 is the target heating temperature Tct, and the air mix damper 16 is controlled to open at the opening that is to be within the range of 50% to 70%, and is calculated based on the target heating temperature Tct, the temperature Te of the air flowing into the air flow passage and the target air-blowing temperature TAO. By this means, the number of rotations of the electric motor 21a and the opening of the air mix damper 16 are controlled according to the mode of the outlet switching dampers 13b, 13c and 13. Therefore, it is possible to certainly set the temperature of the air blowing to the vehicle interior to the target air-blowing temperature TAO.

In addition, the target heating temperature Tct of the foot mode during the heating operation is obtained by adding to the target air-blowing temperature the quantity of heat corresponding to the heat loss from the air to be blown out to the vehicle interior, as the air flows through the air flow passage 11. The target heating temperature Tct of the bi-level mode during the heating operation is calculated based on the target air-blowing temperature TAO, the temperature of the air flowing into the air flow passage 11 and the opening of the air mix damper 16. By this means, the target heating temperature Tct is set based on the mode of the outlet switching dampers 13b, 13c and 13, and therefore it is possible to certainly set the temperature of the air blowing to the air blowing to the vehicle interior to the target air-blowing temperature TAO.

During the first heating and dehumidifying operation, the opening of the first expansion valve 27a provided in the input side of the outdoor heat exchanger 22 into which the refrigerant flows is controlled such that the temperature Te of the air after the heat exchange in the heat exchanger 14 is the target temperature Tet after the air is cooled and dehumidified. In the foot mode, the vent mode, the defroster mode and the defroster-foot mode during the first heating and dehumidifying operation, the number of rotations of the electric motor 21a is controlled such that the temperature Tc of the air after the heat exchange in the radiator 15 is the target heating temperature Tct after the air is dehumidified, and the opening of the air mix damper 16 is controlled such that the percentage of the air subjected to a heat exchange with the refrigerant in the radiator 15 is maximized. In the bi-level mode during the first heating and dehumidifying operation, the number of rotations of the electric motor 21a is controlled such that the temperature Tc of the air after the heat exchange in the radiator 15 is the target heating temperature Tct after the air is dehumidified, and the air mix damper 16 is controlled to open at the opening that is within the range of 50 to 70% and is calculated based on the target air-blowing temperature TAO, the target temperature Tet of the air having been cooled and dehumidified, and the target heating temperature Tct of the air having been dehumidified. By this means, the number of rotations of the electric motor 21a and the opening of the air mix damper 16 are controlled according to the mode of the outlet switching dampers 13b, 13c and 13. Therefore, it is possible to certainly set the temperature of the air blowing to the vehicle interior to the target air-blowing temperature TAO.

During the first heating and dehumidifying operation, the target temperature Tet of the air having been cooled and dehumidified is calculated based on the indoor air temperature Tr, the indoor air humidity Th and the target air-blowing temperature TAO, in order to set the target temperature Tet of the air having been cooled and dehumidified to a predetermined target temperature of the air having been cooled and dehumidified in the first switching mode, and to set the indoor air humidity Th to a predetermined humidity or lower in the second switching mode. In the foot mode, the vent mode, the defroster mode and the defroster-foot mode during the first heating and dehumidifying operation, the target heating temperature Tct of the air having been dehumidified is obtained by adding to the target air-blowing temperature TAO the quantity of heat corresponding to the heat loss from the air to be blown out to the vehicle interior, as the air flows through the air flow passage 11. In the bi-level mode during the heating and dehumidifying operation, the target heating temperature Tct of the air having been dehumidified is calculated based on the target air-blowing temperature TAO, the target temperature Tet of the air having been cooled and dehumidified, and the opening of the air mix damper 16. By this means, the target temperature Tet of the air having been cooled and dehumidified and the target heating temperature Tct of the air having been dehumidified are set based on the mode of the outlet switching dampers 13b, 13c and 13. Therefore, it is possible to set the temperature of the air blowing to the vehicle interior to the target air-blowing temperature TAO.

Moreover, during the cooling operation and the cooling and dehumidifying operation, the number of rotations of the electric motor 21a is controlled such that the temperature Te of the air after the heat exchange in the heat exchanger 14 is the target temperature Tet of the air having been cooled; the temperature Tc of the air after the heat exchange in the radiator 15 is estimated as the estimated temperature Tct; and the air mix damper 16 is controlled to open at the opening calculated based on the target air-blowing temperature TAO, the target temperature Tet of the air having been cooled, and the estimated temperature Tct. By this means, the number of rotations of the electric motor 21a and the opening of the air mix damper 16 are controlled according to the mode of the outlet switching dampers 13b, 13c and 13. Therefore, it is possible to certainly set the temperature of the air blowing to the vehicle interior to the target air-blowing temperature TAO.

The target temperature Tet of the air having been cooled is calculated based on the indoor air temperature Tr, the indoor air humidity Th and the target air-blowing temperature TAO, in order to set the target temperature Tet of the air having been cooled to a predetermined target temperature Tet of the air having been cooled in the first switching mode and the third switching mode, and to set the indoor air humidity Th to a predetermined humidity or lower. By this means, the target temperature Tet and the estimated temperature Tct after the air is cooled are set according to the mode of the outlet switching damper 13b, 13c and 13d. Therefore, it is possible to certainly set the temperature of the air blowing to the vehicle interior to the target air-blowing temperature TAO.

Here, with the present embodiment, a configuration has been described where the heat of the air flowing through the air flow passage 11, which is subjected to a heat exchange with the refrigerant in the radiator 15, is used as the heat source for the first and second heating and dehumidifying operations and the cooling and dehumidifying operations. However, it is by no means limiting. When the quantity of heat is insufficient, an auxiliary heat source may be provided. For example, in addition to the radiator 15, an electric heater may be provided in the air flow passage 1 as a heat source, which can directly heat the air flow passage 11. In addition, a water heating circuit is formed across the inside and outside of the air flow passage 11 to heat the water flowing through the water heating circuit outside the air flow passage 11 and to release the heat from the heated water in the air flow passage 11.

In addition, with the present embodiment, a configuration has been described where the three-way valve 24 is used to switch between the refrigerant flow passages 20c and 20d. However, it is by no means limiting. Instead of the three-way valve 24, two solenoid valves may be used to switch between the refrigerant flow passages 20c and 20d.

Moreover, with the present embodiment, the operation switching control process is performed based on the outdoor air temperature Tam, the target air-blowing temperature TAO calculated based on the environmental conditions and the determination of whether or not the conditions are met to fog up the window glasses. As an environmental condition, at least one of the outdoor air temperature Tam, the indoor air temperature Tr, the indoor air humidity Th and the amount of insolation is used.

Moreover, with the present embodiment, in the second switching mode during the first cooling and dehumidifying operation, the target temperature Tet of the air having been cooled and dehumidified is calculated based on the indoor air temperature Tr, the indoor air humidity Th and the target air-blowing temperature TAO. In the second switching mode during the first heating and dehumidifying operation, the target temperature Tet of the air having been cooled and dehumidified may be calculated based on at least one of the outdoor air temperature Tam, the indoor air temperature Tr, the indoor air humidity Th, the amount of insolation Ts, the velocity V of the vehicle and the target air-blowing temperature TAO.

Moreover, with the present embodiment, in the second switching mode during the cooling operation and the cooling and dehumidifying operation, the target temperature Tet of the air having been cooled is calculated based on the indoor air temperature Tr, the indoor air humidity Th, and the target air-blowing temperature TAO. In the second switching mode during the cooling operation and the cooling and dehumidifying operation, the target temperature Tet of the air having been cooled may be calculated based on at least of the outdoor air temperature Tam, the indoor air temperature Tr, the indoor air humidity Th, the amount of insolation Ts, the velocity V of the vehicle, and the target air-blowing temperature TAO.

FIGS. 28 to 32 show Embodiment 6 according to the present invention.

Figure 28:
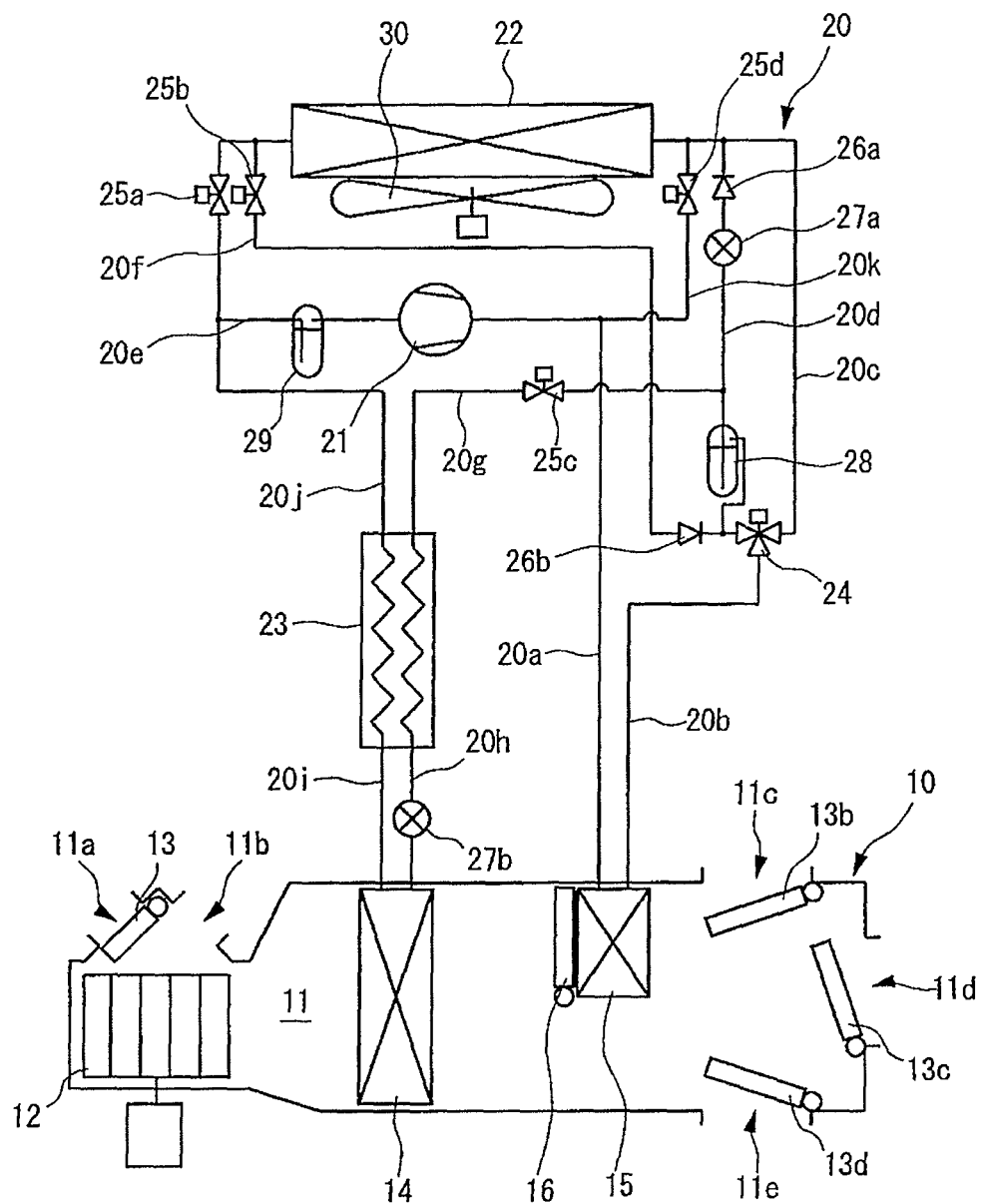
FIG. 28 is a schematic view showing the vehicle air conditioning apparatus according to Embodiment 6 of the present invention.

As shown in FIG. 28, the vehicle air conditioning apparatus according to the present invention includes the air conditioning unit 10 provided in the vehicle interior, and the refrigerant circuit 20 formed across the vehicle interior and the outdoor.

The air conditioning unit 10 includes an air flow passage 11 that allows the air to be supplied to the vehicle interior to pass through. An outdoor air inlet 11a and an indoor air inlet 11b are provided in the first end side of the air flow passage 11. The outdoor air inlet 11a is configured to allow the outdoor air to flow into the air flow passage 11, and the indoor air inlet 11b is configured to allow the indoor air to flow into the air flow passage 11. Meanwhile, a foot outlet 11c, a vent outlet 11d and a defroster outlet 11e are provided in the second end side of the air flow passage 11. The foot outlet 11c is configured to allow the air flowing through the air flow passage 11 to blow to the feet of the passengers in the vehicle. The vent outlet 11d is configured to allow the air flowing through the air flow passage 11 to blow to the upper bodies of the passengers in the vehicle. The defroster outlet 11e is configured to allow the air flowing through the air flow passage 11 to blow to the interior surface of the front window.

An indoor fan 12 such as a sirocco fan configured to allow the air to flow through the air flow passage 11 from end to end is provided in the first end side of the air flow passage 11. This indoor fan 12 is driven by the electric motor 12a.

Also, in the first end side of the air flow passage 11, an inlet switching damper 13 configured to open one of the outdoor air inlet 11a and the indoor air inlet 11b and to close the other. This inlet switching damper 13 is driven by the electric motor 13a. When the inlet switching damper 13 closes the indoor air inlet 11b and opens the outdoor air inlet 11a, the mode is switched to an outdoor air supply mode in which the air flows from the outdoor air inlet 11a into the air flow passage 11. Meanwhile, when the inlet switching damper 13 closes the outdoor air inlet 11a and opens the indoor air inlet 11b, the mode is switched to an indoor air circulation mode in which the air flows from the indoor air inlet 11b into the air flow passage 11. Moreover, when the inlet switching damper 13 is placed between the outdoor air inlet 11a and the indoor air inlet 11b and the outdoor air inlet 11a and the indoor air inlet 11b open, the mode is switched to a two-way mode in which the air flows from both the outdoor air inlet 11a and the indoor air inlet 11b into the air flow passage 11 according to the opening ratio of the outdoor air inlet 11a and the indoor air inlet 11b.

The outlet switching dampers 13b, 13c and 13d configured to open and close the foot outlet 11c, the vent outlet 11d and the defroster outlet 11e are provided in the foot outlet 11c, the vent outlet 11d and the defroster outlet 11e, respectively, in the second side of the air flow passage 11. These outlet switching dampers 13b, 13c and 13d are configured to move together by a linkage (not shown) and are opened and closed by the electric motor 13e. Here, when the outlet switching dampers 13b, 13c and 13d open the foot outlet 1c, close the bent outlet 11d and slightly open the defroster outlet 11e, most of the air flowing through the air flow passage 11 blows out of the foot outlet 11c and the remaining air blows out of the defroster outlet 11e. This mode is referred to as "foot mode." Meanwhile, when the outlet switching dampers 13b, 13c and 13d close the foot outlet 11c and the defroster outlet 11e, and open the vent outlet 11d, all the air flowing through the air flow passage 11 blows out of the vent outlet 11d. This mode is referred to as "vent mode." In addition, when the outlet switching dampers 13b, 13c and 13d open the foot outlet 11c and the vent outlet 11d, and close the defroster outlet 11e, the air flowing through the air flow passage 11 blows out of the foot outlet 11c and the vent outlet 11d. This mode is referred to as "bi-level mode." Moreover, when the outlet switching dampers 13b, 13c and 13d close the foot outlet 11c and the vent outlet 11d, and open the defroster outlet 11e, the air flowing through the air flow passage 11 blows out of the defroster outlet 11e. This mode is referred to as "defroster mode." Furthermore, when the outlet switching dampers 13b, 13c and 13d close the vent outlet 11d and open the foot outlet 11c and the defroster outlet 11e, the air flowing through the air flow passage 11 blows out of the foot outlet 11c and the defroster outlet 11e. This mode is referred to as "defroster-foot mode." Here, in the bi-level mode, the air flow passage 11, the foot outlet 11c, the vent outlet 11d, and a heat exchanger and a radiator which will be described later, are arranged and configured such that the temperature of the air blowing out of the foot outlet 11c is higher than the temperature of the air blowing out of the vent outlet 11d.

The heat exchanger 14 is provided in the air flow passage 11 in the downstream of the air flow from the indoor fan 12. The heat exchanger 14 is configured to cool and dehumidify the air flowing through the air flow passage 11. In addition, the radiator 15 is provided in the air flow passage 11 in the downstream of the air flow from the heat exchanger 14. The radiator 15 is configured to heat the air flowing through the air flow passage 11. The heat exchanger 14 and the radiator 15 are heat exchangers, each of which is constituted by fins and tubes and that is configured to perform a heat exchange between the refrigerant flowing through the refrigerant circuit and the air flowing through the air flow passage 11.

The air mix damper 16 is provided between the heat exchanger 14 and the radiator 15 in the air flow passage 11 and is configured to control the percentage of the air to be heated, which is flowing through the air flow passage 11. The air mix damper 16 is driven by the electric motor 16a. When the air mix damper 16 is disposed in the air flow passage 11 in the upstream of the radiator 15, the percentage of the air subjected to a heat exchange in the radiator 15 is reduced. Meanwhile, when the air mix damper 16 is moved to a position other than the radiator 15 in the air flow passage 11, the percentage of the air subjected to a heat exchange is increased. In the air flow passage 11, when the air mix damper 16 closes the upstream side of the radiator 15 and opens the portion other than the radiator 15, the opening is 0%, and, on the other hand, when the air mix damper 16 opens the upstream side of the radiator 15 and closes the portion other than the radiator 15, the opening is 100%.

The refrigerant circuit 20 includes: the heat exchanger 14; the radiator 15; the compressor 21 configured to compress a refrigerant; the outdoor heat exchanger 22 configured to perform a heat exchange between the refrigerant and the outdoor air; the indoor heat exchanger 23 configured to perform a heat exchange between the refrigerant flowing out of the radiator 15 or having flowed through the outdoor heat exchanger 22 and the refrigerant flowing out of the heat exchanger 14; the three-way valve 24 configured to switch the passage of the refrigerant; the first to fourth solenoid valves 25a to 25d; the first and second check valves 26a and 26b; the first and second expansion valves 27a and 27b configured to decompress the flowing refrigerant; the receiver tank 28 configured to accumulate an extra refrigerant; and the accumulator 29 configured to separate between refrigerant vapor and refrigerant liquid to prevent the refrigerant liquid from being sucked into the compressor 21. These components are connected to each other by a copper pipe or an aluminum pipe. The compressor 21 and the outdoor heat exchanger 22 are disposed outside the vehicle interior. The compressor 21 is driven by the electric motor 21a. The outdoor heat exchanger 22 is provided with the outdoor fan 30 configured to perform a heat exchange between the outdoor air and the refrigerant when the vehicle stops. The outdoor fan 30 is driven by the electric motor 30a. The first expansion valve 27a is an electronic expansion valve with the adjustable opening.

To be more specific, the input side of the radiator 15 into which the refrigerant flows is connected to the delivery side of the compressor 21 from which the refrigerant is discharged to form the refrigerant flow passage 20a. In addition, the input side of the outdoor heat exchanger 22 heat exchanger 22 into which the refrigerant flows is connected to the output side of the radiator 15 from which the refrigerant is discharged, thereby to form the refrigerant flow passage 20b. The three-way valve 24 is provided in the refrigerant flow passage 20b. The one side of the three-way valve 24 from which the refrigerant is discharged and another side from which the refrigerant is discharged are parallel to one another and are connected to the input side of the outdoor heat exchanger 22 into which the refrigerant flows and thereby to form the refrigerant flow passages 20c and 20d. In the refrigerant flow passage 20d, the receiver tank 28, the first expansion valve 27a and the first check valve 26a are provided in the order from the upstream of the flow of the refrigerant. The suction side of the compressor 21 into which the refrigerant is sucked and the part of the refrigerant flow passage 20d between the three-way valve 24 and the receiver tank 28 are connected in parallel to the output side of the outdoor heat exchanger 22 from which the refrigerant is discharged, thereby to form the refrigerant flow passage 20e and 20f. The first solenoid valve 25a and the accumulator 29 are provided in the refrigerant flow passage 20e in the order from the upstream of the flow of the refrigerant. The second solenoid valve 25b and the second check valve 26b are provided in the refrigerant flow passage 20f in the order from the upstream of the flow of the refrigerant. The input side of the indoor heat exchanger 23 into which a high-pressure refrigerant flows is connected to the part of the refrigerant flow passage 20d between the receiver tank 28 and the first expansion valve 27a, thereby to form the refrigerant flow passage 20g. The third solenoid valve 25c is provided in the refrigerant flow passage 20g. The input side of the heat exchanger 14 into which the refrigerant flows is connected to the output side of the indoor heat exchanger 23 from which the high-pressure refrigerant is discharged, thereby to form the refrigerant flow passage 20h. The second expansion valve 27b is provided in the refrigerant flow passage 20h. The input side of the indoor heat exchanger 23 into which a low-pressure refrigerant flows is connected to the output side of the heat exchanger 14 from which the refrigerant is discharged, thereby to form the refrigerant flow passage 20i. The part of the refrigerant flow passage 20e between the first solenoid valve 25a and the accumulator 29 is connected to the output side of the indoor heat exchanger 23 from which the low-pressure refrigerant is discharged, thereby to provide the refrigerant flow passage 20j. The input side of the outdoor heat exchanger 22 into which the refrigerant flows is connected to the refrigerant flow passage 20a, thereby to provide the refrigerant flow passage 20k. The fourth solenoid valve 25d is provided in refrigerant flow passage 20k.

Moreover, the vehicle air conditioning apparatus also includes a controller 40 that controls the temperature and the humidity of the vehicle interior to be the preset temperature and humidity.

The controller 40 includes a CPU, a ROM and a RAM. In the controller, upon receiving an input signal from a device connected to the input side, the CPU reads the program stored in the ROM according to the input signal, stores the state detected by the input signal on the RAM and transmits an output signal to a device connected to the output side.

Figure 29:
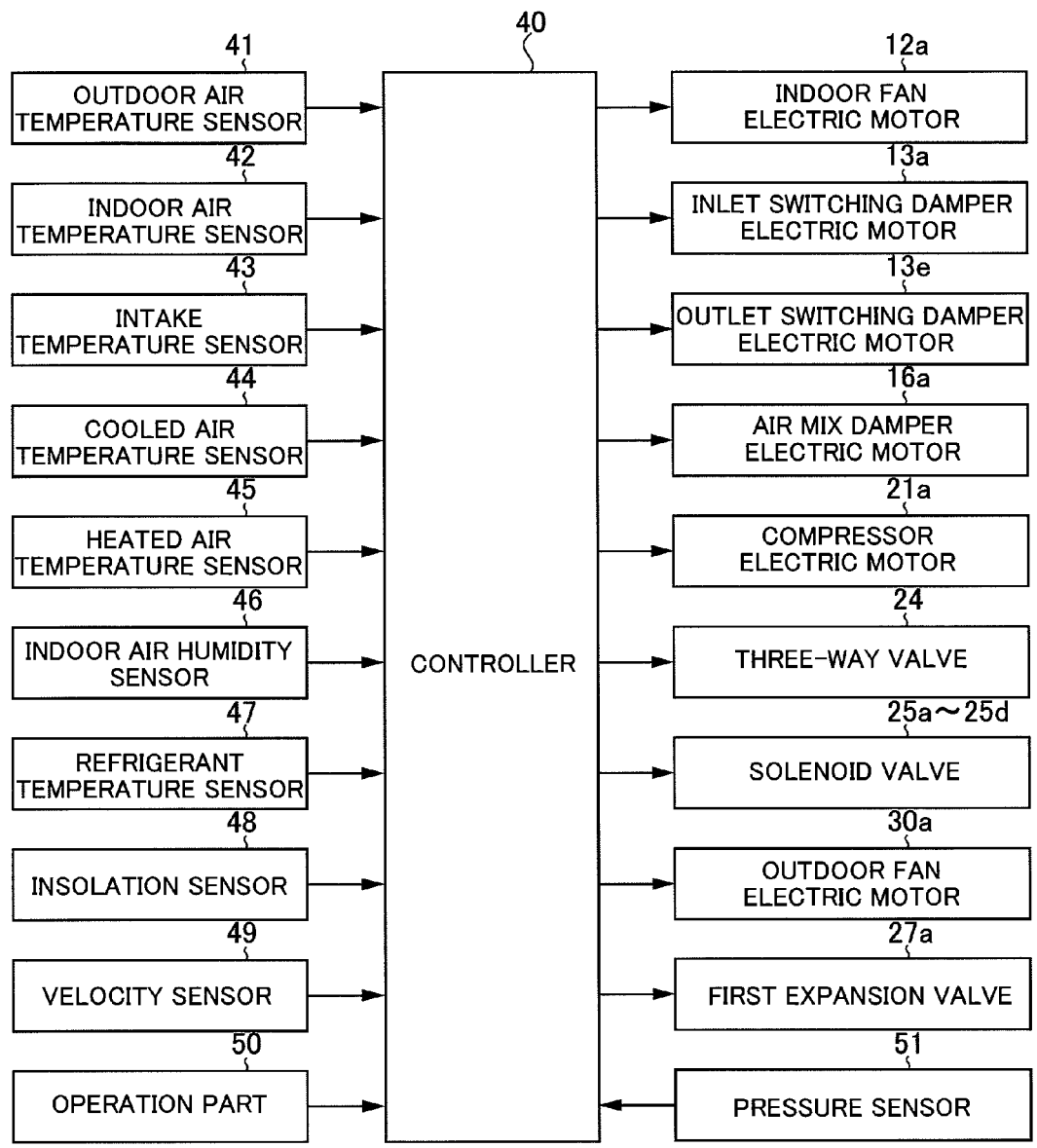
FIG. 29 is a block diagram showing a control system.

As shown in FIG. 29, the electric motor 12a for driving the indoor fan 12; the electric motor 13a for driving the inlet switching damper 13; the electric motor 13e for driving the outlet switching dampers 13b, 13c and 13d; the electric motor 16a for driving the air mix damper 16; the electric motor 21a for driving the compressor 21; the three-way valve 24; the first to fourth solenoid valves 25a to 25d; the first expansion valve 27a; and the electric motor 30a for driving the outdoor fan 30 are connected to the output side of the controller 40.

As shown in FIG. 29, the outdoor air temperature sensor 41 configured to detect temperature Tam outside the vehicle interior; the indoor air temperature sensor 42 configured to detect the temperature Tr in the vehicle interior; the intake temperature sensor 43 configured to detect temperature Ti of the air flowing into the air flow passage 11; the cooled air temperature sensor 44 configured to detect temperature Te of the air having been cooled in the heat exchanger 14; the heated air temperature sensor 45 configured to detect temperature Tc of the air having been heated in the radiator 15; the indoor air humidity sensor 46 configured to detect the humidity Th in the vehicle interior; a refrigerant temperature sensor 47 configured to detect temperature Thex of the refrigerant after the heat exchange in the outdoor heat exchanger 22; the insolation sensor 48 such as a photo sensor configured to detect amount of insolation Ts; the velocity sensor 49 configured to detect velocity V of the vehicle; the operation part 50 configured to set modes regarding to target setting temperature Tset and the switching of the operation; and a pressure sensor 51 configured to detect pressure P of the refrigerant in the outdoor heat exchanger 22 are connected to the input side of the controller 40.

The vehicle air conditioning apparatus having the above-described configuration performs cooling operation, cooling and dehumidifying operation, heating operation, heating and dehumidifying operation, and defrost operation. Now, each operation will be explained.

Figure 30:
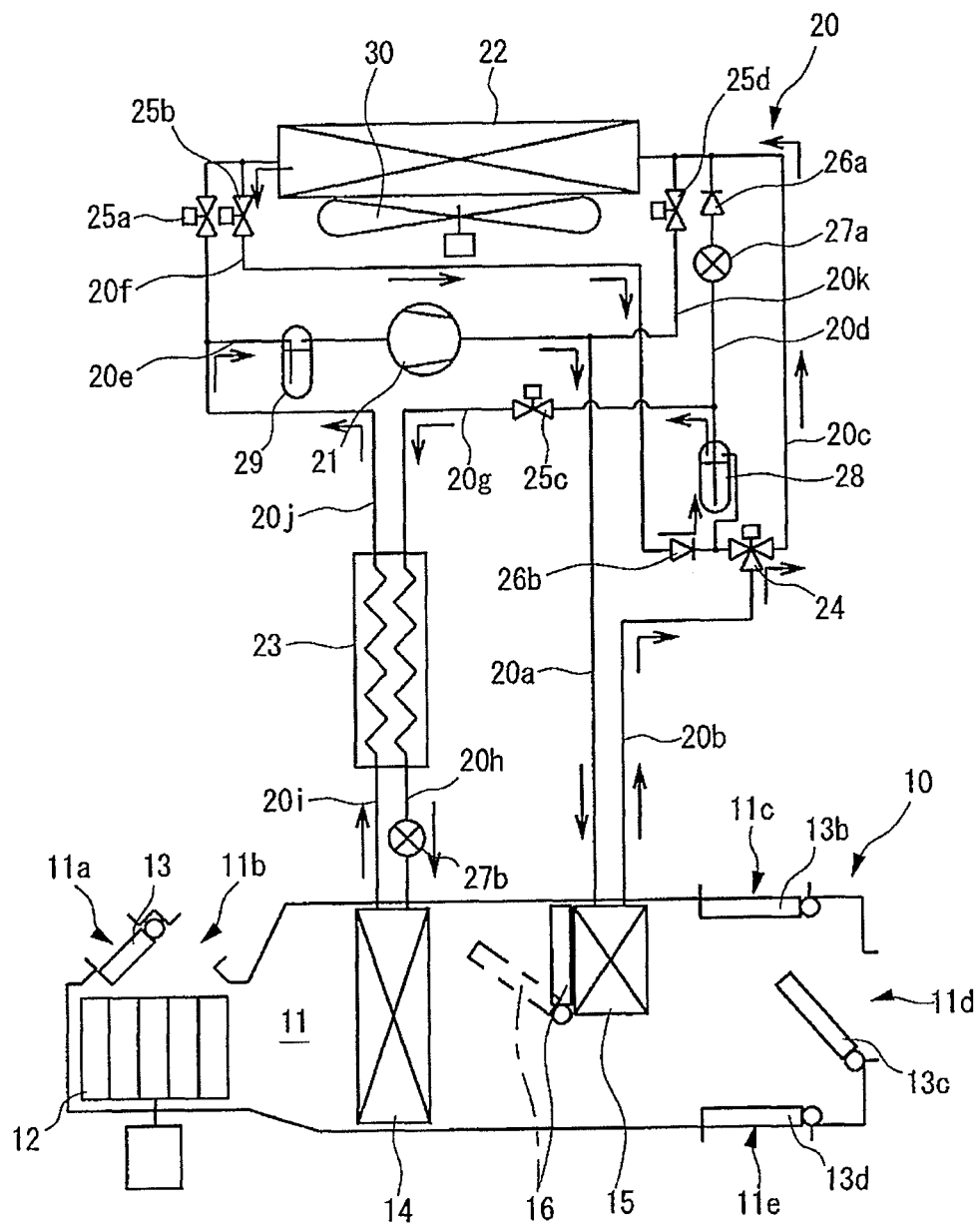
FIG. 30 is a schematic view showing the vehicle air conditioning apparatus performing a cooling operation and a cooling and dehumidifying operation.

During the cooling operation and the cooling and dehumidifying operation, in the refrigerant circuit 20, the flow passage of three-way valve 24 is set to the refrigerant flow passage 20c side; the second and third solenoid valves 25b and 25c are opened and the first and fourth solenoid valves 25a and 25d are closed; and the compressor 21 is operated. By this means, as shown in FIG. 30, the refrigerant discharged from the compressor 21 flows through in this order: the refrigerant flow passage 20a; the radiator 15; the refrigerant flow passages 20b and 20c; the outdoor heat exchanger 22, the refrigerant flow passages 20f, 20d and 20g, the high-pressure side of the indoor heat exchanger 23; the refrigerant flow passage 20h; the heat exchanger 14; the refrigerant flow passage 20i; the low-pressure side of the indoor heat exchanger 23; and the refrigerant flow passages 20j and 20e, and is sucked into the compressor 21. The refrigerant flowing through the refrigerant circuit 20 releases the heat in the outdoor heat exchanger 22 and absorbs the heat in the heat exchanger 14. When the air mix damper 16 is open during the cooling and dehumidifying operation, the refrigerant releases the heat also in the radiator 15.

In this case, in the air conditioning unit 10 during the cooling operation, the indoor fan 12 is operated to flow the air through the air flow passage 11, and the air is subjected to a heat exchange with the refrigerant in the heat exchanger 14 and cooled. The temperature of the cooled air becomes the target air-blowing temperature TAO of the air to blow out of the outlets 11c, 11d and 11e in order to set the temperature of the vehicle interior to the target setting temperature Tset. Then, the air at the temperature TAO blows to the vehicle interior.

Meanwhile, in the air conditioning unit 10 during the cooling and dehumidifying operation, the indoor fan 12 is operated to flow the air through the air flow passage 11, and the air is subjected to a heat exchange with the refrigerant which absorbs the heat in the heat exchanger 14, and therefore is cooled and dehumidified. The air having been dehumidified in the heat exchanger 14 is subjected to a heat exchange with the refrigerant which releases the heat in the radiator 15, and therefore heated. As a result, the air at the target air-blowing temperature TAO blows to the vehicle interior.

Figure 31:
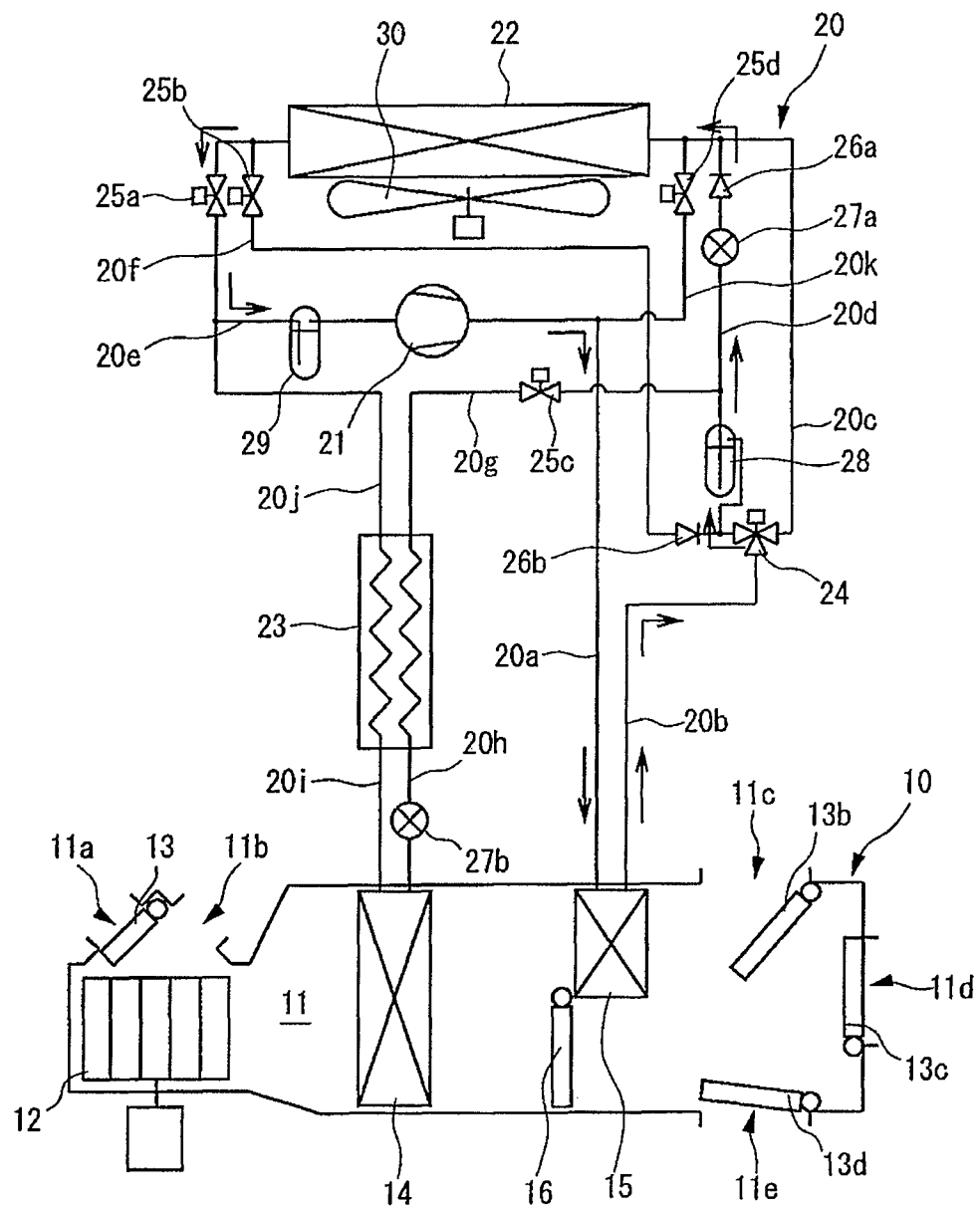
FIG. 31 is a schematic view showing the vehicle air conditioning apparatus performing a heating operation.

During the heating operation, in the refrigerant circuit 20, the flow passage of the three-way valve 24 is set to the refrigerant flow passage 20d side; the first solenoid valve 25a is opened and the second to fourth solenoid valves 25b to 25*d* are closed; and the compressor 21 is operated. By this means, as shown in FIG. 31, the refrigerant discharged from the compressor 21 flows through in this order: the refrigerant flow passage 20*a*; the radiator 15; the refrigerant flow passages 20*b* and 20*d*; the outdoor heat exchanger 22; and the refrigerant flow passage 22*e*, and is sucked into the compressor 21. The refrigerant flowing through the refrigerant circuit 20 releases the heat in the radiator 15 and absorbs the heat in the outdoor heat exchanger 22.

In this case, in the air conditioning unit 10, the indoor fan 12 is operated to flow the air through the air flow passage 11, and the flowing air is not subjected to a heat exchange with the refrigerant in the heat exchanger 14, but is subjected to a heat exchange with the refrigerant in the radiator 15 and therefore is heated. As a result, the air at the target air-blowing temperature TAO blows to the vehicle interior.

Figure 32:
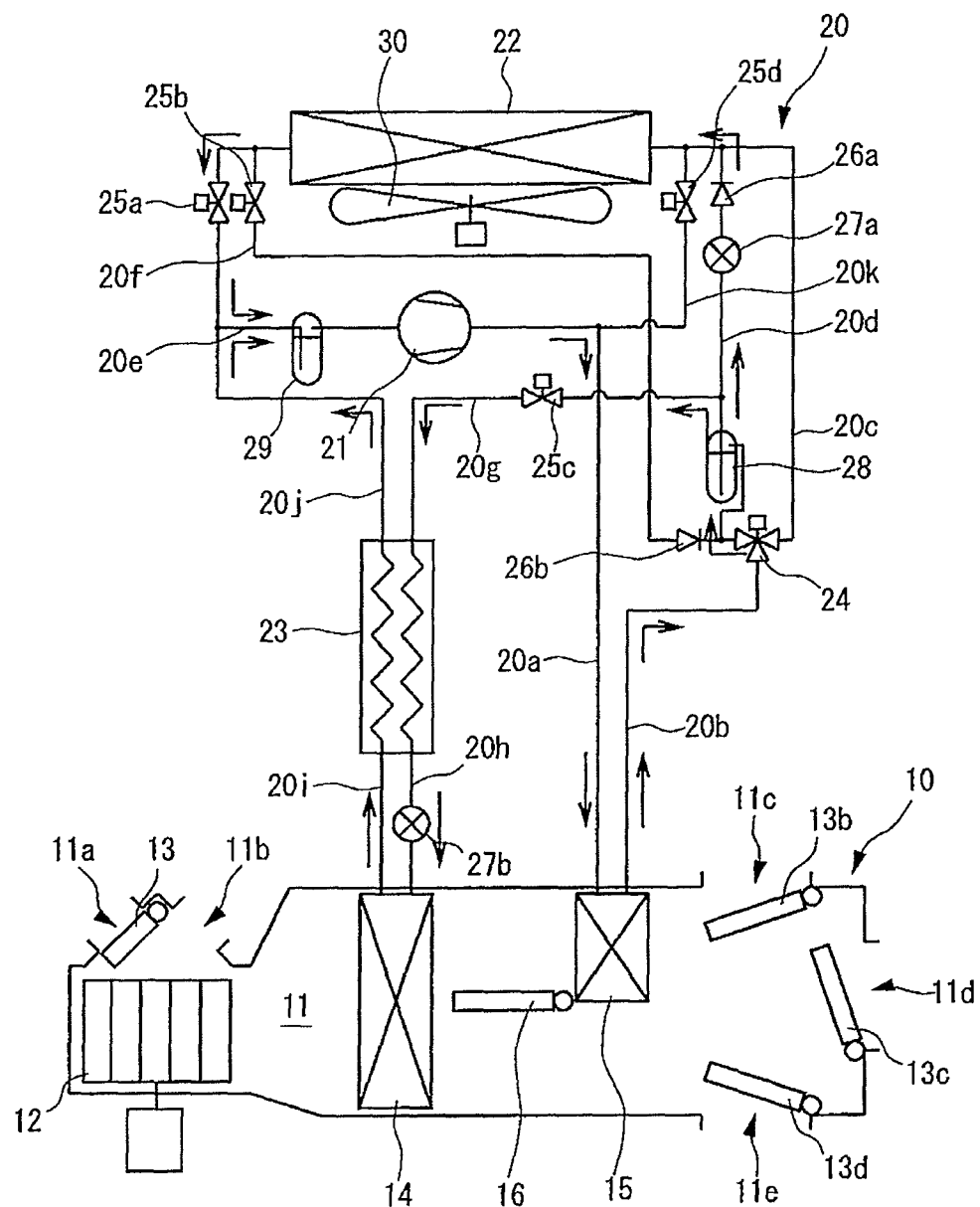
FIG. 32 is a schematic view showing the vehicle air conditioning apparatus performing a heating and dehumidifying operation.

During the heating and dehumidifying operation, in the refrigerant circuit 20, the flow passage of the three-way valve 24 is set to the refrigerant flow passage 20*d* side; the first and third solenoid valves 25*a* and 25*c* are opened and the second and fourth solenoid valves 25*b* and 25*d* are closed; and the compressor 21 is operated. By this means, as shown in FIG. 32, the refrigerant discharged from the compressor 21 flows through in this order: the refrigerant flow passage 20*a*; the radiator 15; and the refrigerant flow passages 20*b* and 20*d*. Part of the refrigerant flowing through the refrigerant flow passage 20*d* flows through in this order: the outdoor heat exchanger 22; and the refrigerant flow passage 20*e*, and is sucked into the compressor 21. Meanwhile, the remaining refrigerant flowing through the refrigerant flow passage 20*d* flows through in this order: the refrigerant flow passage 20*g*; the high-pressure side of the indoor heat exchanger 23; the refrigerant flow passage 20*h*; the heat exchanger 14; the refrigerant flow passage 20*i*; the low-pressure side of the indoor heat exchanger 23; and the refrigerant flow passages 20*j* and 20*e*, and is sucked into the compressor 21. The refrigerant flowing through the refrigerant circuit 20 releases the heat in the radiator 15 and absorbs the heat in the heat exchanger 14 and the outdoor heat exchanger 22.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified. Part of the air having been dehumidified in the heat exchanger 14 is subjected to a heat exchange with the refrigerant in the radiator 15 and heated. As a result, the air at the target air-blowing temperature TAO blows into the vehicle interior.

Figure 33:
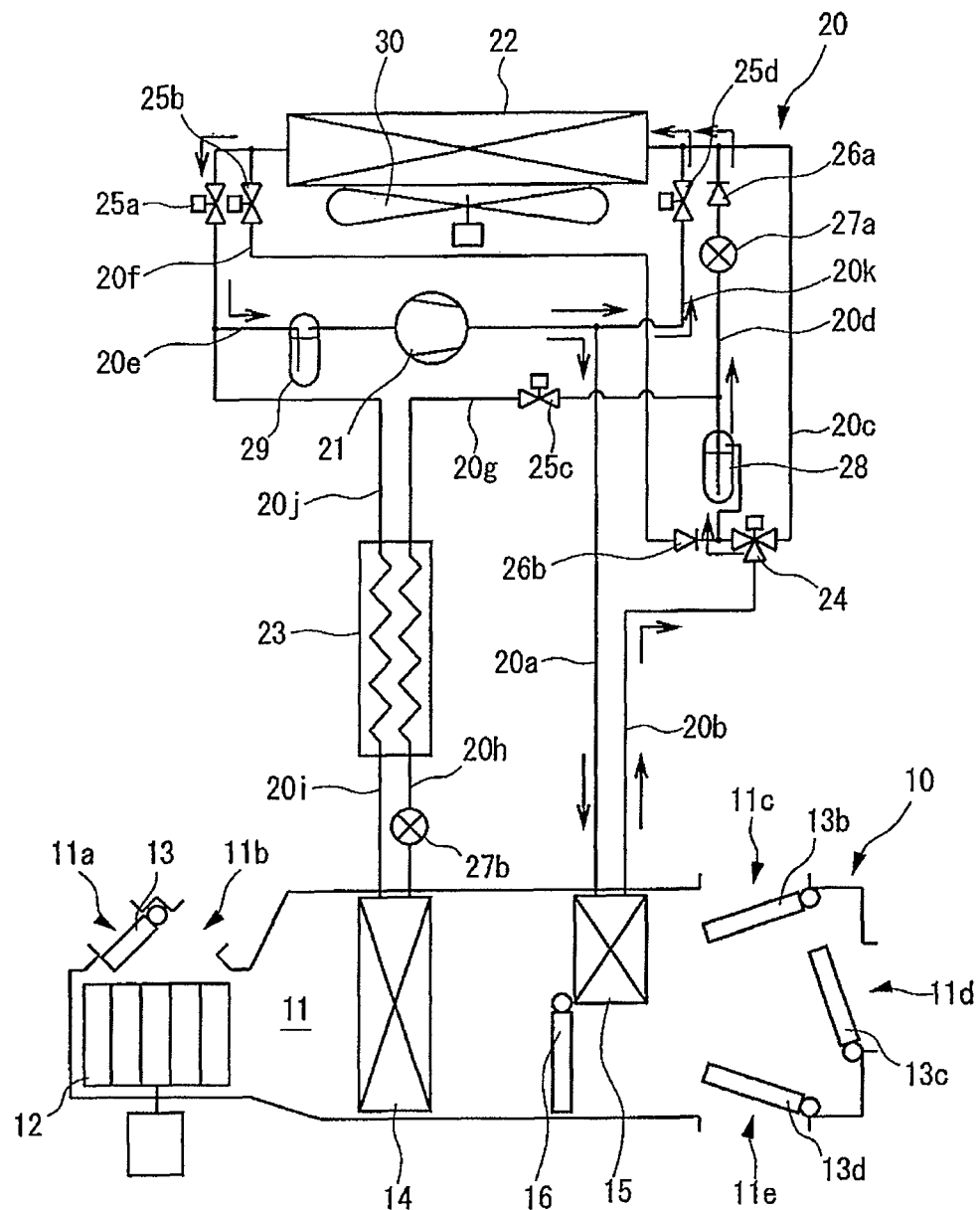
FIG. 33 is a schematic view showing the vehicle air conditioning apparatus performing a defrost operation.

During the defrost operation, in the refrigerant circuit 20, the flow passage of the three-way valve 24 is set to the refrigerant flow passage 20*d* side; the first and fourth solenoid valves 25*a* and 25*d* are opened and the second and third solenoid valves 25*d* and 25*c* are closed; and the compressor 21 is operated. By this means, as shown in FIG. 33, part of the refrigerant discharged from the compressor 21 flows through in this order: the refrigerant flow passage 20*a*; the radiator 15; the refrigerant flow passages 20*b* and 20*d*, and flows into the outdoor heat exchanger 22. Meanwhile, the remaining refrigerant discharged from the compressor 21 flows through the refrigerant flow passages 20*a* and 20*k* and flows into the outdoor heat exchanger 22. The refrigerant flowing out of the outdoor heat exchanger 22 flows through the refrigerant flow passage 20*e*, and is sucked into the compressor 21. The refrigerant flowing through the refrigerant circuit 20 releases the heat in the radiator 15, and at this time, absorbs the heat in the outdoor heat exchanger 22.

In this case, in the air conditioning unit 10, the indoor fan 12 is operated to flow the air through the air flow passage 11. The flowing air is not subjected to a heat exchange with the refrigerant in the heat exchanger 14, but is subjected to a heat exchange with the refrigerant which releases the heat in the radiator 15, and therefore is heated and then blows to the vehicle interior.

While the automatic switch of the operation part 50 is turned on, the controller 40 performs an operation switching control process to switch the operation among the cooling operation, the cooling and dehumidifying operation, the heating operation, the heating and dehumidifying operation, and the defrost operation, based on indoor and outdoor environmental conditions, such as temperature.

The controller 40 switches the mode among the foot mode, the vent mode and the bi-level mode depending on the target air-blowing temperature TAO during each operation switched by the operation switching control process. To be more specific, when the target air-blowing temperature TAO is high, for example, 40 degrees centigrade, the controller 40 sets the foot mode. Meanwhile, when the target air-blowing temperature TAO is low, for example, lower than 25 degrees centigrade, the controller sets the vent mode. Moreover, when the target air-blowing temperature TAO is the temperature between the temperature for the foot mode and the temperature for the vent mode, the controller 40 sets the bi-level mode.

The controller 40 switches the mode of the outlets 11*c*, 11*d* and 11*e* by using the outlet switching dampers 13*b*, 13*c* and 13*d*, and controls the opening of the air mix damper 16 in order to set the temperature of the air blowing out of the outlets 11*c*, 11*d*, and 11*e* to the target air-blowing temperature TAO.

Figure 34:
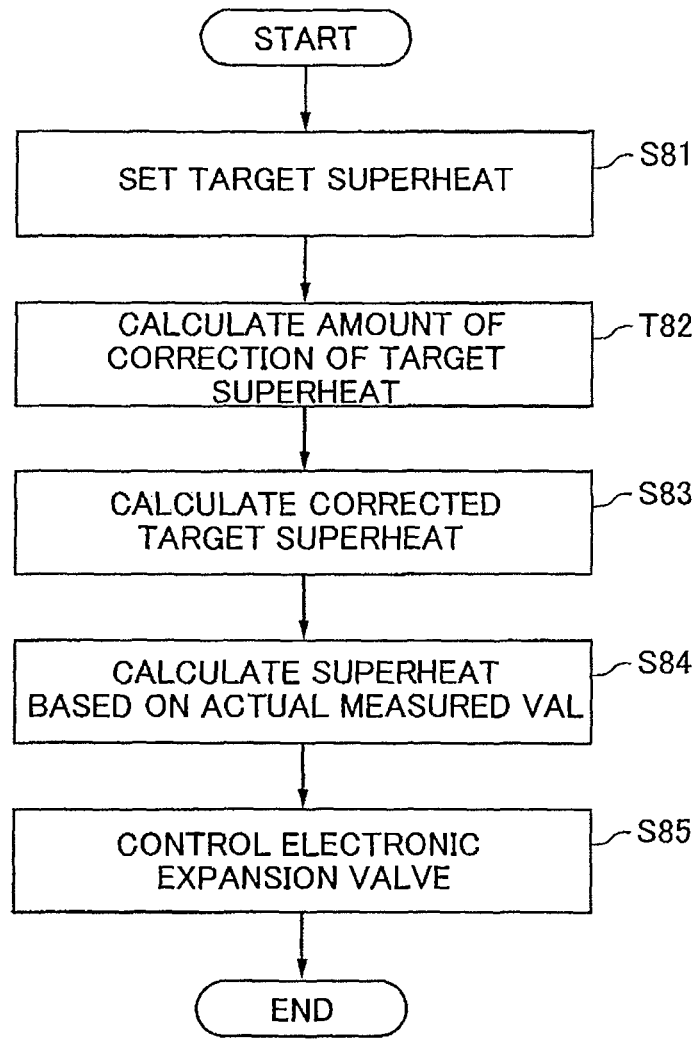
FIG. 34 is a flowchart showing a superheat control process.

In addition, during the heating operation and the heating and dehumidifying operation, the controller 40 performs a superheat control process to optimize the superheat of the refrigerant flowing out of the outdoor heat exchanger 22. Now, the operation of the controller 40 for this process will be explained with reference to the flowchart shown in FIG. 34.

(Step 81)

In step 81, the CPU sets predetermined value A (e.g. 2 to 5 degrees centigrade) as target superheat SHt when the operation is the heating operation, and sets a value calculated based on the outdoor air temperature Tam and the target temperature Tet of the heat exchanger 14 as target superheat SHt when the operation is the heating and dehumidifying operation.

(Step S82)

In step S82, the CPU calculates amount of correction H for the target superheat SHt set in the step S1, based on the temperature Te and the target temperature Tet of the heat exchanger 14. To be more specific, the CPU determines whether or not the temperature Te detected by the cooled air temperature sensor 44 is equal to or lower than temperature (Tet-α) obtained by reducing predetermined temperature a from the target temperature Te. When determining that the temperature Te is Tet-α or lower, the CPU determines amount of correction H (H<0) to reduce the target superheat SHt. On the other hand, determining that the temperature Te is higher than Tet-α, the CPU determines amount of correction H(H>0) to increase the target superheat SHt.

(Step S83)

In step S83, the CPU calculates corrected target superheat SHtc obtained by adding the amount of correction H to the target superheat SHt.

(Step S84)

In step S84, the CPU calculates the superheat SH of the refrigerant based on the pressure P of the refrigerant in the outdoor heat exchanger 22 and the temperature $T_{hex}$ of the refrigerant flowing out of the outdoor heat exchanger 22.

(Step S85)

In step S85, the CPU controls the opening of the first expansion valve 27a based on the corrected target superheat SHtc and the superheat SH.

In this way, with the vehicle air conditioning apparatus according to the present embodiment, the opening of the first expansion valve 27a is controlled based on the target superheat SHt and the superheat SH of the refrigerant. The target superheat SHt is assigned the predetermined value A during the heating operation, while being assigned the value calculated based on the outdoor air temperature Tam and the target temperature Tet of the heat exchanger 14 during the heating and dehumidifying operation. The superheat SH of the refrigerant is calculated based on the pressure P of the refrigerant in the outdoor heat exchanger 22 and the temperature $T_{hex}$ of the refrigerant flowing out of the outdoor heat exchanger 22. Thus, by controlling the superheat SH of the refrigerant flowing out of the outdoor heat exchanger 22, it is possible to optimize the quantity of the heat absorbed in the outdoor heat exchanger 22, and therefore to maintain the temperature Tr and the humidity Th of the vehicle interior in good conditions.

Figure 35:
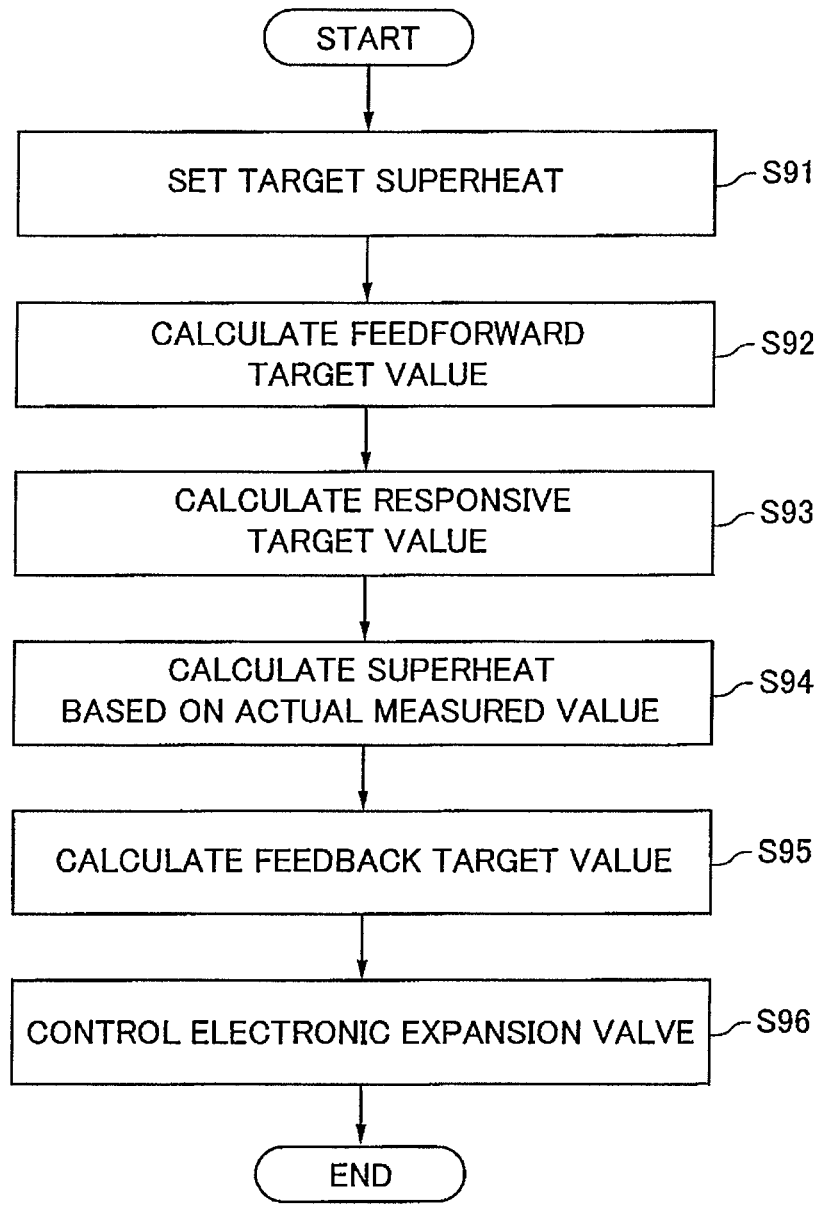
FIG. 35 is a flowchart showing a superheat control process according to Embodiment 7 of the present invention.

FIG. 35 shows Embodiment 7 of the present invention. Here, the same components are assigned the same reference numerals as in the above-described embodiments.

In the vehicle air conditioning apparatus according to the present embodiment, the controller 40 performs a superheat control process as shown in the flowchart in FIG. 35 with the same configuration as in Embodiment 1.

(Step S91)

In step S91, the CPU sets predetermined value A (e.g. 2 to 5 degrees centigrade) as target superheat SHt when the operation is the heating operation, and sets a value calculated based on the outdoor air temperature Tam and the target temperature Tet of the heat exchanger 14 as target superheat SHt when the operation is the heating and dehumidifying operation.

(Step S92)

In step S92, the CPU calculates feedfoward target value EXVtgtFF for the opening of the first expansion valve 27a, based on the target superheat SHt set in the step S11. The feedfoward target value EXVtgtFF is calculated based on the outdoor air temperature Tam, voltage BLV of the electric motor 12a to drive the indoor fan 12, and number of rotations Nc of the electric motor 21a to drive the compressor 21 (EXVtgtFF=KaxTam+KbxBLV+KcxNc+d, where Ka, Kb, Kc, and d are preset fixed values).

(Step S93)

In step S93, the CPU calculates target value SHtgt responsive to the target superheat SHt based on the target superheat SHt set in step. S11.

The responsive target value SHtgtf is made to respond to the target superheat SHt with a first-order lag.

(Step S94)

In step S94, the CPU calculates the superheat SH of the refrigerant based on the pressure P of the refrigerant in the outdoor heat exchanger 22 and the temperature $T_{hex}$ of the refrigerant flowing out of the outdoor heat exchanger 22.

(Step S95)

In step S95, the CPU calculates feedback target value EXVtgtFB for the opening of the first expansion valve 27a, based on the responsive target value SHtgtf calculated in the step 13 and the superheat SH of the refrigerant calculated in the step S14. The feedback target value EXVtgtFB is an output value of proportional-plus-integral control (PI control), which is calculated based on the responsive target value SHtgtf and the superheat SH of the refrigerant calculated in the step S14 (EXVtgtFB=EXVtgtfbp+EXVtgtfbi, EXVtgtfbp=Kp×(SHtgtf−SH), EXVtgtfbi=EXVtgtfbi_n−1+ Kp/Ti×(SHtgtf−SH), where Kp is a constant value as proportional gain; Ti is integral time; and EXVtgtfbi_n−1 is the previous value of EXVtgtfbi).

(Step S96)

In step S96, the CPU controls the opening of the first expansion valve 27a based on the feedforward target value EXVtgtFF calculated in the step S12 and the feedback target value EXVtgtFB calculated in the step S15.

As described above, with the vehicle air conditioning apparatus according to the present embodiment, by controlling the superheat SH of the refrigerant flowing out of the outdoor heat exchanger 22, it is possible to optimize the quantity of the heat absorbed in the outdoor heat exchanger 22 in the same way as in the above-described embodiment. Therefore, it is possible to maintain the indoor air temperature Tr and the indoor air humidity Th in good conditions.

In addition, the feedforward target value EXVtgtFF for the opening of the first expansion valve 27a is calculated based on the target superheat SHt. The target value SHtgtf responsive to the target superheat SHt is calculated. The feedback target value EXVtgtFB for the opening of the first expansion valve 27a is calculated based on the responsive target value SHtgtf and the superheat SH of the refrigerant. The opening of the first expansion valve 27a is controlled based on the feedfoward target value EXVtgtFF and the feedback target value EXVtgtFB. By this means, it is possible to improve the performance of the control of the indoor air temperature Tr and the indoor air humidity Th.

Here, with the present embodiment, a configuration has been described where the quantity of heat of the air flowing through the air flow passage 11, which is subjected to a heat exchange with the refrigerant in the radiator 15, is used as the heat source for the heating operation, the heating and dehumidifying operation and the cooling and dehumidifying operation. However, it is by no means limiting. When the quantity of heat is insufficient, an auxiliary heat source may be provided. For example, in addition to the radiator 15, an electric heater may be provided in the air flow passage 1 as a heat source, which can directly heat the air flow passage 11. In addition, a water heating circuit is formed across the inside and outside of the air flow passage 11 to heat the water flowing through the water heating circuit outside the air flow passage 11 and to release the heat from the heated water in the air flow passage 11.

In addition, a configuration has been described where the three-way valve 24 is used to switch between the refrigerant flow passages 20c and 20d. However, it is by no means limiting. Instead of the three-way valve 24, two solenoid valves may be used to switch between the refrigerant flow passages 20c and 20d.

REFERENCE SIGNS LIST 10 air conditioning unit; 14 heat exchanger; 15 radiator; 20 refrigerant circuit; 20a to 20j refrigerant flow passage; 20k bypass flow passage; 21 compressor; 22 outdoor heat exchanger; 24 three-way valve; 25a to 25e first to fifth solenoid valve; 26a to 26c first to third check valve; 27a first expansion valve; 27b second expansion valve; 27c electronic expansion valve; 40 controller; 41 outdoor air temperature sensor; 42 indoor air temperature sensor; 43 intake temperature sensor; 44 cooled air temperature sensor; 45 heated air temperature sensor; 46 indoor air humidity sensor; 47 refrigerant temperature sensor; 48 insolation sensor; 49 velocity sensor; 50 operation part; 51 pressure sensor

The invention claimed is:

1. A vehicle air conditioning apparatus comprising:
a compressor configured to compress and discharge a refrigerant;
a radiator provided in a vehicle interior and configured to release heat from the refrigerant;
a heat exchanger provided in the vehicle interior and configured to absorb the heat into the refrigerant; and
an outdoor heat exchanger provided outside the vehicle interior and configured to release the heat from or absorb the heat into the refrigerant,
the vehicle air conditioning apparatus performing:
a cooling operation to release the heat from the refrigerant discharged from the compressor in the outdoor heat exchanger, to decompress the refrigerant by an expansion part, and to absorb the heat into the refrigerant in the heat exchanger;
a cooling and dehumidifying operation to release the heat from the refrigerant discharged from the compressor in the radiator and the outdoor heat exchanger, to decompress the refrigerant by the expansion part, and to absorb the heat into the refrigerant in the heat exchanger;
a heating operation to release the heat from the refrigerant discharged from the compressor in the radiator, to decompress the refrigerant by the expansion part, and to absorb the heat into the refrigerant in the outdoor heat exchanger; and
a heating and dehumidifying operation to release the heat from the refrigerant discharged from the compressor in the radiator, to decompress part of the refrigerant by the expansion part, and to absorb the heat into the refrigerant in the heat exchanger while decompressing a remaining refrigerant by the expansion part and then absorbing the heat into the refrigerant in the outdoor heat exchanger,
the vehicle air conditioning apparatus further comprising:
a flow regulating valve provided in a refrigerant flow passage to flow the refrigerant into the heat exchanger and configured to regulate an amount of the refrigerant flowing through the refrigerant flow passage;
an evaporating temperature detection part configured to detect an evaporating temperature of the refrigerant in the heat exchanger; and
a flow control part configured to reduce the amount of the refrigerant flowing into the heat exchanger by using the flow regulating valve, when the evaporating temperature detected by the evaporating temperature detection part is a predetermined temperature or lower during the heating and dehumidifying operation.

2. The vehicle air conditioning apparatus according to claim 1, wherein the flow adjusting valve is an electronic control valve with an adjustable opening.

3. A vehicle air conditioning apparatus comprising:
a compressor configured to compress and discharge a refrigerant;
a radiator provided in a vehicle interior and configured to release heat from the refrigerant;
a heat exchanger provided in the vehicle interior and configured to absorb the heat into the refrigerant; and
an outdoor heat exchanger provided outside the vehicle interior and configured to release the heat from or absorb the heat into the refrigerant,
the vehicle air conditioning apparatus performing:
a cooling operation to release the heat from the refrigerant discharged from the compressor in the outdoor heat exchanger, to decompress the refrigerant by an expansion part, and to absorb the heat into the refrigerant in the heat exchanger;
a cooling and dehumidifying operation to release the heat from the refrigerant discharged from the compressor in the radiator and the outdoor heat exchanger, to decompress the refrigerant by the expansion part, and to absorb the heat into the refrigerant in the heat exchanger;
a heating operation to release the heat from the refrigerant discharged from the compressor in the radiator, to decompress the refrigerant by the expansion part, and to absorb the heat into the refrigerant in the outdoor heat exchanger; and
a heating and dehumidifying operation to release the heat from the refrigerant discharged from the compressor in the radiator, to decompress part of the refrigerant by the expansion part, and to absorb the heat into the refrigerant in the heat exchanger while decompressing a remaining refrigerant by the expansion part and then absorbing the heat into the refrigerant in the outdoor heat exchanger,
the vehicle air conditioning apparatus further comprising:
a bypass flow passage configured to communicate between part of a refrigerant flow passage connected to an input side of the heat exchanger into which the refrigerant flows and part of the refrigerant flow passage connected to an output side of the heat exchanger from which the refrigerant flows;
a flow regulating valve configured to be able to adjust an amount of the refrigerant flowing through the bypass flow passage;
an evaporating temperature detection part configure to detect an evaporating temperature of the refrigerant in the heat exchanger; and
a refrigerant flow control part configured to increase the amount of the refrigerant flowing through the bypass flow passage by using the flow regulating valve, when the evaporating temperature detected by the evaporating temperature detection part is a predetermined temperature or lower during the heating and dehumidifying operation.

4. A vehicle air conditioning apparatus comprising:
a compressor configured to compress and discharge a refrigerant;
a radiator provided in a vehicle interior and configured to release heat from the refrigerant;
a heat exchanger provided in the vehicle interior and configured to absorb the heat into the refrigerant; and
an outdoor heat exchanger provided outside the vehicle interior and configured to release the heat from or absorb the heat into the refrigerant,
the vehicle air conditioning apparatus performing:
a cooling operation to release the heat from the refrigerant discharged from the compressor in the outdoor heat exchanger, to decompress the refrigerant by an expansion part, and to absorb the heat into the refrigerant in the heat exchanger;
a cooling and dehumidifying operation to release the heat from the refrigerant discharged from the compressor in the radiator and the outdoor heat exchanger, to decompress the refrigerant by the expansion part, and to absorb the heat into the refrigerant in the heat exchanger;

a heating operation to release the heat from the refrigerant discharged from the compressor in the radiator, to decompress the refrigerant by the expansion part, and to absorb the heat into the refrigerant in the outdoor heat exchanger; and a heating and dehumidifying operation to release the heat from the refrigerant discharged from the compressor in the radiator, to decompress part of the refrigerant by the expansion part, and to absorb the heat into the refrigerant in the heat exchanger while decompressing a remaining refrigerant by the expansion part and then absorbing the heat into the refrigerant in the outdoor heat exchanger, the vehicle air conditioning apparatus further comprising:

a flow regulating valve provided in a refrigerant flow passage to flow the refrigerant into the outdoor heat exchanger and configured to regulate an amount of the refrigerant flowing through the refrigerant flow passage;

an evaporating temperature detection part configured to detect an evaporating temperature of the refrigerant in the heat exchanger; and a refrigerant flow control part configured to increase the amount of the refrigerant flowing into the outdoor heat exchanger by using the flow regulating valve, when the evaporating temperature detected by the evaporating temperature detection part is a predetermined temperature or lower during the heating and dehumidifying operation.

5. The vehicle air conditioning apparatus according to claim 4, wherein the flow adjusting valve is an electronic control valve with an adjustable opening.

6. A vehicle air conditioning apparatus comprising:

a compressor configured to compress and discharge a refrigerant;

a radiator provided in a vehicle interior and configured to release heat from the refrigerant;

a heat exchanger provided in the vehicle interior and configured to absorb the heat into the refrigerant; and an outdoor heat exchanger provided outside the vehicle interior and configured to release the heat from or absorb the heat into the refrigerant, the vehicle air conditioning apparatus performing:

a cooling operation to release the heat from the refrigerant discharged from the compressor in the outdoor heat exchanger, to decompress the refrigerant by an expansion part, and to absorb the heat into the refrigerant in the heat exchanger;

a cooling and dehumidifying operation to release the heat from the refrigerant discharged from the compressor in the radiator and the outdoor heat exchanger, to decompress the refrigerant by the expansion part, and to absorb the heat into the refrigerant in the heat exchanger;

a heating operation to release the heat from the refrigerant discharged from the compressor in the radiator, to decompress the refrigerant by the expansion part, and to absorb the heat into the refrigerant in the outdoor heat exchanger; and a heating and dehumidifying operation to release the heat from the refrigerant discharged from the compressor in the radiator, to decompress part of the refrigerant by the expansion part, and to absorb the heat into the refrigerant in the heat exchanger while decompressing a remaining refrigerant by the expansion part and then absorbing the heat into the refrigerant in the outdoor heat exchanger, the vehicle air conditioning apparatus further comprising:

an on-off valve provided in a refrigerant flow passage to flow the refrigerant into the outdoor heat exchanger and configured to be able to open and close the refrigerant flow passage;

an evaporating temperature detection part configured to detect an evaporating temperature of the refrigerant in the heat exchanger; and a refrigerant flow restricting part configured to restrict the refrigerant from flowing into the outdoor heat exchanger by using the on-off valve, when the evaporating temperature detected by the evaporating temperature detection part is a predetermined temperature or lower during the heating and dehumidifying operation.

7. A vehicle air conditioning apparatus comprising:

a compressor configured to compress and discharge a refrigerant;

a radiator provided in a vehicle interior and configured to release heat from the refrigerant;

a heat exchanger provided in the vehicle interior and configured to absorb the heat into the refrigerant; and an outdoor heat exchanger provided outside the vehicle interior and configured to release the heat from or absorb the heat into the refrigerant, the vehicle air conditioning apparatus performing:

a cooling operation to release the heat from the refrigerant discharged from the compressor in the outdoor heat exchanger, to decompress the refrigerant by an expansion part, and to absorb the heat into the refrigerant in the heat exchanger;

a cooling and dehumidifying operation to release the heat from the refrigerant discharged from the compressor in the radiator and the outdoor heat exchanger, to decompress the refrigerant by the expansion part, and to absorb the heat into the refrigerant in the heat exchanger;

a heating operation to release the heat from the refrigerant discharged from the compressor in the radiator, to decompress the refrigerant by the expansion part, and to absorb the heat into the refrigerant in the outdoor heat exchanger; and a heating and dehumidifying operation to release the heat from the refrigerant discharged from the compressor in the radiator, to decompress the refrigerant by the expansion part, and to absorb the heat into the refrigerant in the heat exchanger and the outdoor heat exchanger, or at least in the heat exchanger, the vehicle air conditioning apparatus further comprising:

an environmental condition detection part configured to be able to detect at least one of environmental conditions including an outdoor air temperature, an indoor air temperature, an indoor air humidity and an amount of insolation;

a fog determination part configured to be able to determine whether or not conditions are met to fog window glasses of the vehicle interior; and a mode switching part configured to be able to switch a switching mode among a first switching mode, a second switching mode and a third switching mode, wherein:

the first switching mode switches an operation among the heating operation, the heating and dehumidifying operation, the cooling operation and the cooling and dehumidifying operation, based on the environment conditions detected by the environmental condition detection part;

the second switching mode switches the operation among the heating operation, the heating and dehumidifying operation, the cooling operation, and the cooling and dehumidifying operation, and performs the heating and dehumidifying operation only when the fog detection part determines that the conditions are met to fog the window glasses; and the third switching mode switches the operation among the heating operation, the cooling operation and the cooling and dehumidifying operation, based on the environmental conditions detected by the environmental condition detection part.

8. The vehicle air conditioning apparatus according to claim 7, wherein:

the heating and dehumidifying operation includes:
a first heating and dehumidifying operation to release the heat from the refrigerant in the radiator, to decompress the refrigerant by the expansion part and to absorb the heat into the refrigerant in the heat exchanger and the outdoor heat exchanger; and a second heating and dehumidifying operation to release the heat from the refrigerant in the radiator, to decompress the refrigerant by the expansion part, and to absorb the heat into the refrigerant in the heat exchanger, the environmental condition detection part includes an outdoor air temperature detection part to detect an outdoor air temperature; and in the first switching mode, following operations are performed:

the heating operation when the outdoor air temperature detected by the outdoor air temperature detection part is lower than a first predetermined temperature;

the first heating and dehumidifying operation when the outdoor air temperature is the first predetermined temperature or higher, a target air-blowing temperature is a second predetermined temperature or higher, the target air-blowing temperature being a temperature of air blowing to the vehicle interior in order to set the indoor air temperature to a setting temperature, and the outdoor air temperature is lower than a third predetermined temperature;

the second heating and dehumidifying operation when the outdoor air temperature is the first predetermined temperature or higher, the target air-blowing temperature is the second predetermined temperature or higher, and the outdoor air temperature is the third predetermined temperature or higher;

the second heating and dehumidifying operation when the outdoor air temperature is the first predetermined temperature or higher, the target air-blowing temperature is lower than the second predetermined temperature and is higher than the outdoor air temperature, and the outdoor air temperature is lower than a predetermined fourth temperature;

the cooling and dehumidifying operation when the outdoor air temperature is the first predetermined temperature or higher, the target air-blowing temperature is lower than the second predetermined temperature and is higher than the outdoor air temperature, and the outdoor air temperature is the fourth predetermined temperature or higher; and one of the cooling operation and the cooling and dehumidifying operation when the outdoor air temperature is the first predetermined temperature or higher, and the target air-blowing temperature is lower than the second predetermined temperature and is the outdoor air temperature or lower.

9. The vehicle air conditioning apparatus according to claim 8, wherein in the second switching mode, the following operations are performed:

the heating operation when the outdoor air temperature detected by the outdoor air temperature detection part is lower than the first predetermined temperature;

the heating operation when the outdoor air temperature is the first predetermined temperature or higher, the target air-blowing temperature is the second predetermined temperature or higher, the outdoor air temperature is lower than the third predetermined temperature, and the fog determination part determines that the conditions are not met to fog the window glasses;

the first heating and dehumidifying operation when the outdoor air temperature is the first predetermined temperature or higher, the target air-blowing temperature is the second predetermined temperature or higher, the outdoor air temperature is lower than the third predetermined temperature, and the fog determination part determines that the conditions are met to fog the window glasses;

the heating operation when the outdoor air temperature is the predetermined temperature or higher, the target air-blowing temperature is the second predetermined temperature or higher, the outdoor air temperature is the third predetermined temperature or higher, and the fog determination part determines that the conditions are not met to fog the window glasses;

the second heating and dehumidifying operation when the outdoor air temperature is the first predetermined temperature or higher, the target air-blowing temperature is the second predetermined temperature or higher, the outdoor air temperature is the third predetermined temperature or higher, and the fog determination part determines that the conditions are met to fog the window glasses;

the heating operation when the outdoor air temperature is the first predetermined temperature or higher, the target air-blowing temperature is lower than the second predetermined temperature and is higher than the outdoor air temperature, the outdoor air temperature is lower than the fourth predetermined temperature, and the fog determination part determines that the conditions are not met to fog the window glasses;

the second heating and dehumidifying operation when the outdoor air temperature is the first predetermined temperature or higher, the target air-blowing temperature is lower than the second predetermined temperature and is higher than the outdoor air temperature, the outdoor air temperature is lower than the fourth predetermined temperature, and the fog determination part determines that the conditions are met to fog the window glasses;

one of the cooling operation and the cooling and dehumidifying operation when the outdoor air temperature is the first predetermined temperature or higher, the target air-blowing temperature is lower than the second predetermined temperature and is higher than the outdoor air temperature, and the outdoor air temperature is the fourth predetermined temperature or higher; and one of the cooling operation and the cooling and dehumidifying operation when the outdoor air temperature is the first predetermined temperature or higher, and the target air-blowing temperature is lower than the second predetermined temperature and is the outdoor air temperature or lower.

10. The vehicle air conditioning apparatus according to 8, wherein in the third switching mode, the heating operation is performed when the target air-blowing temperature is higher than the outdoor air temperature; and one of the cooling operation and the cooling and dehumidifying operation is performed when the target air-blowing temperature is the outdoor air temperature or lower.

11. The vehicle air conditioning apparatus according to claim 9, wherein in the third switching mode, the heating operation is performed when the target air-blowing temperature is higher than the outdoor air temperature; and one of the cooling operation and the cooling and dehumidifying operation is performed when the target air-blowing temperature is the outdoor air temperature or lower.

12. The vehicle air conditioning apparatus according to claim 7, further comprising:
an air conditioning unit including an air flow passage in which the radiator and the heat exchanger are disposed, and a plurality of outlets that allows air flowing through the air flow passage to blow out to the vehicle interior;
an outlet switching part configured to be able to switch a mode among a vent mode to blow the air flowing through the air flow passage toward a head of a passenger in the vehicle interior, a foot mode to blow the air toward feet of the passenger in the vehicle interior and a bi-level mode to blow the air toward the heat and the feet of the passenger in the vehicle interior; and
an air mix damper configured to be able to change a percentage of air to be subjected to a heat exchange with the refrigerant in the radiator, the air flowing through the air flow passage, by changing an opening of the air mix damper, wherein:
in the foot mode during the heating operation, a number of rotations of an electric motor to drive the compressor is controlled such that a temperature of the air after the heat exchange in the radiator is a target heating temperature, and the opening of the air mix damper is controlled to maximize the percentage of the air to be subjected to the heat exchange with the refrigerant in the radiator; and
in the bi-level mode during the heating operation, the number of rotations of the electric motor to drive the compressor is controlled such that the temperature of the air after the heat exchange in the radiator is the target heating temperature, and the air mix damper is controlled such that the air mix damper is opened at the opening that is within a predetermined range and that is calculated based on the target air-blowing temperature, the temperature of the air flowing into the air flow passage and the target heating temperature.

13. The vehicle air conditioning apparatus according to claim 12, wherein:
the target heating temperature in the foot mode during the heating operation is obtained by adding to the target air-blowing temperature a quantity of heat corresponding to a heat loss from the air to be blown out to the vehicle interior, as the air flows through the air flow passage; and
the target heating temperature in the bi-level mode during the heating operation is calculated based on the target air-blowing temperature, the temperature of the air flowing into the air flow passage and the opening of the air mix damper.

14. The vehicle air conditioning apparatus according to claim 12, wherein:
the outlet switching part has a defroster mode to blow the air flowing through the air flow passage toward the window glasses of the vehicle interior, and a defroster-foot mode to blow the air toward the window glasses of the vehicle interior and the feet of the passenger;
during the heating and dehumidifying operation, a refrigerant decompression part is controlled such that the temperature of the air after the heat exchange in the heat exchanger is a cooling and dehumidifying target temperature, the refrigerant decompression part being provided in the refrigerant flow passage to flow the refrigerant into the heat exchanger or the outdoor heat exchanger;
in the foot mode, the vent mode, the defroster mode and the defroster-foot mode during the heating and dehumidifying operation, the number of rotations of the electric motor to drive the compressor is controlled such that the temperature of the air after the heat exchange in the radiator is a post-dehumidifying target heating temperature, and the opening of the air mix damper is controlled to maximize the percentage of the air to be subjected to the heat exchange with the refrigerant in the radiator; and
in the bi-level mode during the heating and dehumidifying operation, the number of rotations of the electric motor to drive the compressor is controlled such that the temperature of the air after the heat exchange in the radiator is the post-dehumidifying target heating temperature, and the air mix damper is controlled such that the air mix damper is opened at the opening that is within the predetermined range and that is calculated based on the target air-blowing temperature, the cooling and dehumidifying target temperature and the post-dehumidifying target heating temperature.

15. The vehicle air conditioning apparatus according to claim 14, wherein:
during the heating and dehumidifying operation, the target cooling and dehumidifying temperature is calculated based on at least one of the outdoor air temperature, the indoor air temperature, the indoor air humidity, the amount of insolation, a velocity of a vehicle and the target air-blowing temperature, in order to set the target cooling and dehumidifying temperature to a predetermined target cooling and dehumidifying temperature in the first switching mode, and to set the indoor air humidity to a predetermined humidity or lower in the second switching mode;
in the foot mode, the vent mode, the defroster mode and the defroster-foot mode during the heating and dehumidifying operation, the post-dehumidifying target heating temperature is obtained by adding to the target air-blowing temperature the quantity of heat corresponding to the heat loss from the air to be blown out to the vehicle interior, as the air flows through the air flow passage; and
in the bi-level mode during the heating and dehumidifying operation, the post-dehumidifying target heating temperature is calculated based on the target air-blowing temperature, the target cooling and dehumidifying temperature and the opening of the air mix damper.

16. The vehicle air conditioning apparatus according to claim 12, wherein, during the cooling operation and the cooling and dehumidifying operation, the number of rotations of the electric motor to drive the compressor is controlled such that the temperature of the air after the heat exchange in the heat exchanger is a target cooling temperature; the temperature of the air after the heat exchange in the radiator is estimated as an estimated heating temperature; and the air mix damper is controlled such that the air mix damper is opened at the opening that is calculated based on the target air-blowing temperature, the target cooling temperature and the estimated heating temperature.

17. The vehicle air conditioning apparatus according to claim 16, wherein, the target cooling temperature is calculated based on at least one of the outdoor air temperature, the indoor air temperature, the indoor air humidity, the amount of insolation, the velocity of the vehicle and the target air-blowing temperature, in order to set the target cooling temperature to a predetermined target cooling temperature in the first switching mode and the third switching mode, and to set the indoor air humidity to the predetermined humidity or lower in the second switching mode.

18. A vehicle air conditioning apparatus comprising:
  a compressor configured to compress and discharge a refrigerant;
  a radiator provided in a vehicle interior and configured to release heat from the refrigerant;
  a heat exchanger provided in the vehicle interior and configured to absorb the heat into the refrigerant; and
  an outdoor heat exchanger provided outside the vehicle interior and configured to release the heat from or absorb the heat into the refrigerant,
  the vehicle air conditioning apparatus performing:
  a heating operation to release the heat from the refrigerant discharged from the compressor in the radiator and to absorb the heat into the refrigerant in the outdoor heat exchanger; and
  a heating and dehumidifying operation to release the heat from the refrigerant discharged from the compressor in the radiator and to absorb the heat into part of the refrigerant in the heat exchanger while absorbing the heat into a remaining refrigerant in the outdoor heat exchanger,
  the vehicle air conditioning apparatus further comprising:
  an expansion valve provided in a refrigerant flow passage to flow the refrigerant into the outdoor heat exchanger, the expansion valve having an adjustable opening;
  a heat exchanger temperature sensor configured to detect an evaporating temperature of the refrigerant in the heat exchanger;
  a target superheat setting part configured to set a predetermined value as a target superheat during the heating operation, and to set a value calculated based on the evaporating temperature detected by the heat exchanger temperature sensor and a target temperature of the heat exchanger, as the target superheat during the heating and dehumidifying operation;
  a superheat calculation part configured to calculate a superheat of the refrigerant flowing out of the outdoor heat exchanger; and
  a valve opening control part configured to control the opening of the expansion valve based on the target superheat set by the target superheat setting part and the superheat calculated by the superheat calculation part.

19. The vehicle air conditioning apparatus according to claim 18, wherein the valve opening control part includes:
  a feedforward target value calculation part configured to calculate a feedforward target value for the opening of the expansion valve, based on the target superheat set by the target superheat setting part;
  a responsive target value calculation part configured to calculate a target value responsive to the target superheat, based on the target superheat set by the target superheat setting part; and
  a feedback target value calculation part configured to calculate a feedback target value for the opening of the expansion valve, based on the responsive target value calculated by the responsive target value calculation part and the superheat of the refrigerant flowing out of the outdoor heat exchanger that is calculated by the superheat calculation part,
  wherein the opening of the expansion valve is controlled based on the feedfoward target value calculated by the feedforward target value calculation part and the feedback target value calculated by the feedback calculation part.

* * * * *